US010715858B2

United States Patent
Yoshizawa et al.

(10) Patent No.: US 10,715,858 B2
(45) Date of Patent: Jul. 14, 2020

(54) VIEWING SYSTEM, BROADCAST RECEPTION DEVICE, PORTABLE TERMINAL, PROGRAM RECORDING AND VIEWING METHOD, AND VIEWING METHOD OF RECORDING PROGRAM

(71) Applicant: MAXELL, LTD., Kyoto (JP)

(72) Inventors: Kazuhiko Yoshizawa, Osaka (JP); Nobuo Masuoka, Osaka (JP); Motoyuki Suzuki, Osaka (JP); Hiroshi Shimizu, Osaka (JP); Yasunobu Hashimoto, Osaka (JP)

(73) Assignee: MAXELL, LTD., Kyoto (JP)

( * ) Notice: Subject to any disclaimer, the term of this patent is extended or adjusted under 35 U.S.C. 154(b) by 202 days.

(21) Appl. No.: 15/537,397

(22) PCT Filed: Dec. 26, 2014

(86) PCT No.: PCT/JP2014/084711
§ 371 (c)(1),
(2) Date: Jun. 16, 2017

(87) PCT Pub. No.: WO2016/103518
PCT Pub. Date: Jun. 30, 2016

(65) Prior Publication Data
US 2017/0339451 A1    Nov. 23, 2017

(51) Int. Cl.
*H04N 21/433*    (2011.01)
*H04N 5/765*    (2006.01)
(Continued)

(52) U.S. Cl.
CPC ......... *H04N 21/4334* (2013.01); *H04N 5/765* (2013.01); *H04N 5/775* (2013.01);
(Continued)

(58) Field of Classification Search
None
See application file for complete search history.

(56) References Cited

U.S. PATENT DOCUMENTS

2009/0129745 A1*    5/2009    Kinoshita .............. H04N 5/782
386/299

FOREIGN PATENT DOCUMENTS

JP        2007-049538 A      2/2007
JP        2007049538 A  *   2/2007     ............. H04N 5/765
(Continued)

OTHER PUBLICATIONS

Search Report issued in corresponding International Patent Application No. PCT/JP2014/084711, dated Mar. 10, 2015.

*Primary Examiner* — Heather R Jones
(74) *Attorney, Agent, or Firm* — McDermott Will & Emery LLP

(57) ABSTRACT

When a user inputs an operation of recording a broadcast program into a broadcast reception device, the broadcast reception device outputs, by a display video output unit of the broadcast reception device, a recording setting screen selecting a first recording method of recording program related information and not recording a video content of a broadcast program or a second recording method of recording the program related information and a video content of the broadcast program about a first program. When the first recording method is selected, the program related information is recorded and the video content of the broadcast program is not recorded. When the user inputs an operation of playing back the first program into the broadcast reception device, the broadcast reception device communicates with the server, receives the video content of the first program from the server, and outputs the video content by the display video output unit.

13 Claims, 30 Drawing Sheets

(51) Int. Cl.
  *H04N 5/775* (2006.01)
  *H04N 9/82* (2006.01)
  *H04N 21/41* (2011.01)
  *H04N 21/414* (2011.01)
  *H04N 21/436* (2011.01)
  *H04N 21/472* (2011.01)
  *H04N 21/485* (2011.01)

(52) U.S. Cl.
  CPC ....... *H04N 9/8205* (2013.01); *H04N 21/4126* (2013.01); *H04N 21/41407* (2013.01); *H04N 21/43622* (2013.01); *H04N 21/47217* (2013.01); *H04N 21/4854* (2013.01)

(56) References Cited

FOREIGN PATENT DOCUMENTS

| | | | | |
|---|---|---|---|---|
| JP | 2008-124651 A | 5/2008 | | |
| JP | 2010-278788 A | 12/2010 | | |
| JP | 2010278788 A | * | 12/2010 | ............. H04N 7/173 |

* cited by examiner

FIG. 2C

| | 1201 | 1202 | 1203 | 1204 | 1205 | 1206 | 1207 | 1208 | 1209 | 1210 |
|---|---|---|---|---|---|---|---|---|---|---|
| No. | BROADCAST DATE | BROADCAST TIME | CH | PROGRAM TITLE | REPETITION | MODE | RECORDING DESTINATION | RECORDER | RECORDING METHOD |
| 01 | 2014/06/24 | 20:00-20:54 | 5 | "SEE YOU AT SAKURAGICHO" | EVERY WEEK | DR | BUILT-IN HDD | 1 | ONLY INFORMATION |
| 02 | 2014/06/25 | 08:00-08:15 | 1 | "HANA TO ANKO" | EVERY DAY | VIEWING | - | - | - |
| 03 | 2014/06/27 | 18:30-19:00 | 7 | "POT MONSTERS" | - | TSX8 | USB-HDD | 2 | CONTENT RECORDING |
| ⋮ | ⋮ | ⋮ | ⋮ | ⋮ | ⋮ | ⋮ | ⋮ | ⋮ | ⋮ |

FIG. 2D

| | 1301 | 1302 | 1303 | 1304 | 1305 | 1306 | 1307 |
|---|---|---|---|---|---|---|---|
| No. | RECORDING DATE | RECORDING TIME | CH | PROGRAM TITLE | MODE | RECORDING LOCATION |
| 01 | 2014/06/10 | 20:00-20:54 | 5 | "SEE YOU AT SAKURAGICHO" | DR | hdd-0000/drama/xxxxx/xx001.ifo |
| 02 | 2014/06/17 | 20:00-20:54 | 5 | "SEE YOU AT SAKURAGICHO" | DR | hdd-0000/drama/xxxxx/xx002.ifo |
| 03 | 2014/06/20 | 19:00-20:00 | 7 | "DASH TO ARASHI!!" | TSX8 | hdd-usb1/root/arashi/ xxxx.ifo |
| ⋮ | ⋮ | ⋮ | ⋮ | ⋮ | ⋮ | ⋮ |

| | 1301 | 1308 | 1309 | 1310 | 1311 |
|---|---|---|---|---|---|
| No. | PROGRAM ID | PROGRAM-STORAGE LOCATION | VIEWING | RESUME |
| 01 | BS146A200 | http://xx-bsta.com/server001/ | DONE | 00:42:15 |
| 02 | BS146H200 | http://xx-bsta.com/server001/ | DONE | 00:00:00 |
| 03 | - | hdd-usb1/root/arashi/xxxx.ts | NOT-YET | 00:00:00 |
| ⋮ | ⋮ | ⋮ | ⋮ | ⋮ |

FIG. 2E

| No. | SERVER NAME | URL | LOGIN NAME | PASSWORD | REGISTRATION STATE | EXPIRATION DATE |
|-----|-------------|-----|------------|----------|---------------------|------------------|
| 01 | ×× BROADCAST | http:// xx-bsta.com/ | user-id-0001 | pwd-****11-00 | Premium | yy/mm/dd |
| 02 | TV ∞ | http://tv-xxxx.com/ | user-id-0001 | pwd-****11-01 | Free | yy/mm/dd |
| 03 | ○× TV | 1http://xxxx-tv.co.jp/ | user-id-0001 | pwd-****11-02 | Free | yy/mm/dd |
| ⋮ | ⋮ | ⋮ | ⋮ | ⋮ | ⋮ | ⋮ |

Numbers: 1401 1402 1403 1404 1405 1406 1407

FIG. 2F

| No. | COOPERATIVE-DEVICE NAME | COOPERATIVE-DEVICE ADDRESS | LOGIN ID | PASSWORD | REGISTRATION DATE |
|-----|--------------------------|-----------------------------|----------|----------|--------------------|
| 01 | HV Cam-Wooo | xx.xx.xx.xx.AA.01 | ktai-id-11 | pwd-k**001 | yy/mm/dd |
| 02 | Hitachi W63H | xx.xx.xx.xx.BB.01 | ktai-id-22 | pwd-k**221 | yy/mm/dd |
| 03 | XXX-XXX-X | xx.xx.xx.xx.CC.01 | ktai-id-33 | pwd-k**331 | yy/mm/dd |
| ⋮ | ⋮ | ⋮ | ⋮ | ⋮ | ⋮ |

Numbers: 1451 1452 1453 1454 1455 1456

FIG. 4B

| No. | PROGRAM ID | CONTENT-STORAGE LOCATION | CONTENT NAME |
|---|---|---|---|
| 01 | BS146A200 | /server001/drama/friday/2014/sakuragicho/0617/ | Pgm_dxxxx-0617.TS |
| 02 | BS146A201 | /server009/info/friday/2014/news/0617/ | Pgm_inxxx-0617-00.TS |
| 03 | BS146A210 | /server005/cinema/friday/2014/eigashow/0617/ | Pgm_cxxxx-0617.TS |
| 04 | BS146A221 | /server009/info/friday/2014/tenki/0617/ | Pgm_itxxx-0617-00.TS |
| ⋮ | ⋮ | ⋮ | ⋮ |

| No. | CONTENT TITLE | BROADCAST DATE | BROADCAST TIME | CONTENT OUTLINE |
|---|---|---|---|---|
| 01 | "SEE YOU AT SAKURAGICHO" | 2014/06/17 | 20:00-20:54 | 「⋯⋯⋯」 |
| 02 | "NEWS 2054" | 2014/06/17 | 20:54-21:00 | 「⋯⋯⋯」 |
| 03 | "FRIDAY ROAD SHOW" | 2014/06/17 | 21:00-22:54 | 「⋯⋯⋯」 |
| 04 | "TOMORROW'S WEATHER" | 2014/06/17 | 22:54-23:00 | 「⋯⋯⋯」 |
| ⋮ | ⋮ | ⋮ | ⋮ | ⋮ |

FIG. 5C

| No. | COOPERATIVE-DEVICE NAME | COOPERATIVE-DEVICE ADDRESS | LOGIN ID | PASSWORD | REGISTRATION DATE | PRIORITY |
|---|---|---|---|---|---|---|
| 01 | P50-XP05 | xx.xx.xx.xx.00.01 | ktai-id-11 | pwd-k**001 | yy/mm/dd | ◯ |
| 02 | BIV-R1021C | xx.xx.xx.xx.11.01 | ktai-id-11 | pwd-k**002 | yy/mm/dd | – |
| 03 | XX-XXXX-XX | xx.xx.xx.xx.22.01 | ktai-id-11 | pwd-k**003 | yy/mm/dd | – |
| ⋮ | ⋮ | ⋮ | ⋮ | ⋮ | ⋮ | |

7201 7202 7203 7204 7205 7206 7207

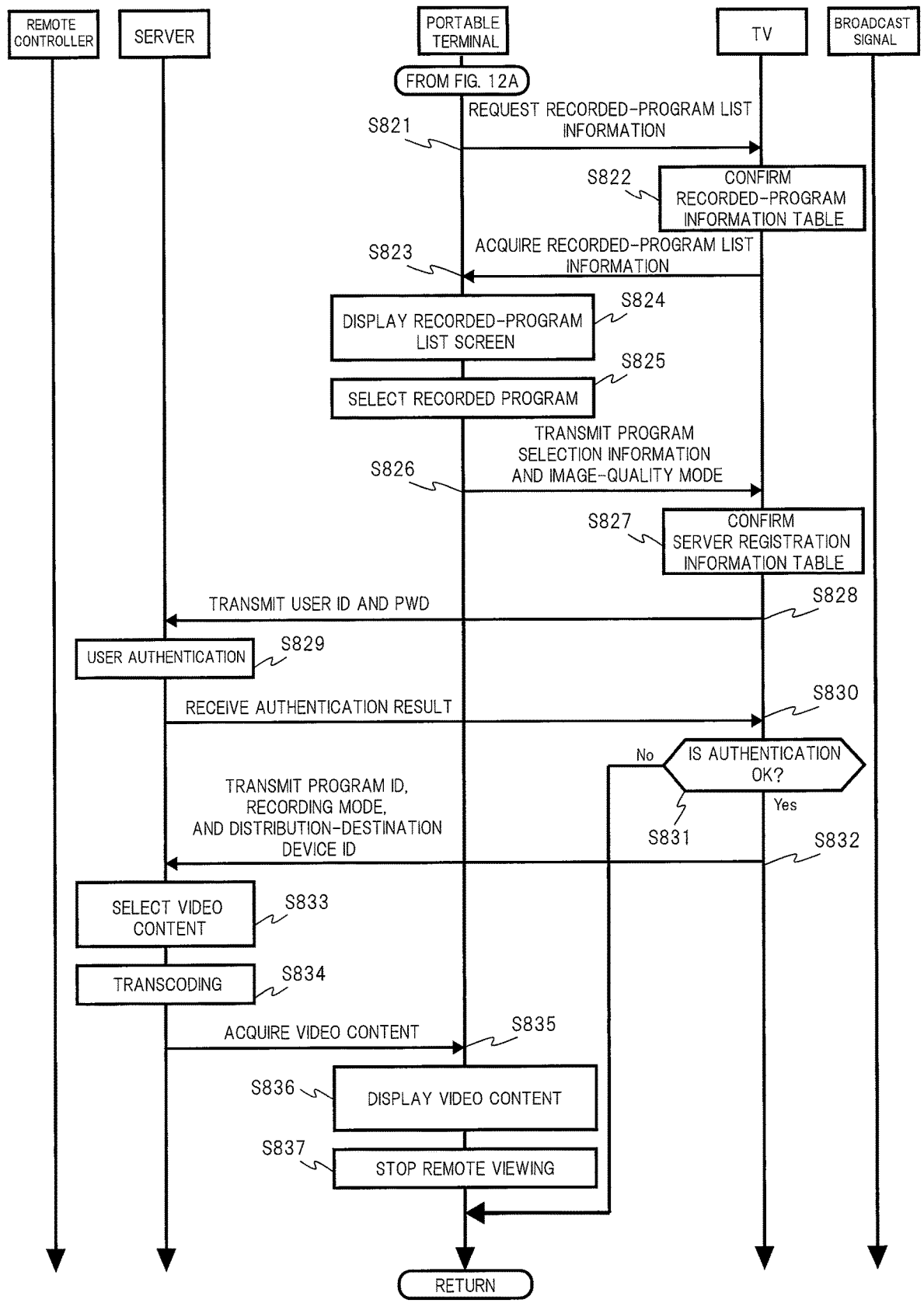

VIEWING SYSTEM, BROADCAST RECEPTION DEVICE, PORTABLE TERMINAL, PROGRAM RECORDING AND VIEWING METHOD, AND VIEWING METHOD OF RECORDING PROGRAM

CROSS REFERENCE

This application is the U.S. National Phase under 35 U.S.C. § 371 of International Application No. PCT/JP2014/084711, filed on Dec. 26, 2014, the entire contents of each are hereby incorporated by reference.

TECHNICAL FIELD

The present invention relates to a recording technique and a viewing technique of a program.

BACKGROUND ART

With spread of a high-speed communication technique, proposed has been a technique capable of viewing a broadcast program received by a TV receiver installed in a house or a recording program stored in the TV receiver or a video recorder in the house, outside by a portable terminal such as a smartphone or a tablet terminal through a network. As such a technique, for example, Patent Document 1 is described below.

Patent Document 1 below discloses the following technique: when a control unit of a portable phone transmits playback instruction information to an HDD recorder through a network I/F, the control unit (of the portable phone) receives data from the HDD recorder through the network I/F so as to display the data on a display. A control unit of the HDD recorder plays back a program that has been recorded. Then, the data that has been played back is converted from an MPEG2 format into an H264 format. Then, the data is transmitted to the portable phone through the network I/F.

RELATED ART DOCUMENTS

Patent Documents

Patent Document 1: Japanese Patent Application Laid-open No. 2008-124651

SUMMARY OF THE INVENTION

Problems to be Solved by the Invention

However, the technique in Patent Document 1 above is not convenient sufficiently for a user in various usage environments and usage conditions. For example, there arises a problem that a broadcast program or a recording program cannot be transmitted to an outside portable terminal and cannot be viewed when a tuner for receiving a broadcast wave and a transcoder for converting an encoding format and a bit rate of program data are all used during domestic use of a TV receiver.

An object of the present invention is to provide a viewing system, a broadcast reception device, and a portable terminal which are preferable in viewing a broadcast program and a recording program with the portable terminal through a network outside.

Means for Solving the Problems

Techniques described in a scope of claims are used as means for solving the problem.

If one example is given, a configuration is made as follows: when a user inputs an operation of recording a broadcast program into a broadcast reception device, the broadcast reception device outputs, by a display video output unit of the broadcast reception device, a recording setting screen capable of selecting a first recording method of recording program related information and not recording a video content of the broadcast program or a second recording method of recording the program related information and the video content of the broadcast program about a first program as a recorded target; when the first recording method is selected by the operation inputted from the user to the broadcast reception device in recording the first program by the broadcast reception device, the program related information is recorded and the video content of the broadcast program is not recorded; and when the user inputs an operation of playing back the first program into the broadcast reception device, the broadcast reception device communicates with the server, receives the video content of the first program from the server, and outputs the received video content by the display video output unit.

Effects of the Invention

Using the techniques according to the present invention can provide a viewing system, a broadcast reception device, and a portable terminal which is preferable in viewing the broadcast program and the recording program with the portable terminal through the network outside.

BRIEF DESCRIPTIONS OF THE DRAWINGS

FIG. 2C is a conceptual diagram for describing a data format of a scheduled information table according to the first embodiment;

FIG. 2D is a conceptual diagram for describing a data format of a recorded-program information table according to the first embodiment;

FIG. 2E is a conceptual diagram for describing a data format of a server registration information table according to the first embodiment;

FIG. 2F is a conceptual diagram for describing a data format of a cooperative-device registration information table according to the first embodiment;

FIG. 4B is a conceptual diagram for describing a data format of a content information table according to the first embodiment;

FIG. 5C is a conceptual diagram for describing a data format of a cooperative-device information table according to the first embodiment;

FIG. 15 is an operational sequence diagram of a portable terminal according to a second embodiment in a remote viewing (recording program) processing.

DETAILED DESCRIPTION OF PREFERRED EMBODIMENTS

Figure 1:
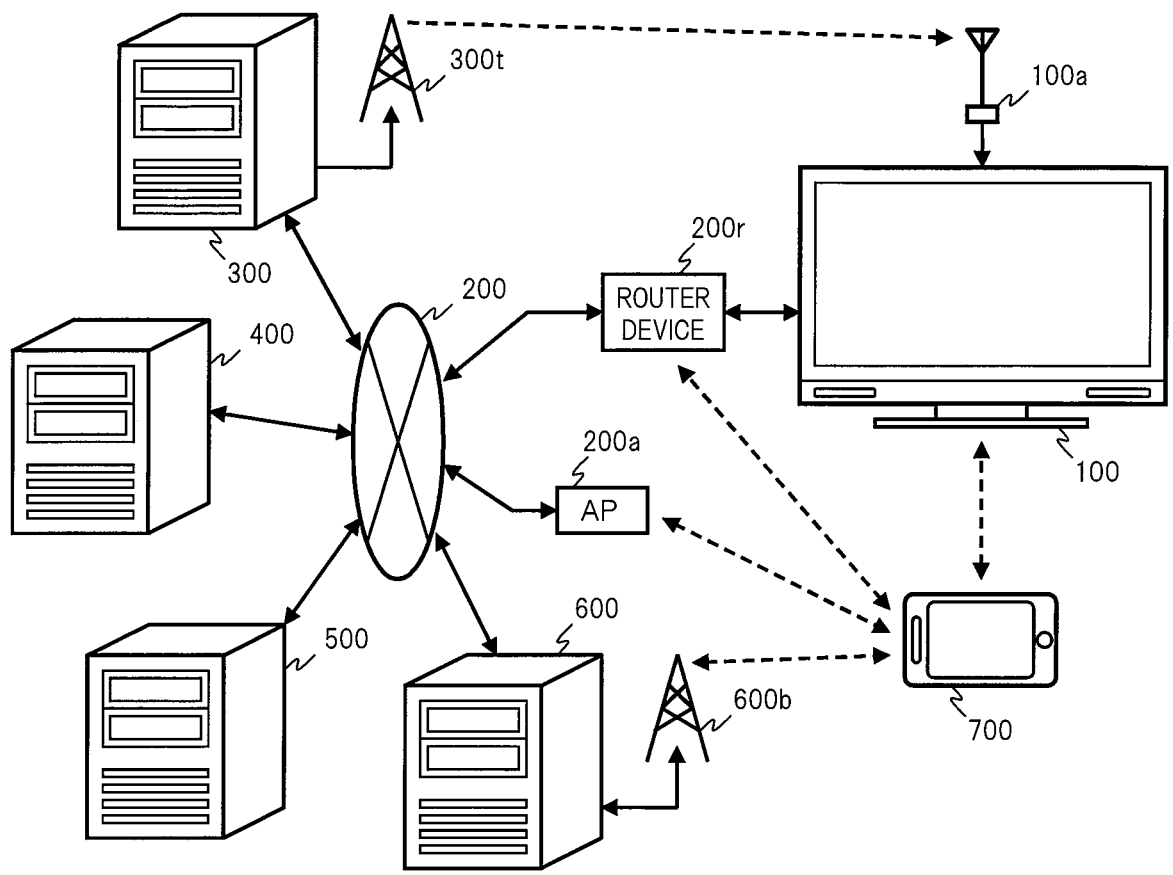
FIG. 1 is a system configuration diagram of a viewing system according to a first embodiment.

Embodiments of the present invention will be described below with the drawings.

First Embodiment

First, an example of a digital broadcasting service that can be received by a broadcast reception device according to the present embodiment will be described.

For example, a plurality of transport streams (TSs) that has been multiplexed can be transmitted to one transponder (a frequency channel) as an example of BS/terrestrial digital broadcasting that can be received by the broadcast reception device according to the present embodiment. Such a TS is a sequence of TS packets obtained by dividing such a data stream as a video/audio elementary stream (ES) or program specific information (PSI)/service information (SI) to add a TS header thereto and by having a predetermined length.

The PSI is a specific information table for identifying which program each ES included in the TS belongs to, the specific information table being prescribed by the standard of a moving picture experts group (MPEG)-2 system. The PSI includes a program association table (PAT), a program map table (PMT), and a conditional access table (CAT), etc. The PAT prescribes a program list included in the TS by packet identifiers (PIDs) in the PMT. The PMT performs prescription etc. for the PIDs of constituent elements of each program. The CAT includes information on conditional reception.

The SI includes program information etc. by extending the PSI, and includes information on an electronic program guide (EPG) that the Association of Radio Industries and Businesses (ARIB) prescribed by ARIB STD-B10. The SI includes a broadcaster information table (BIT), a service description table (SDT), an event information table (EIT), and a time offset table (TOT), etc. The BIT includes broadcasting-station identification information, affiliated information, and broadcaster SI transmission information, etc. The SDT includes information such as a network ID for identifying a network, a TS ID for identifying the TS, and a service ID (a so-called channel number) for identifying an individual service (a so-called channel) in the network. The EIT includes a service ID for identifying the individual service in the network and information related to events such as a name, broadcast date and time, and a broadcast content of each event (a so-called program). The TOT includes information on current date and time.

The TS includes program clock reference (PCR) information serving as a reference for playback timing in a decoder; a BML document made to be a subset based on a broadcast markup language (BML) specification prescribed by ARIB STD-B24; and the like.

The broadcast reception device according to the present embodiment receives and decodes the TS configured by the video/audio ES and the various types of information, etc. so that a data broadcasting screen etc. produced with broadcast programs, the EPG, and the BML can be provided to a user.

The broadcast reception device according to the present embodiment can cope with a broadcast-communication cooperation system in which a function using a broadband network is made to cooperate with the digital broadcasting service so as to combine the digital broadcasting service with: acquisition of an additional content, arithmetic processing in a server device; a presentation processing in cooperation with a portable terminal device; and the like through the broadband network. In order to achieve the broadcast-communication cooperation system, the broadcast reception device according to the present embodiment is capable of performing an application described in a hyper text markup language (HTML) etc. The broadcast-communication cooperation system, which the broadcast reception device copes with, uses an extended BML specification, an application information table (AIT), and extended PSI/SI information necessary for transmitting the application through a broadcast wave in the broadcast-communication cooperation system. Incidentally, the AIT is information for providing or well-knowing: various types of information necessary for booting the application of a destination etc. from which the application is acquired; and control information for controlling the boot/shutdown etc. of the application.

The descriptions that have been given above are based on a digital broadcasting service in Japan, but are not limited to application only in Japan including the broadcast-communication cooperation system which copes with the broadcast reception device according to the present embodiment.

Next, an example of specific configurations according to the present embodiment will be described.

[System Configuration]

FIG. 1 is a system configuration diagram showing an example of a viewing system including a broadcast reception device and a portable terminal according to the present embodiment. The viewing system according to the present embodiment includes a broadcast reception device 100, an antenna 100a, a broadband network 200 such as the Internet, an access point 200a, a router device 200r, a broadcasting-station radio wave tower 300t, a broadcasting-station server 300, a service provider server 400, a different application server 500, a mobile telephone communication server 600, and a base station 600b of a mobile telephone communication system, and a portable terminal 700. The broadcast reception device 100 and the router device 200r are disposed inside a user house, and each server device and the access point 200a are disposed outside the user house. The portable terminal 700 can be carried in the user house and can be carried out from the user house.

The broadcast reception device 100 and the portable terminal 700 each include a remote viewing function capable of viewing a digital broadcasting program being received by a TV receiver in the user house and its already recorded content using a smartphone or a tablet terminal outside the user house through the Internet 200.

The broadcast reception device 100 is a TV receiver including a function of coping with the broadcast-communication cooperation system in addition to an existing digital-broadcasting reception function. The broadcast reception device 100 receives a broadcast wave transmitted from the radio wave tower 300t through the antenna 100a. The broadcast reception device 100 is capable of connecting to the Internet 200 through the router device 200r, and is capable of transmitting and receiving data through communication with each server device on the Internet 200. The router device 200r is connected to the Internet 200 through wired communication, and is connected to the broadcast reception device 100 through radio communication or wired communication.

The radio wave tower 300t is a broadcast facility of a broadcasting station, and transmits the broadcast wave including a digital broadcasting signal, an AIT, control information on application presentation, and the like. Incidentally, the control information on the application presentation relates to superimposition of a broadcast program on the TV receiver and an application, and to whether the application is presented. The broadcasting station includes the broadcasting-station server 300. The broadcasting-station server 300 stores program contents etc. of broadcast programs, and metadata including a program title, a program ID, a program outline, performers, and broadcast date and time, etc. for each broadcast program, and can provide a service provider with the program contents and each piece of the metadata based on contract. Note that, the provision of the program content and the metadata to the service provider, may be made through an application programming interface (API) included in the broadcasting-station server 300.

The service provider server 400 is a server device prepared for the service provider to provide a service due to the broadcast-communication cooperation system, and a service etc. of content distribution. The service provider server 400 performs storage, management, and distribution, etc. of the program content and each piece of the metadata provided from the broadcasting-station server 300, and performs storage, management, and distribution etc. of a content and an application produced for the broadcast-communication cooperation system. Additionally, it has a function of searching an available application and providing a list thereof in response to an inquiry from the TV receiver. Incidentally, the storage, the management, and the distribution of the program contents and each piece of the metadata, and the storage, the management, and the distribution of the above application may be performed by different server devices. The broadcasting station and the service provider may be identical to each other or may be different from each other. A plurality of the service provider servers 400 may be provided for each different service. The broadcasting-station server 300 may have a function common to the function of the service provider server 400.

The different application server 500 is a well-known server device that performs storage, management, and distribution, etc. of: a general application; an operation program; a content; and data, the general application being other than an application irrelevant to the broadcast-communication cooperation system and the service of the content distribution. A plurality of the different application servers 500 may be provided on the Internet 200.

The mobile telephone communication server 600 is connected to the Internet 200 and is additionally connected to the portable terminal 700 through the base station 600b. The mobile telephone communication server 600 manages telephone communication (a telephone call) and data transmission/reception through the mobile telephone communication system of the portable terminal 700 and enables data transmission/reception through communication between the portable terminal 700 and each server device on the Internet 200. The communication between the portable terminal 700 and the base station 600b may be performed by a wideband code division multiple access (W-CDMA) (registered trademark) method, a global system for mobile communications (GSM) method, a long term evolution (LTE) method, or a different communication method.

The portable terminal 700 includes: a function for the telephone communication (telephone call) and the data transmission/reception through the mobile telephone communication system; and a function for radio communication through Wi-Fi (registered trademark) etc. The portable terminal 700 can be connected to the Internet 200 through the access point 200a or through the base station 600b and the mobile telephone communication server 600 of the mobile telephone communication system, and can perform the data transmission/reception through the communication with each server device on the Internet 200. The access point 200a is connected to the Internet 200 through wired communication, and is connected to the portable terminal 700 through radio communication. The portable terminal 700 can be connected to the broadcast reception device 100 and the Internet 200 through the router device 200r. Incidentally, the communication between the broadcast reception device 100 and the portable terminal 700 may be directly performed by a method, such as BlueTooth (registered trademark) or near field communication (NFC) without intervention of the router device 200r.

The portable terminal 700 includes a function of playing back content, such as video (a moving image and a still image) or audio acquired from the broadcast reception device 100 or each server device on the Internet 200.

[Hardware Configuration of Broadcast Reception Device]

Figure 2A:
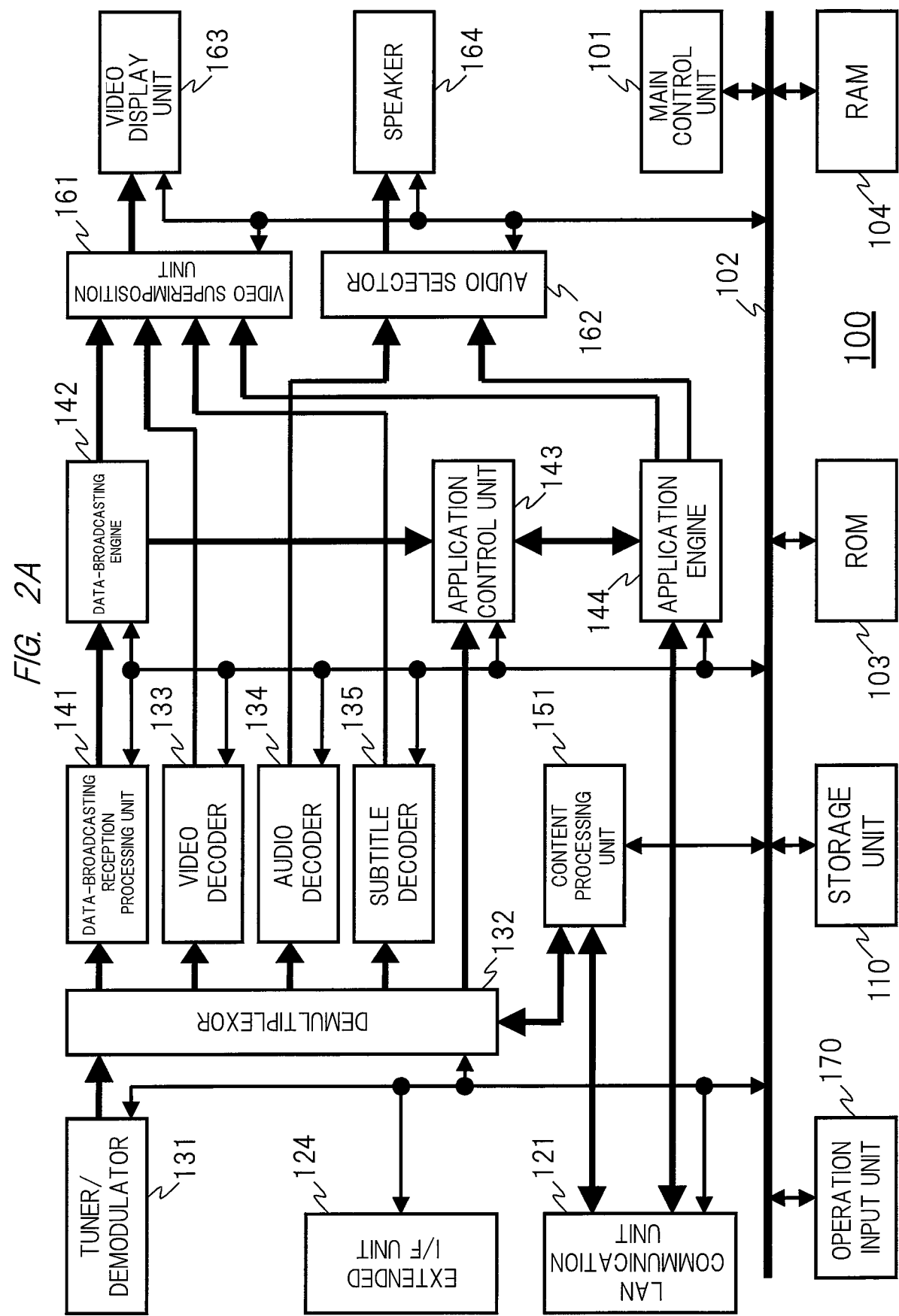
FIG. 2A is a block diagram of a broadcast reception device according to the first embodiment.

FIG. 2A is a block diagram showing an example of an internal configuration of the broadcast reception device 100. The broadcast reception device 100 includes a main control unit 101, a system bus 102, a ROM 103, a RAM 104, a storage unit 110, a LAN communication unit 121, an extended interface unit 124, a tuner/demodulator 131, a demultiplexor 132, a video decoder 133, an audio decoder 134, a subtitle decoder 135, a data-broadcasting reception processing unit 141, a data-broadcasting engine 142, an application control unit 143, an application engine 144, a content processing unit 151, a video superimposition unit 161, an audio selector 162, a video display unit 163, a speaker 164, and an operation input unit 170.

The main control unit 101 is a microprocessing unit that controls the entire broadcast reception device 100 in accordance with a predetermined operation program. The system bus 102 is a data channel for performing data transmission/reception between the main control unit 101 and each operation block in the broadcast reception device 100.

The read only memory (ROM) 103 is a memory storing: a basic operation program such as an operating system; and a different operation program, and, for example, a rewritable ROM such as an electrically erasable programmable ROM (EEPROM) or s flash ROM is used therein. The random access memory (RAM) 104 is to be a work area in executing the basic operation program and the different operation program. The ROM 103 and the RAM 104 may be provided integrally with the main control unit 101. Instead of an individual configuration as illustrated in FIG. 2A, a partial storage area in the storage unit 110 may be used for the ROM 103.

The storage unit 110 stores an operation program and an operation setting value of the broadcast reception device 100, personal information of a user of the broadcast reception device 100, and the like. Further, it can also store: an operation program downloaded from the network; various types of data produced by the operation program; and the like. Additionally, it can also store a content such as a moving image, a still image, or audio acquired from the broadcast wave or downloaded from the network. A partial area of the storage unit 110 may be substituted for the entirety or a part of the function of the ROM 103. The storage unit 110 is required to retain the information that has been stored, even in a state where no power is supplied from outside the broadcast reception device 100. Therefore, used is a device including such a semiconductor element memory as flash ROM or a solid state drive (SSD), or such a magnetic disk drive as a hard disc drive (HDD).

Incidentally, the respective operation programs stored in the ROM 103 and the storage unit 110 can be updated and functionally extended by a download processing from each server device on the Internet 200.

The local area network (LAN) communication unit 121 is connected to the Internet 200 through the router device 200r so as to perform data transmission/reception with each server device on the Internet 200. The connection with the router device 200r may be made through wired connection or such radio connection as Wi-Fi (registered trademark). The LAN communication unit 121 includes an encode circuit, a decode circuit, and the like. The broadcast reception device 100 may further include a different communication unit such as a BlueTooth (registered trademark) communication unit, an NFC communication unit, or an infrared communication unit.

The tuner/demodulator 131 receives the broadcast wave from the radio wave tower 300t through the antenna 100a, and is tuned (selected) to a channel of a service desired by the user based on the control of the main control unit 101. Furthermore, the tuner/demodulator 131 demodulates a broadcast signal, which has been received, and acquires a TS. Incidentally, a configuration including one tuner/demodulator is exemplified in FIG. 2A, but the broadcast reception device 100 may have a configuration of mounting a plurality of the tuners/demodulators for the purpose of multiscreen simultaneous display, counter program recording, or the like. Control etc. of access restriction may be performed with respect to the TS that has been demodulated based on the control of the main control unit 101.

The demultiplexor 132 inputs the TS output from the tuner/demodulator 131, and demultiplexes the TS into respective data streams such as a video data stream, an audio data stream, a subtitle data stream, a program information data stream, an AIT data stream, and a BML data stream to output them. The data streams may be, for example, in an ES format. The video decoder 133 decodes the video data stream inputted from the demultiplexor 132 to output video information. The audio decoder 134 decodes the audio data stream inputted from the demultiplexor 132 to output audio information. The subtitle decoder 135 decodes the subtitle data stream inputted from the demultiplexor 132 to output subtitle information.

The data-broadcasting reception processing unit 141 decodes the BML data stream inputted from the demultiplexor 132 to restore a BML document. The data-broadcasting engine 142 is a BML browser that executes the BML document, and executes the BML document restored by the data-broadcasting reception processing unit 141 to output data broadcasting screen information. Based on the AIT data stream inputted from the demultiplexor 132 or an AIT file acquired from each server device on the Internet 200, the application control unit 143 actuates the application engine 144 relative to the application produced for the broadcast-communication cooperation system, and controls and manages a life cycle and an event per application unit. Further, it appropriately controls functional restriction of the application in accordance with the state of the application and an instruction of the AIT. The application engine 144 is an HTML browser, which acquires and executes the application produced for the broadcast-communication cooperation system, based on the control of the application control unit 143.

Based on the control of the main control unit 101, the content processing unit 151 accesses a video content etc. provided in each server device on the Internet 200 through the LAN communication unit 121, and acquires a program stream (PS) of the video content etc. The PS that has been acquired may be further supplied to the demultiplexor 132 so as to be subjected to a processing similar to that of the TS outputted from the tuner/demodulator 131. The content processing unit 151 may perform control etc. of a digital rights management (DRM) processing with respect to the acquired PS based on the control of the main control unit 101. The content processing unit 151 includes a transcoding processing function. That is, a transcoding processing is performed to the PS acquired from each server device on the Internet 200 through the LAN communication unit 121, and then the transcoding-processed PS can be supplied to the demultiplexor 132. Alternatively, the transcoding processings are performed to the TS and the ES of the program content outputted from the demultiplexor 132 and then the transcoding-processed TS and ES can be stored into the storage unit 110, or the transcoding processing can be performed to a TS and an ES of a recording content stored in the storage unit 110 and then the transcoding-processed TS and ES can be transmitted to the portable terminal 700 through the LAN communication unit 121.

The video superimposition unit 161 receives: the video information outputted from the video decoder 133; the subtitle information outputted from the subtitle decoder 135; the data broadcasting screen information outputted from the data-broadcasting engine 142; and application execution screen information outputted from the application engine 144, and then performs a selection processing and/or a superimposition processing, etc. The video superimposition unit 161 includes a video RAM not illustrated, and drives the video display unit 163 etc. based on the video information inputted to the video RAM. Based on the control of the main control unit 101, the video superimposition unit 161 performs, as the need arises, a scaling processing, a superimposition processing of EPG screen information produced by interpreting the program information data stream outputted from the demultiplexor 132, and the like. The audio selector 162 inputs the audio information outputted from the audio decoder 134 and application execution audio information outputted from the application engine 144, and then appropriately performs a selection processing based on the control of the main control unit 101. The video display unit 163 is a display device, such as a liquid crystal panel, and provides the user of the broadcast reception device 100 with the video information to which the video superimposition unit 161 has performed the selection processing and/or the superimposition processing. The speaker 164 provides the user of the broadcast reception device 100 with the audio information output from the audio selector 162.

The extended interface unit 124 is an interface group for extending the function of the broadcast reception device 100, and includes a video/audio interface, a universal serial bus (USB) interface, and a memory interface, etc. in the present embodiment. The video/audio interface performs: an input(s) of video data/audio data from an external video/audio output device; an output(s) of video data/audio data to an external video/audio input device; and the like. The USB interface is connected to a PC etc. so as to transmit and receive various types of data. Instead of the storage unit 110, an HDD may be connected so as to record a program content of a broadcast program or various types of content acquired from the network. A keyboard or a different USB device may be connected thereto. The memory interface is connected to a memory card or a different memory medium so as to transmit and receive data.

The operation input unit 170 is an instruction input unit that inputs an operation instruction with respect to the broadcast reception device 100 and, in the present embodiment, includes: a remote controller reception unit that receives a command transmitted from a remote controller not illustrated; and an operation key in which button switches are arranged. Only any of them may be adopted. A touch panel disposed to be overlaid on the video display unit 163 may be used instead thereof.

The broadcast reception device 100 may be: an optical disc drive recorder such as a digital versatile disc (DVD); a magnetic disk drive recorder such as an HDD recorder; a set top box (STB); or the like besides the TV receiver. It may be a personal computer (PC), a tablet terminal, or a game machine, etc. having the digital-broadcasting reception function and the broadcast-communication cooperation function. Incidentally, they may have no broadcast-communication cooperation function. The broadcast reception device 100 may have, if being the DVD recorder, the HDD recorder, the STB, or the like, a video output unit and an audio output unit instead of the video display unit 163 and the speaker 164. If an external monitor and an external speaker are connected to the video output unit and the audio output unit, an operation similar to that of the broadcast reception device 100 according to the present embodiment can be made.

[Software Configuration of Broadcast Reception Device]

Figure 2B:
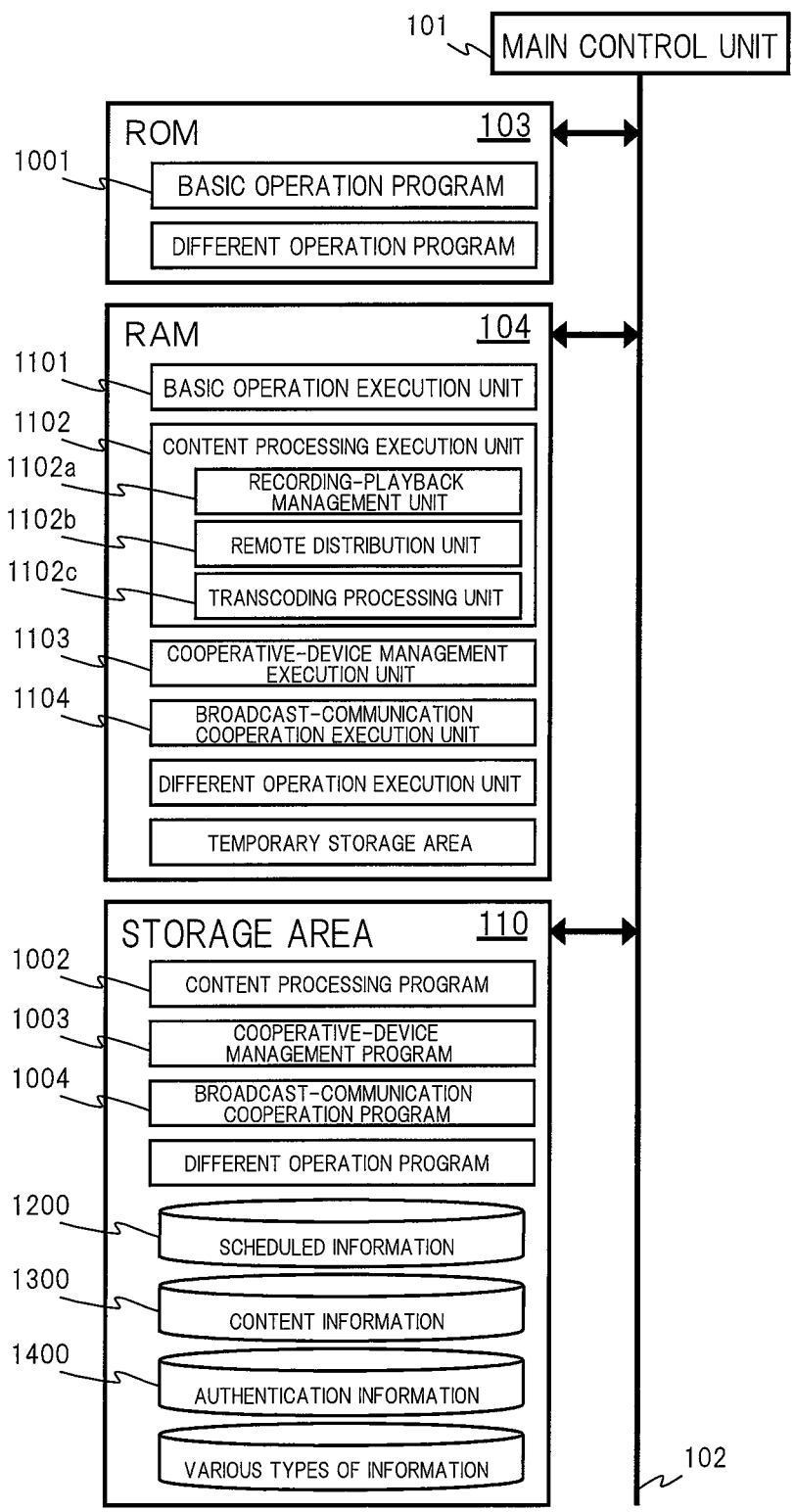
FIG. 2B is a software configuration diagram of the broadcast reception device according to the first embodiment.

FIG. 2B is a software configuration diagram of the broadcast reception device 100 according to the present embodiment, and illustrates software configurations of the ROM 103, the RAM 104, and the storage unit 110. According to the present embodiment, the ROM 103 stores a basic operation program 1001 and a different operation program. The storage unit 110 stores a content processing program 1002, a cooperative-device management program 1003, a broadcast-communication cooperation program 1004, and a different operation program. The storage unit 110 includes: a scheduled-information storage area 1200 for storing information etc. on a recording schedule and a viewing schedule of the broadcast program; a content-information storage area 1300 for storing, as a recording content, a program content acquired from the broadcast wave or the video content acquired from each server device on the network and for further managing information etc. on the recording content, an authentication-information storage area 1400 for storing identification information and authentication information etc. on the portable terminal 700 capable of a cooperative operation with the broadcast reception device 100 and on the service provider server 400 that achieves a content distribution service etc.; and a various-types-of-information storage area for storing various types of different information.

The basic operation program 1001 stored in the ROM 103 is expanded into the RAM 104, and furthermore the main control unit 101 executes the expanded basic operation program so that a basic operation execution unit 1101 is configured. A content processing program 1002, a cooperative-device management program 1003, and a broadcast-communication cooperation program 1004 stored in the storage unit 110 are each expanded into the RAM 104, and furthermore the main control unit 101 executes the respective operation programs that have been expanded, so that a content processing execution unit 1102, a cooperative-device management execution unit 1103, and a broadcast-communication cooperation execution unit 1104 are configured. The RAM 104 includes a temporary storage area for temporarily retaining, as the need arises, data produced in executing each operation program.

Incidentally, in order to simplify the descriptions below, a processing, in which the main control unit 101 expands, into the RAM 104, the basic operation program 1001 stored in the ROM 103 and executes it to control each operation block, is described as the control of each operation block by the basic operation execution unit 1101. The different operation program is also similarly described.

The content processing execution unit 1102 mainly controls a demultiplexing processing and a decoding processing of each data stream with respect to the TS of the program content acquired from the broadcast wave, the PS of the video content acquired from each server device on the network, and the like, and a superimposition processing and a selection processing, etc. in the video superimposition unit 161 and the audio selector 162. A recording-playback management unit 1102a performs: control of an operation of scheduled recording based on a scheduled information table stored in the scheduled-information storage area 1200, and an operation of manual recording in currently viewing the broadcast program; management of a recording content, and recording-content related information based on a recorded-program information table stored in the content-information storage area 1300; control of a playback processing of the recording content; and the like. A remote distribution unit 1102b controls, to the portable terminal 700 etc., remote distribution of: the program content of the broadcast program selected by the tuner/demodulator 131; and the recording content or the recording-content related information stored in the content-information storage area 1300. A transcoding processing unit 1102c controls a transcoding processing function of the content processing unit 151. Specifically, the transcoding processing unit 1102c performs an arithmetic operation in converting the encoding format and the bit rate, etc. of the program content acquired from the broadcast wave and the recording content stored in the content-information storage area 1300.

The cooperative-device management execution unit 1103 manages information on the portable terminal 700 capable of the cooperation with the broadcast-communication cooperation function or the remote viewing function and on the service provider server 400, and controls an authentication processing based on a server registration information table and a cooperative-device registration information table stored in the authentication-information storage area 1400. The broadcast-communication cooperation execution unit 1104 controls the application control unit 143 and the application engine 144 in order to acquire and execute a broadcast-communication cooperation application based on the description of the AIT according to the broadcast-communication cooperation function.

The ROM 103 and/or the storage unit 110 may have previously stored the respective operation programs, at a time when a product is shipped. After the product is shipped, the respective operation programs may be acquired from the different application server 500 etc. on the Internet 200 through the LAN communication unit 121. The respective operation programs stored in a memory card or an optical disc, etc. may be acquired through the extended interface unit 124 etc.

FIG. 2C is a conceptual diagram for describing an example of a data format of the scheduled information table stored in the scheduled-information storage area 1200. The scheduled information table includes information on a reference number 1201 broadcast-date information 1202, broadcast-time information 1203, broadcast-channel information 1204, broadcast-program title information 1205, repetition flag 1206, recording/viewing mode 1207, recording-destination information 1208, recorder selection information 1209, and a recording method 1210, etc. Different information may be further included.

The reference number 1201 is used for managing each piece of scheduled information stored in the scheduled information table. The broadcast-date information 1202, the broadcast-time information 1203, the broadcast-channel information 1204, and the broadcast-program title information 1205 are information relating to date and time, a channel and a program title when a broadcast program as a target to be scheduled is broadcasted. The repetition flag 1206 is a graph indicating whether a recording processing or a viewing processing of the broadcast program to be scheduled repeats every week or every day. The recording/viewing mode 1207 is mode setting information on whether a processing performed based on the scheduled information is the scheduled recording processing or the scheduled viewing processing, and additionally on what recording mode is used for performing the scheduled recording processing when the scheduled recording processing is performed. The recording-destination information 1208 is information on what storage (the storage unit 110, a USB HDD connected to the extended I/F unit 124, or the like) is used to record information on a broadcast program as a target to be recorded when the scheduled recording processing is performed. The recorder selection information 1209 is selection information on which an operation block performs the scheduled recording processing to each of the recorded-targeted broadcast programs in a case etc. where a plurality of the broadcast programs to be recorded is present during the same time period. When the recording processing is performed to the recorded-targeted broadcast program, the recording method 1210 is setting information on whether both of a program content and program related information are recorded in the storage or only the program related information is recorded in the storage except the program content.

FIG. 2D is a conceptual diagram for describing an example of a data format of the recorded-program information table stored in the content-information storage area 1300. The recorded-program information table includes a reference number 1301, recording-date information 1302, recording-time information 1303, recording-program channel information 1304, recording-program title information 1305, recording mode information 1306, recording-location information 1307, program identification information 1308, program-storage location information 1309, viewing information 1310, and resume information 1311. Different information may be further included.

The reference number 1301 is used for managing each piece of recording-program information stored in the recorded-program information table. The recording-date information 1302 and the recording-time information 1303 are information relating to date and time when a recording processing of an already recorded program is performed. The recording-program channel information 1304 and the recording-program title information 1305 are information relating to a broadcast channel and a program title of the already recorded program. The recording mode information 1306 is mode setting information indicating which recording mode has been used for performing the recording processing to the already recorded program. The recording-location information 1307 is directory information for prescribing, on the storage, a storage location of program related information on the already recorded program. The program identification information 1308 is a unique identification number for identifying a video content relating to the already recorded program by a content server on the network. The program-storage location information 1309 is identification information such as a uniform resource locator (URL) or an Internet protocol (IP) address, for identifying, on the network, the content server that stores the video content relating to the already recorded program. Directory information indicating a storage location of the video content in the content server may be added thereto. When the program content of the already recorded program is stored in the storage, the storage may be identification information capable of identification. The viewing information 1310 is information indicating whether the already recorded program has not been viewed yet. The resume information 1311 is information indicating whether the already recorded program has been resumed during playback.

FIG. 2E is a conceptual diagram for describing an example of a data format of the server registration information table stored in the authentication-information storage area 1400. The server registration information table includes a reference number 1401, server name information 1402, URL information 1403, login name information 1404, password information 1405, registration state information 1406, and expiration date information 1407. Different information may be further included.

The reference number 1401 is used for managing each piece of server registration information stored in the server registration information table. The server name information 1402 is information relating to a server name of the content server (e.g., the service provider server 400 etc. in the present embodiment) that provides a video content relating to a broadcast program in the digital broadcasting service through the network. The URL information 1403 is URL information on the content server. The login name information 1404 and the password information 1405 are user identification information and a password for accessing the content server, respectively. The registration state information 1406 is information indicating a registration state of the user with respect to the content server. The expiration date information 1407 is information relating to a period during which the user has an access authority with respect to the content server.

FIG. 2F is a conceptual diagram for describing an example of a data format of the cooperative-device registration information table stored in the authentication-information storage area 1400. The cooperative-device registration information table includes a reference number 1451, cooperative-device name information 1452, cooperative-device address information 1453, login ID information 1454, password information 1455, and registration date information 1456. Different information may be further included.

The reference number 1451 is used for managing each piece of cooperative-device registration information stored in the cooperative-device registration information table. The cooperative-device name information 1452 is information relating to a device name of a cooperative device (the portable terminal 700 etc. in the present embodiment) capable of a cooperative operation with the broadcast reception device 100. The cooperative-device address information 1453 is unique identification information, such as a media access control (MAC) address, with which the cooperative device can be identified on the network. The login ID information 1454 and the password information 1455 are user identification information and a password used by a user of the cooperative device in order to make the cooperative device cooperate with the broadcast reception device 100. The registration date information 1456 is information relating to a date on which the cooperative-device registration information is registered in the cooperative-device registration information table. The information may be updated every time access is made by the cooperative device.

[Configuration of Broadcasting-Station Server]

Figure 3:
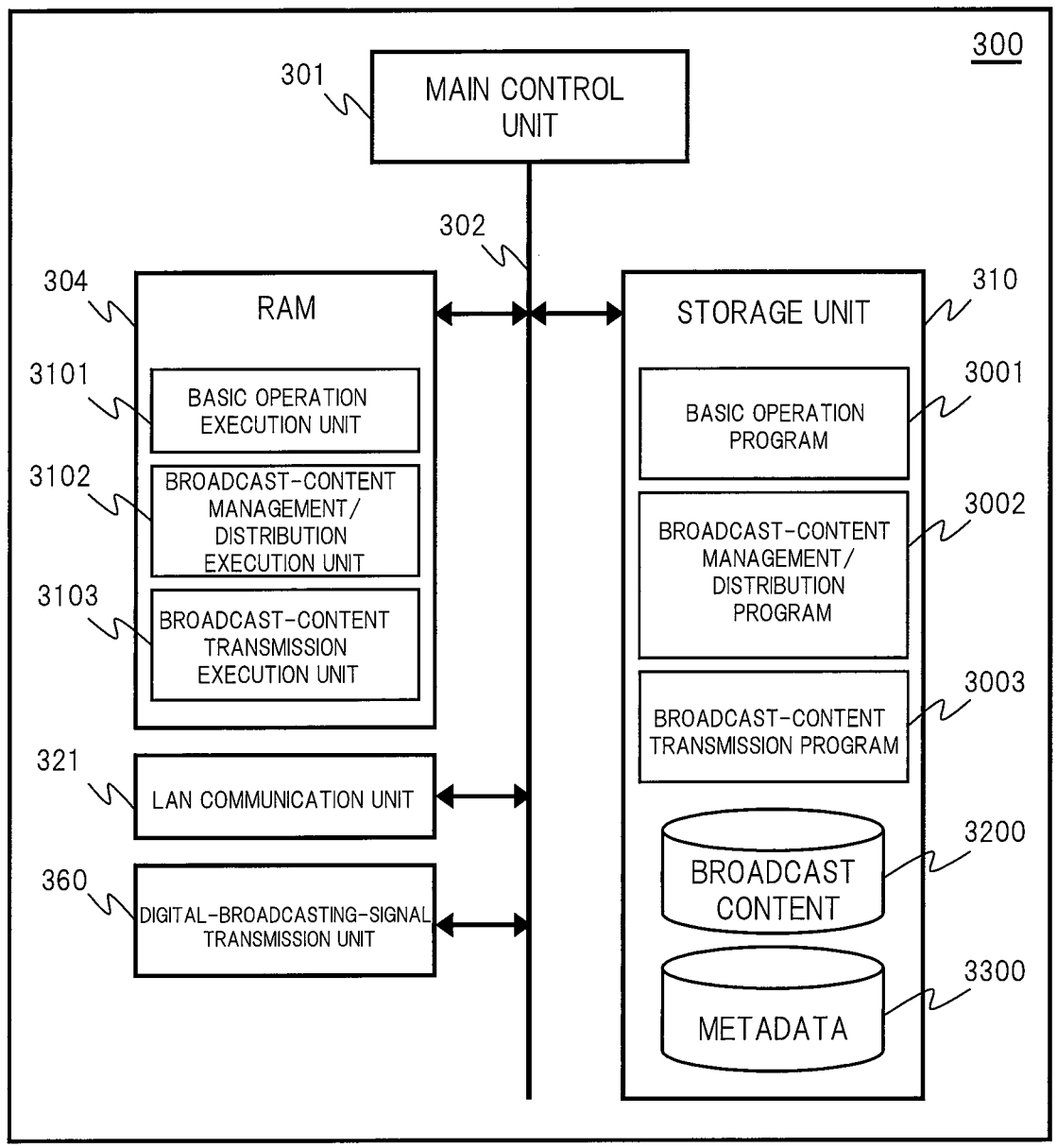
FIG. 3 is a block diagram of a broadcasting-station server according to the first embodiment.

FIG. 3 is a block diagram showing an example of an internal configuration of the broadcasting-station server 300. The broadcaster server 300 includes a main control unit 301, a system bus 302, RAM 304, a storage unit 310, a LAN communication unit 321, and a digital-broadcasting-signal transmission unit 360.

The main control unit 301 is a microprocessing unit that controls the entire broadcasting-station server 300 in accordance with a predetermined operation program. The system bus 302 is a data channel for performing data transmission/reception between the main control unit 301 and each operation block in the broadcasting-station server 300. The RAM 304 is to be a work area in executing each operation program.

The storage unit 310 stores a basic operation program 3001, a broadcast-content management/distribution program 3002, and a broadcast-content transmission program 3003, and further includes a broadcast-content storage area 3200 and a metadata storage area 3300. The broadcast-content storage area 3200 stores a program content etc. of each broadcast program broadcasted by the broadcaster. The metadata storage area 3300 stores metadata including a program title, a program ID, a program outline, performers, and broadcast date and time, for each of the broadcast programs.

The basic operation program 3001, the broadcast-content management/distribution program 3002, and the broadcast-content transmission program 3003 stored in the storage unit 310 are individually expanded into the RAM 304, and furthermore the main control unit 301 executes the respective expanded programs, so that a basic operation execution unit 3101, a broadcast-content management/distribution execution unit 3102, and a broadcast-content transmission execution unit 3103 are configured, respectively.

Incidentally, in order to simplify the descriptions below, a processing, in which the main control unit 301 expands, into the RAM 304, the basic operation program 3001 stored in the storage unit 310 and executes it so as to control each operation block. is described as control of each operation block by the basic operation execution unit 3101. A different operation program is also similarly described.

The broadcast-content management/distribution execution unit 3102 performs: management of the program content etc. and each piece of the metadata of each broadcast program stored in the broadcast-content storage area 3200 and the metadata storage area 3300; and also control in providing the service provider with the program content and each piece of the metadata of each broadcast program based on a contract. Furthermore, the broadcast-content management/distribution execution unit 3102 may performs, as the need arises, an authentication processing etc. of the service provider server 400 based on the contract when the program content etc. and each piece of the metadata of each broadcast program are provided to the service provider.

The broadcast-content transmission execution unit 3103 performs time schedule management etc. in transmitting the program content etc. of the broadcast program stored in the broadcast-content storage area 3200 from the radio wave tower 300*t* through the digital-broadcasting-signal transmission unit 360.

The LAN communication unit 321 is connected to the Internet 200, and communicates with the service provider server 400 etc. on the Internet 200. The LAN communication unit 321 includes an encode circuit and a decode circuit. The digital-broadcasting-signal transmission unit 360 modulates a TS including a video data stream, an audio data stream, a program information data stream, and an AIT data stream, etc. of the program content etc. of each broadcast program stored in the broadcast-content storage area 3200, and transmits it as a digital broadcast wave through the radio wave tower 300*t*.

[Configuration of Service Provider Server]

Figure 4A:
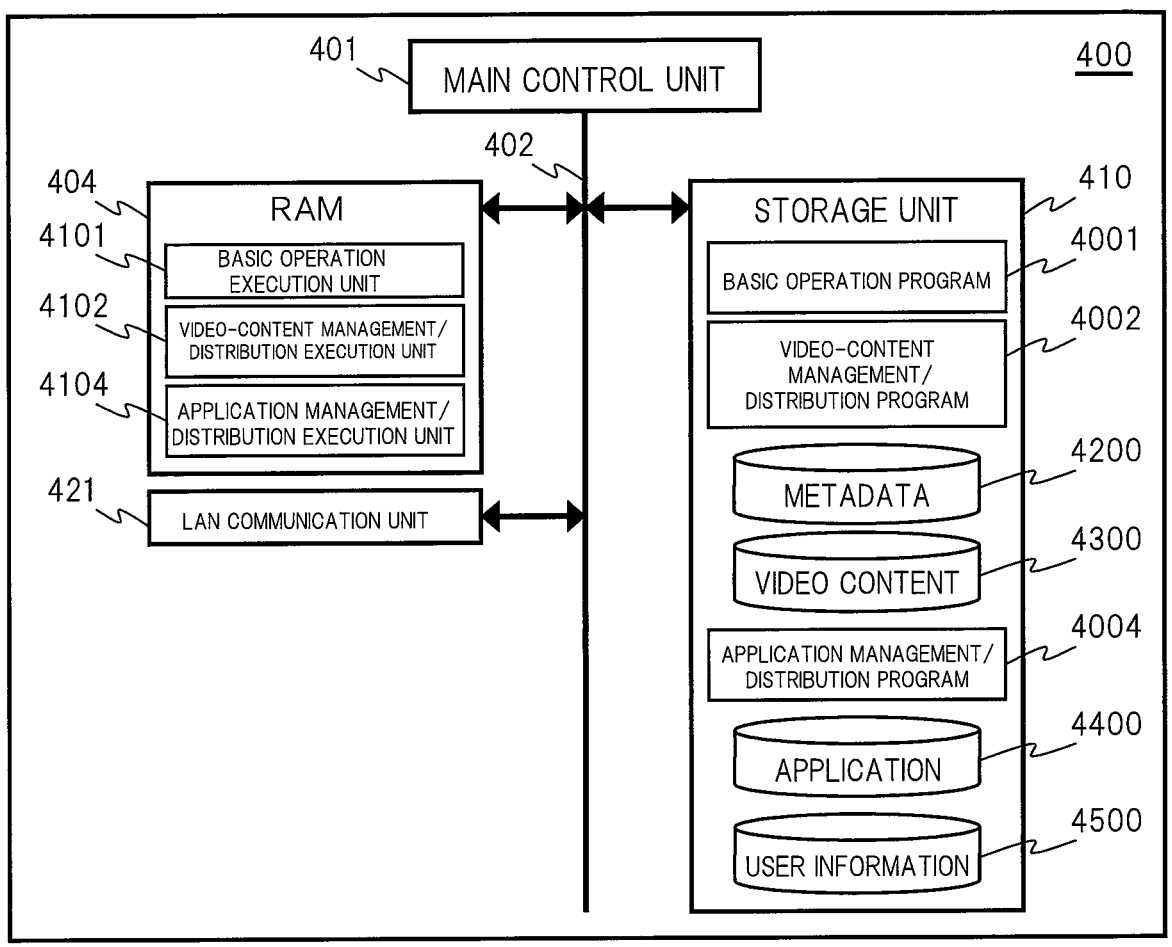
FIG. 4A is a block diagram of a service provider server according to the first embodiment.

FIG. 4A is a block diagram showing an example of an internal configuration of the service provider server 400. The service provider server 400 includes a main control unit 401, a system bus 402, a RAM 404, a storage unit 410, and a LAN communication unit 421.

The main control unit 401 is a microprocessing unit that controls the entire service provider server 400 in accordance with a predetermined operation program. The system bus 402 is a data channel for performing data transmission/reception between the main control unit 401 and each operation block in the service provider server 400. The RAM 404 is to be a work area in executing each operation program.

The storage unit 410 stores a basic operation program 4001, a video-content management/distribution program 4002, and an application management/distribution program 4004, and further includes a metadata storage area 4200, a video-content storage area 4300, an application storage area 4400, and a user-information storage area 4500. The metadata storage area 4200 stores each of piece of the metadata provided from the broadcasting-station server 300, metadata relating to a video content produced by the service provider, and the like. The video-content storage area 4300 stores, as a video content, a program content of a broadcast program provided from the broadcasting-station server 300. The video content etc. produced by the service provider are also stored. The application storage area 4400 stores an application which is distributed in response to a request from each TV receiver and which is necessary for realizing each service of the broadcast-communication cooperation system. The user-information storage area 4500 stores information etc. on a user allowed to access to the service provider server 400.

The basic operation program 4001, the video-content management/distribution program 4002, and the application management/distribution program 4004 stored in the storage unit 410 are respectively expanded into the RAM 404, and furthermore the main control unit 401 executes the basic operation program, the video-content management/distribution program, and the application management/distribution program that have been expanded, so that a basic operation execution unit 4101, a video-content management/distribution execution unit 4102, and an application management/distribution execution unit 4104 are configured.

Incidentally, in order to simplify the descriptions below, a processing, in which the main control unit 401 expands, into the RAM 404, the basic operation program 4001 stored in the storage unit 410 and executes it so as to control each operation block, is described as control of each operation block by the basic operation execution unit 4101. The different operation program is also similarly described.

The video-content management/distribution execution unit 4102 controls: acquisition of the program content etc. and the metadata of the broadcast program from the broadcasting-station server 300; management of the video content etc. and each piece of the metadata stored in the video-content storage area 4300 and the metadata storage area 4200; and distribution of the video content and each piece of the metadata to each TV receiver. Furthermore, the video-content management/distribution execution unit 4102 may perform, as the need arises, an authentication processing etc. to the respective TV receivers in distributing the video content etc. and each piece of the metadata to the respective TV receivers. The application management/distribution execution unit 4104 performs: management of each application stored in the application storage area 4400; and control in distributing the respective applications in response to a request from the respective TV receivers. Furthermore, the application management/distribution execution unit 4104 may perform, as the need arises, an authentication processing etc. to the respective TV receivers in distributing the respective applications to the respective TV receivers.

The LAN communication unit 421 is connected to the Internet 200, and communicates with the broadcasting-station server 300 on the Internet 200 and with the broadcast reception device 100 through the router device 200*r*. The LAN communication unit 421 includes an encode circuit and a decode circuit, etc.

FIG. 4B is a conceptual diagram for describing an example of a data format of a content information table stored in the metadata storage area 4200. The content information table is configured by information including a reference number 4201, program identification information 4202, content-storage location information 4203, a content name 4204, content title information 4205, content broadcast-date information 4206, content broadcast-time information 4207, content outline information 4208, and the like. Different information may be further included.

The reference number 4201 is used for managing each piece of content information stored in the content information table. The program identification information 4202 is a unique identification number for identifying each piece of video content in the service provider server 400. The content-storage location information 4203 is directory information for prescribing a storage location of each piece of the video content in the video-content storage area 4300. The content name 4204 is a file name of each piece of the video content. The content title information 4205, the content broadcast-date information 4206, the content broadcast-time information 4207, and the content outline information 4208 are information relating to a title, broadcast date and time, and a program outline of each video content identified by the program identification information 4202.

Figure 4C:
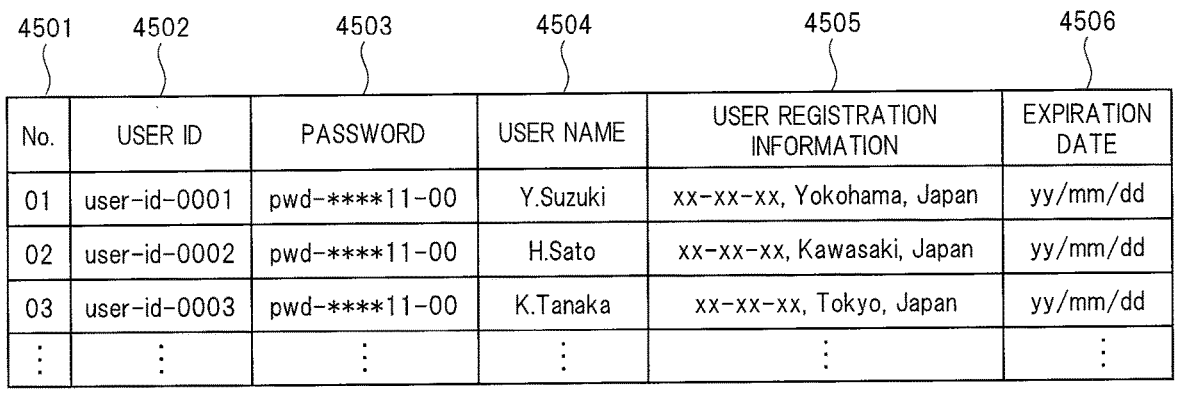
FIG. 4C is a conceptual diagram for describing a data format of a user information table according to the first embodiment.

FIG. 4C is a conceptual diagram for describing an example of a data format of a user information table stored in the user-information storage area 4500. The user information table is configured by information including a reference number 4501, user identification information 4502, password information 4503, user name information 4504, user registration information 4505, expiration date information 4506, and the like. Different information may be further included.

The reference number 4501 is used for managing each piece of user information stored in the user information table. The user identification information 4502 is unique identification information for identifying a user that is allowed to access the service provider server 400. The password information 4503 is a password registered by the user to access the service provider server 400. The user name information 4504 and the user registration information 4505 are information on a user name, an address, a zip code, a phone number, a credit card number, and the like registered by the user. The expiration date information 4506 is information relating to an expiration date until which the user is allowed to access the service provider server 400.

Figure 4D:
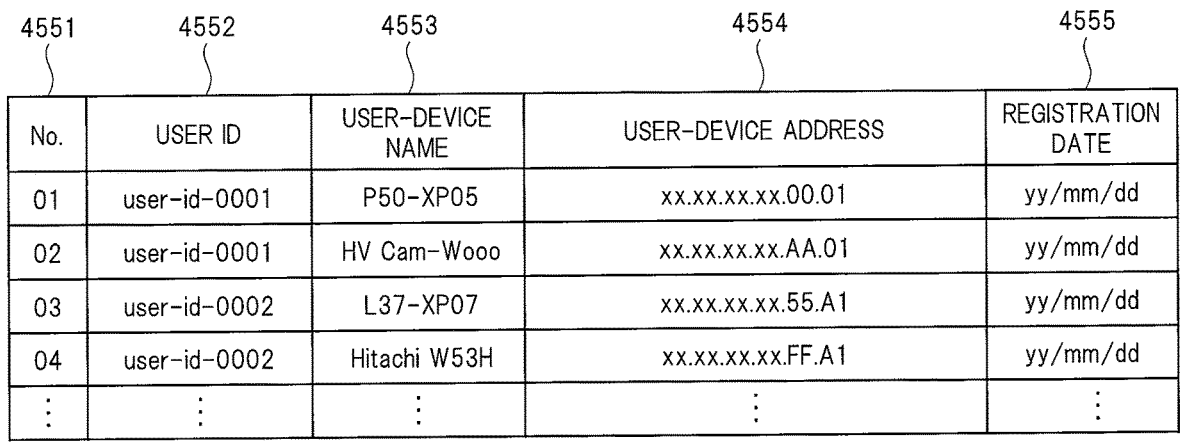
FIG. 4D is a conceptual diagram for describing a data format of a user-device information table according to the first embodiment.

FIG. 4D is a conceptual diagram for describing an example of a data format of a user-device information table stored in the user-information storage area 4500. The user-device information table is configured by information including a reference number 4551, user identification information 4552, user-device name information 4553, user-device address information 4554, registration date information 4555, and the like. Different information may be further included.

The reference number 4551 is used for managing each piece of user-device information stored in the user-device information table. The user identification information 4552 corresponds to the user identification information 4502 stored in the user information table. The user-device name information 4553 is information relating to a name of a user device used in order that the user identified by the user identification information 4552 accesses the service provider server 400. Incidentally, the number of the user devices that can be registered by one user may be restricted. For example, in the present embodiment, the restriction number is set at "2". The user-device address information 4554 is unique identification information which can identify the user device on the network, for example, information like a MAC address. The registration date information 4555 is information relating to a date on which the user registers the user device into the user-device information table.

[Hardware Configuration of Portable Terminal]

Figure 5A:
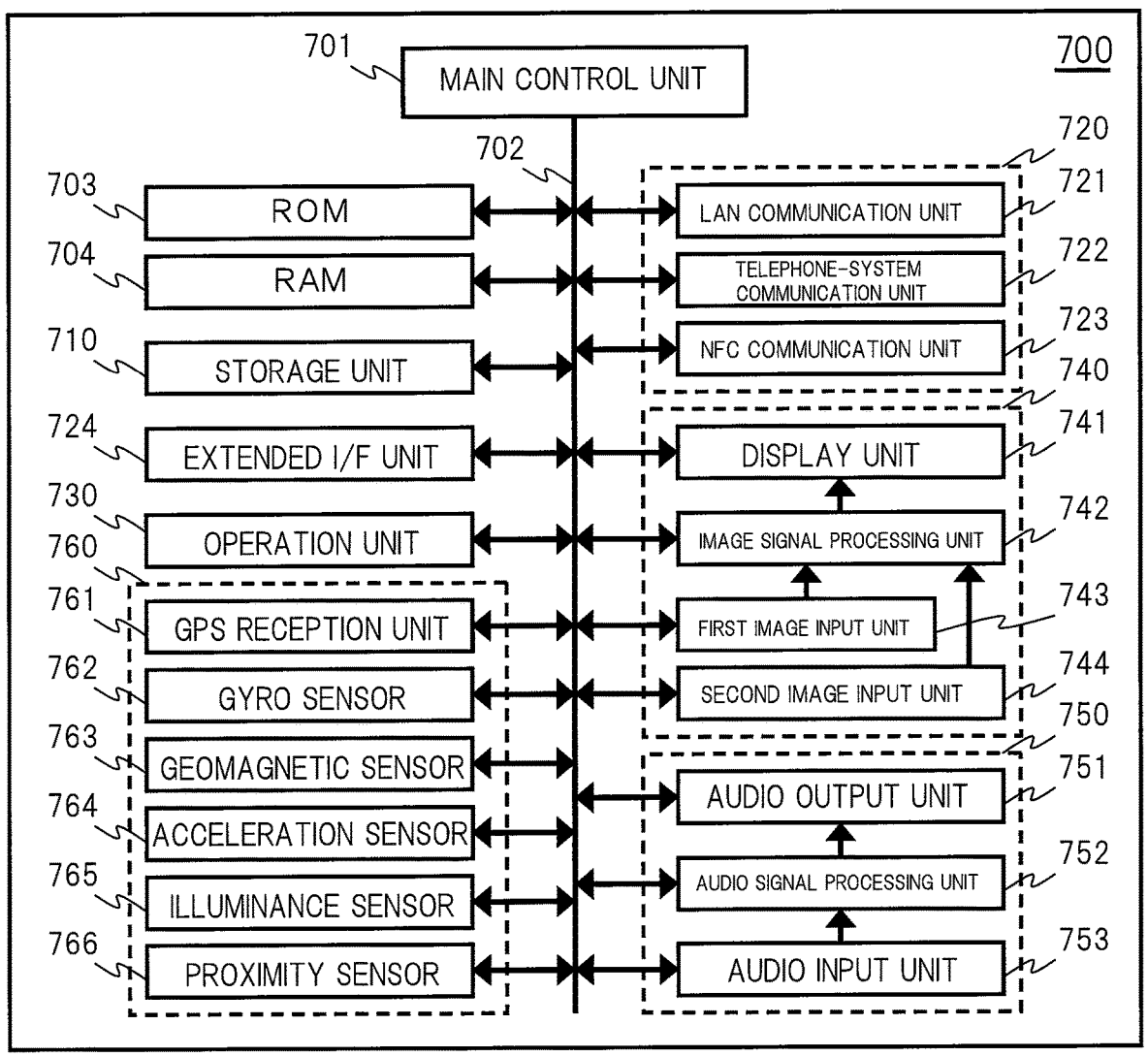
FIG. 5A is a block diagram of a portable terminal according to the first embodiment.

FIG. 5A is a block diagram showing an example of an internal configuration of the portable terminal 700. The portable terminal 700 includes a main control unit 701, a system bus 702, a ROM 703, a RAM 704, a storage unit 710, a communication processing unit 720, an extended interface unit 724, an operation unit 730, an image processing unit 740, an audio processing unit 750, and a sensor unit 760.

The main control unit 701 is a microprocessing unit that controls the entire portable terminal 700 in accordance with a predetermined operation program. The system bus 702 is a data channel for performing data transmission/reception between the main control unit 701 and each operation block in the portable terminal 700.

The ROM 703 is a memory storing a basic operation program, such as an operating system, and a different operation program, and, for example, a rewritable ROM, such as an EEPROM or a flash ROM, is used. The RAM 704 is to be a work area in executing the basic operation program and the different operation program. The ROM 703 and the RAM 704 may be provided integrally with the main control unit 701. Instead of an independent configuration as illustrated in FIG. 5A, a partial storage area in the storage unit 710 may be used for the ROM 703.

The storage unit 710 stores: an operation program and an operation setting value of the portable terminal 700; personal information on a user of the portable terminal 700; and the like. An operation program downloaded from the network, various types of data produced by the operation program, and the like can be also stored. A content such as a moving image, a still image, or audio downloaded from the network, can be also stored. A partial area of the storage unit 710 may be substituted for an entirety or a part of a function of the ROM 703. The storage unit 710 is required to retain information that has been stored even in a state where no power has been supplied from outside to the portable terminal 700. Therefore, a semiconductor memory such as a flash ROM or an SSD, or a magnetic disk drive, such as an HDD is used.

Incidentally, each operation program stored in the ROM 703 and the storage unit 710, can be updated and functionally extended by a download processing from each server device on the Internet 200.

The communication processing unit 720 includes a LAN communication unit 721, a mobile-telephone-system communication unit 722, and an NFC communication unit 723. The LAN communication unit 721 is connected to the Internet 200 through the access point 200a outside the user house or the router device 200r in the user house, and performs data transmission/reception to/from each server device on the Internet 200. The connection with the access point 200a or the router device 200r is made through radio connection such as Wi-Fi. The mobile-telephone-system communication unit 722 makes a telephone communication (a telephone call) and performs data transmission/reception through radio communication with the base station 600b of the mobile telephone communication system. The NFC communication unit 723 performs radio communication in proximity to a corresponding reader/writer. Each of the LAN communication unit 721, the mobile-telephone-system communication unit 722, and the NFC communication unit 723 includes an encode circuit, a decode circuit, and an antenna, etc. The communication processing unit 720 may further include a different communication unit such as a BlueTooth communication unit or an infrared communication unit.

The extended interface unit 724 is an interface group for extending the function of the portable terminal 700, and includes a video/audio interface, a USB interface, and a memory interface, etc. in the present embodiment. The video/audio interface performs an input of a video signal/audio signal from an external video/audio output device, an output of a video signal/audio signal to an external video/audio input device, and the like. The USB interface is connected to a PC etc. so as to perform data transmission/reception. A keyboard or a different USB device may be coupled. The memory interface is connected to a memory card or a different memory medium so as to perform data transmission/reception.

The operation unit 730 is an instruction input unit that inputs an operation instruction with respect to the portable terminal 700, and includes a touch panel 730t disposed to be overlaid on a display unit 741, and an operation key 730k in which button switches are arranged, in the present embodiment. Only any of them may be included. A keyboard etc. connected to the extended interface unit 724 may be used so as to operate the portable terminal 700. A separate portable terminal device connected through wired communication or radio communication, may be used so as to operate the portable terminal 700. The display unit 741 may have the touch panel function.

The image processing unit 740 includes the display unit 741, an image signal processing unit 742, a first image input unit 743, and a second image input unit 744. The display unit 741 is a display device such as a liquid crystal panel, and provides the user of the portable terminal 700 with image data processed by the image signal processing unit 742. The image signal processing unit 742 includes a video RAM not illustrated, and drives the display unit 741 based on the image data inputted into the video RAM. The image signal processing unit 742 has, as the need arises, a function of performing format conversion and a superimposition processing of a menu and a different OSD signal. The first image input unit 743 and the second image input unit 744 are each a camera unit that converts light inputted from a lens into an electrical signal by using an electronic device such as a charge coupled device (CCD) sensor or a complementary metal oxide semiconductor (CMOS) sensor so as to input image data about their periphery and object.

The audio processing unit 750 includes an audio output unit 751, an audio signal processing unit 752, and an audio input unit 753. The audio output unit 751 is a speaker, and provides the user of the portable terminal 700 with an audio signal processed by the audio signal processing unit 752. The audio input unit 753 is a microphone, and converts a voice of the user into audio data so as to input the audio data.

The sensor unit 760 is a sensor group for detecting a state of the portable terminal 700, and includes a global positioning system (GPS) reception unit 761, a gyro sensor 762, a geomagnetic sensor 763, an acceleration sensor 764, an illuminance sensor 765, and a proximity sensor 766 in the present embodiment. The sensor group can detect: a position, inclination, a direction, and a movement of the portable terminal 700; brightness of the periphery; a proximate combination of a peripheral object; and the like. The portable terminal 700 may further include a different sensor such as a barometric sensor.

The portable terminal 700 may be a portable phone, a smartphone, or a tablet terminal, or the like. It may be a personal digital assistant (PDA), a laptop PC, or an electronic book reader, or the like. Additionally, it may be a digital still camera, a video camera capable of capturing a moving image, a portable game machine, a navigation device, or the like, or a different portable digital device.

Incidentally, the configuration example of the portable terminal 700 illustrated in FIG. 5A includes a large number of constituents unnecessary for the present embodiment, for example, such as the sensor unit 760 etc., but an effect of the present embodiment is unchanged even if the present embodiment does not have such constituents. A constituent such as an electronic money payment function not illustrated may be further included.

[Software Configuration of Portable Terminal]

Figure 5B:
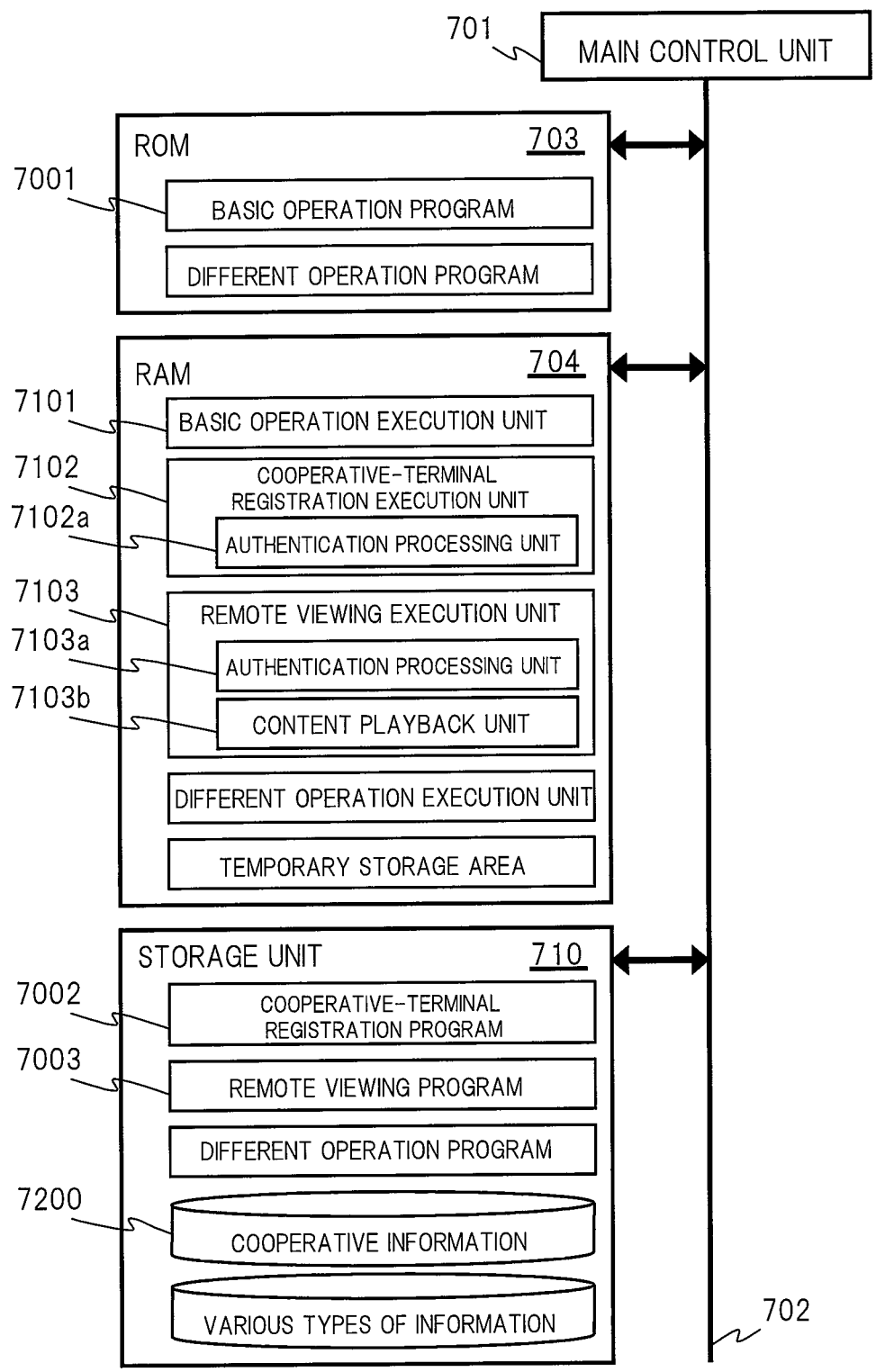
FIG. 5B is a software configuration diagram of the portable terminal according to the first embodiment.

FIG. 5B is a software configuration diagram of the portable terminal 700 according to the present embodiment, and illustrates software configurations of a ROM 703, a RAM 704, and a storage unit 710. According to the present embodiment, the ROM 703 stores a basic operation program 7001 and a different operation program. The storage unit 710 stores a cooperative-terminal registration program 7002, a remote viewing program 7003, and a different operation program. The storage unit 710 includes: a cooperative-information storage area 7200 for storing information on the broadcast reception device capable of the cooperation with the broadcast-communication cooperation function or the remote viewing function; and a various-types-of-information storage area for storing various types of different information.

The basic operation program 7001 stored in the ROM 703 is expanded into the RAM 704, and furthermore the main control unit 701 executes the expanded basic operation program, thereby configuring a basic operation execution unit 7101. The cooperative-terminal registration program 7002 and the remote viewing program 7003 stored in the storage unit 710 are also expanded into the RAM 704, and furthermore the main control unit 701 executes the expanded cooperative-terminal registration program and the expanded remote viewing program, thereby configuring a cooperative-device registration execution unit 7102 and a remote viewing execution unit 7103. The RAM 704 includes a temporary storage area for temporarily retaining, as the need arises, data etc. produced in executing each operation program.

Incidentally, in order to simplify the descriptions below, a processing, in which the main control unit 701 expands, into the RAM 704, the basic operation program 7001 stored in the ROM 703 and executes it so as to control each operation block, is described as control of each operation block by the basic operation execution unit 7101. The different operation program is also similarly described.

The cooperative-terminal registration execution unit 7102 controls an operation of an initial registration processing when the portable terminal 700 is made to cooperate with the broadcast reception device 100 by the broadcast-communication cooperation function or the remote viewing function. The remote viewing execution unit 7103 controls an operation of the remote viewing function capable of viewing, by the portable terminal 700 outside the user house through the Internet 200, the digital broadcasting program received by the broadcast reception device 100 in the user house, and the already recorded content thereof.

The ROM 703 and/or the storage unit 710 may have previously stored the respective operation programs, at a time when a product is shipped. After the product is shipped, the respective operation programs may be acquired from the different application server 500 etc. on the Internet 200 through the LAN communication unit 721 or the mobile-telephone-system communication unit 722. The respective operation programs stored in a memory card or an optical disc may be acquired through the extended interface unit 724 etc.

FIG. 5C is a conceptual diagram for describing an example of a data format of a cooperative-device information table stored in the cooperative-information storage area 7200. The cooperative-device information table includes information on a reference number 7201, cooperative-device name information 7202, cooperative-device address information 7203, login ID information 7204, password information 7205, registration date information 7206, and priority-device information 7207, etc. Different information may be further included.

The reference number 7201 is used for managing each piece of cooperative-device information stored in the cooperative-device information table. The cooperative-device name information 7202 is information relating to a device name of a cooperative device (the broadcast reception device 100 in the present embodiment) capable of a cooperative operation with the portable terminal 700. The cooperative-device address information 7203 is unique identification information which can identify the cooperative device on the network, for example, information like a MAC address. The login ID information 7204 and the password information 7205 are user identification information and a password for logging in the cooperative device when the portable terminal 700 cooperates with the cooperative device. The registration date information 7206 is configured by information relating to a date on which the cooperative-device information is registered into the cooperative-device information table. The information may be updated every time access is made to the cooperative device. The priority-device information 7207 is information on which cooperative device a cooperative operation is performed to in priority when a plurality of pieces of cooperative-device information have been stored in the cooperative-device information table.

An operation of the broadcast reception device 100 according to the present embodiment will be described below.

[Operational Sequence in Server Registration Processing]

Figure 6A:
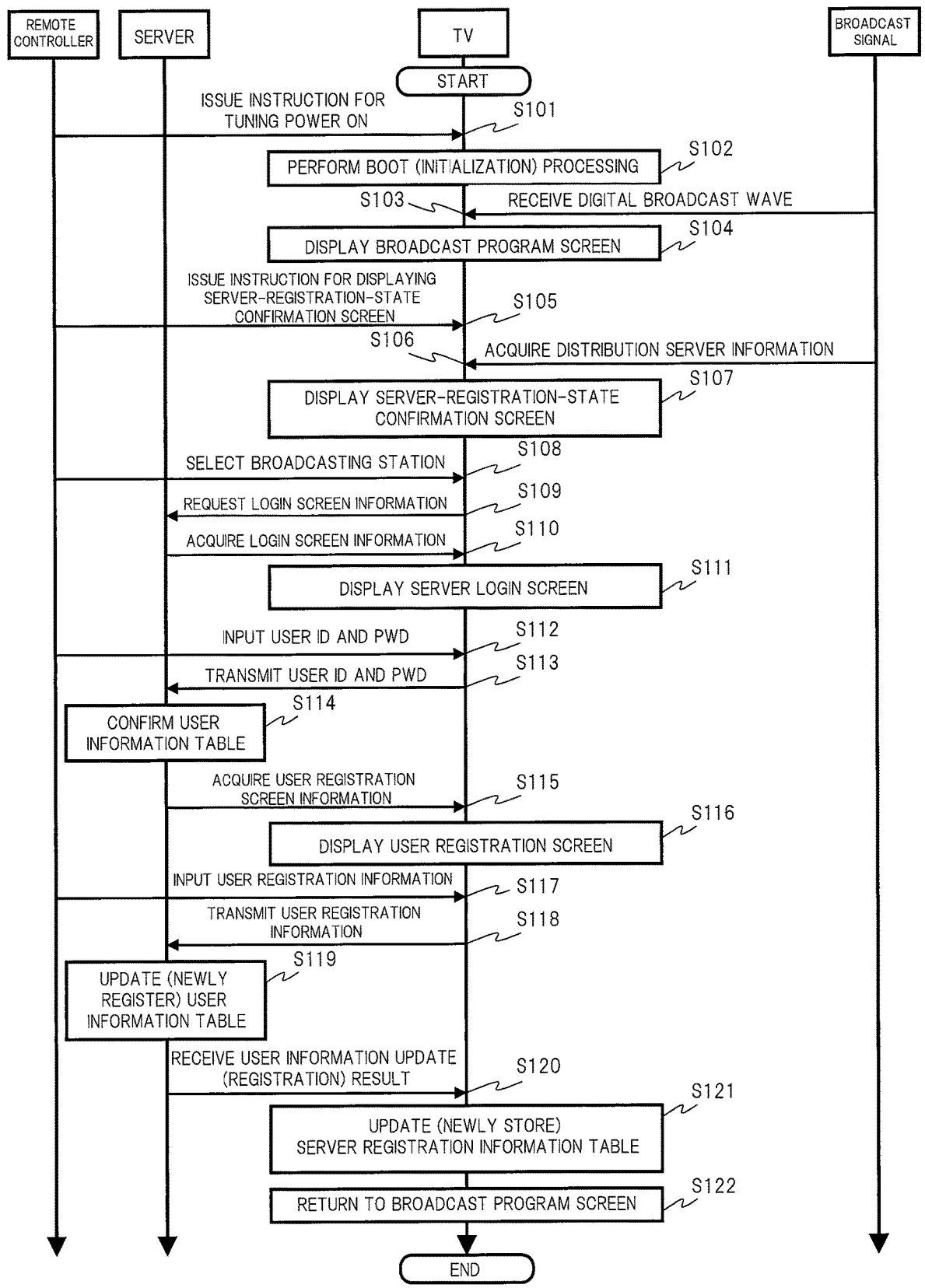
FIG. 6A is an operational sequence diagram of the broadcast reception device according to the first embodiment in a server registration processing.

First, described will be an operation of a server registration processing in the broadcast reception device 100 for using the content distribution service provided by the service provider server 400 in the broadcast reception device 100. FIG. 6A is an operational sequence diagram for describing an example of an operation of the server registration processing in the broadcast reception device 100 according to the present embodiment.

When the broadcast reception device 100 according to the present embodiment performs the server registration processing, the user first operates the not illustrated remote controller so as to issue the broadcast reception device 100 with an instruction for turning power on (S101). The broadcast reception device 100 that has received the power-on instruction from the remote controller controls the basic operation execution unit 1101 to perform a boot processing and an initialization processing (S102). Incidentally, the processings at S101 and S102 are unnecessary when the broadcast reception device 100 has already booted. When the boot processing and the initialization processing are completed, the content processing execution unit 1102 next controls: a processing of tuning to (selecting) a predetermined channel by receiving the digital broadcast wave in the tuner/demodulator 131; a processing of demodulating a modulated signal therein; and the like (S103). Furthermore, the content processing execution unit 1102 controls: the demultiplexing processing to each data stream in the demultiplexor 132; the decoding processing to a video data stream in the video decoder 133 and an audio data stream in the audio decoder 134; and the like, and outputs a video signal and an audio signal of a broadcast program from the video display unit 163 and the speaker 164 through the video superimposition unit 161 and the audio selector 162, respectively (S104).

Next, when the user operates the remote controller to issue an instruction for displaying a server-registration-state confirmation screen (S105), the cooperative-device management execution unit 1103 acquires distribution server information from the digital broadcast wave (S106). The distribution server information is information relating to the service provider server 400 that provides, through the network, the program content of the digital broadcasting service that can be received by the broadcast reception device 100, and includes: relationship information between the broadcaster and the service provider server 400; additional information on the URL of the service provider server 400 and the broadcasting station; and the like. The distribution server information may be included in PSI or SI. Furthermore, the cooperative-device management execution unit 1103 confirms the server registration information table stored in the authentication-information storage area 1400 of the storage unit 110, and displays the server-registration-state confirmation screen on the video display unit 163 (S107).

Figure 6B:
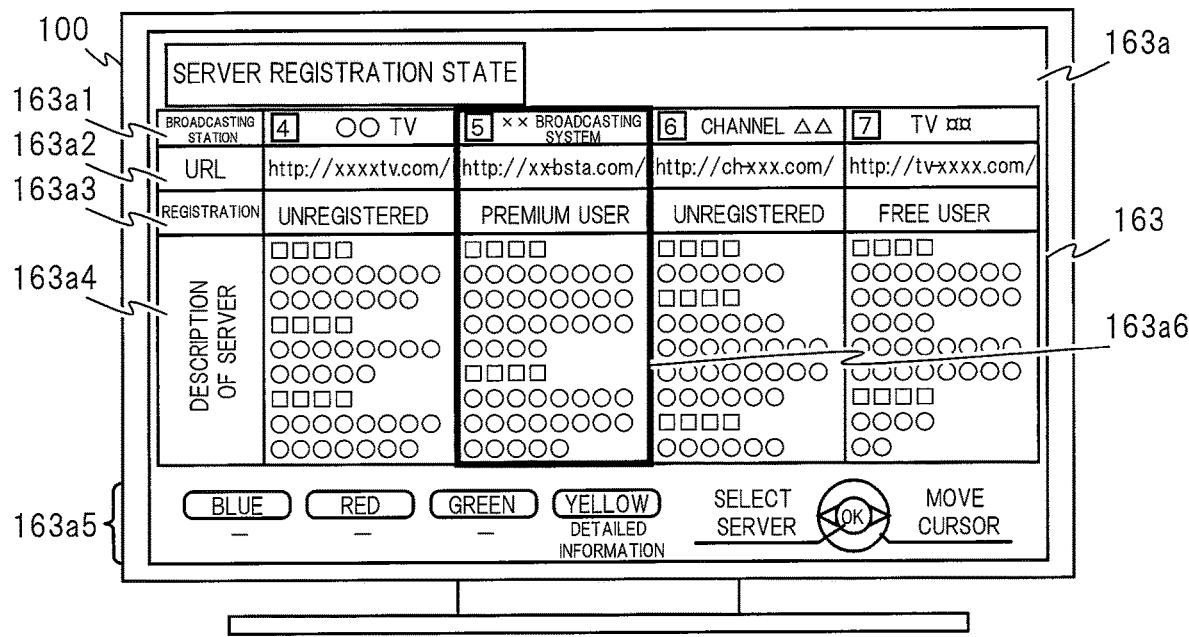
FIG. 6B is a screen display view of a server-registration-state confirmation screen of the broadcast reception device according to the first embodiment.

FIG. 6B is a screen display view for describing an example of the server-registration-state confirmation screen displayed by the processing at S107. The server-registration-state confirmation screen 163a displays: broadcasting-station name information 163a1 on the broadcasting station of the digital broadcasting service that can be received by the broadcast reception device 100; URL information 163a2 on the service provider server 400 that provides a video content relating to a broadcast program broadcasted by the broadcasting station through the network; registration state information 163a3 indicating whether the broadcast reception device 100 has been registered in the service provider server 400, and indicating a registration state when the registration has been already made; and additional information 163a4 on the broadcasting station. An operation guide 163a5 is displayed at a lower portion of the server-registration-state confirmation screen 163a. By operating a cursor key of the remote controller, a server selection cursor 163a6 can be moved. Furthermore, by pressing down an OK key of the remote controller, access can be made to the service provider server 400 according to the broadcasting station selected by the server selection cursor 163a6.

When the user operates the cursor key and the OK key of the remote controller on the server-registration-state confirmation screen 163a displayed by the processing at S107 of FIG. 6A to select a predetermined broadcasting station (S108), the cooperative-device management execution unit 1103 requests, through the LAN communication unit 121, the service provider server 400 according to the selected broadcasting station to transmit login screen information (S109). The service provider server 400, which has received the request for the transmission of the login screen information, transmits the login screen information to the broadcast reception device 100 based on control of the basic operation execution unit 4101. When the login screen information transmitted from the service provider server 400 is acquired (S110), the cooperative-device management execution unit 1103 displays a server login screen on the video display unit 163 (S111).

Figure 6C:
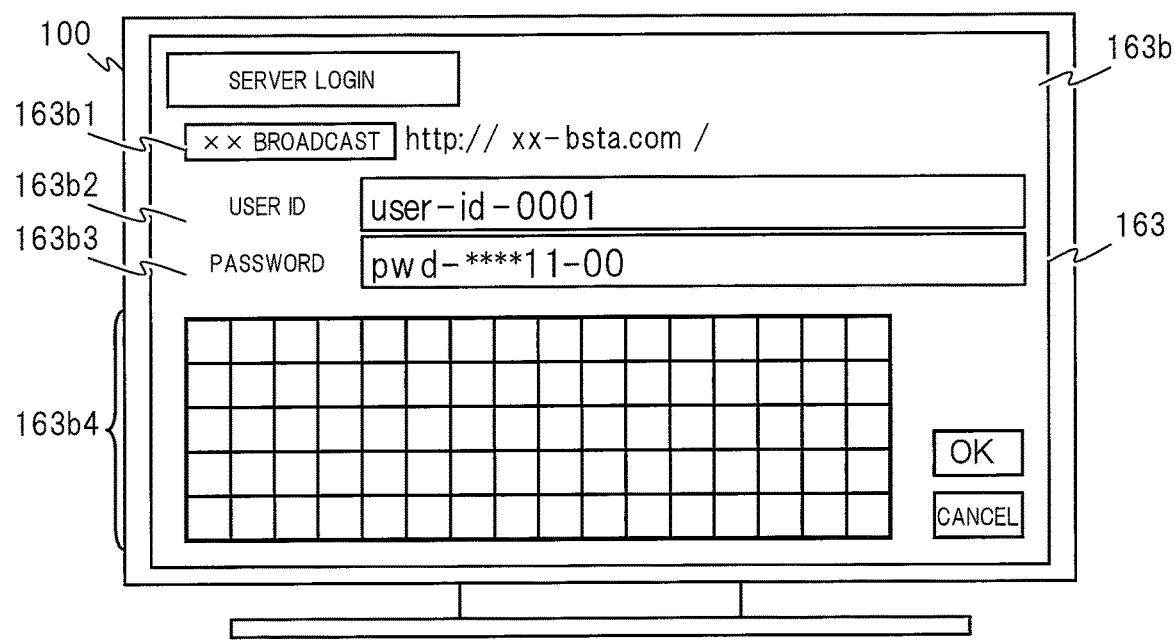
FIG. 6C is a screen display view of a server login screen of the broadcast reception device according to the first embodiment.

FIG. 6C is a screen display view for describing an example of the server login screen displayed by the processing at S111. The server login screen 163b includes: a broadcasting-station information display unit 163b1 indicating a broadcasting-station name of the broadcasting station selected by the processing at S108 and indicating the URL of the service provider server 400 according to the broadcasting station; a user identification information input unit 163b2; a password input unit 163b3; and a software keyboard unit 163b4. The operation of the software keyboard unit 163b4 by the remote controller can input user identification information and a password into the user identification information input unit 163b2 and the password input unit 163b3. Incidentally, the operation of the software keyboard unit 163b4 may be realized by a well-known technique, and thus the description thereof will be omitted.

On the server login screen 163b displayed by the processing at S111 of FIG. 6A, when the user operates the cursor key and the OK key of the remote controller so as to input the user identification information and the password into the user identification information input unit 163b2 and the password input unit 163b3 (S112), and further selects an "OK" key of the software keyboard unit 163b4 so that the cooperative-device management execution unit 1103 transmits the inputted user identification information and the inputted password to the service provider server 400 (S113). Based on the control of the basic operation execution unit 4101, the service provider server 400 that has received the user identification information and the password transmitted from the broadcast reception device 100 confirms the user information table stored in the user-information storage area 4500 of the storage unit 410 (S114), and transmits user registration screen information to the broadcast reception device 100. When the user registration screen information transmitted from the service provider server 400 is acquired (S115), the cooperative-device management execution unit 1103 displays a user registration screen on the video display unit 163 (S116).

Incidentally, when the broadcast reception device 100 has been registered with respect to the broadcasting station selected by the processing at S108, instead of the processings S109 to SS113, the cooperative-device management execution unit 1103 may: read the login name information 1404 and the password information 1405 corresponding to the selected broadcasting station from the server registration information table stored in the authentication-information storage area 1400; and transmit, as user identification information and a password, each piece of information that have been read to the service provider server 400.

Figure 6D:
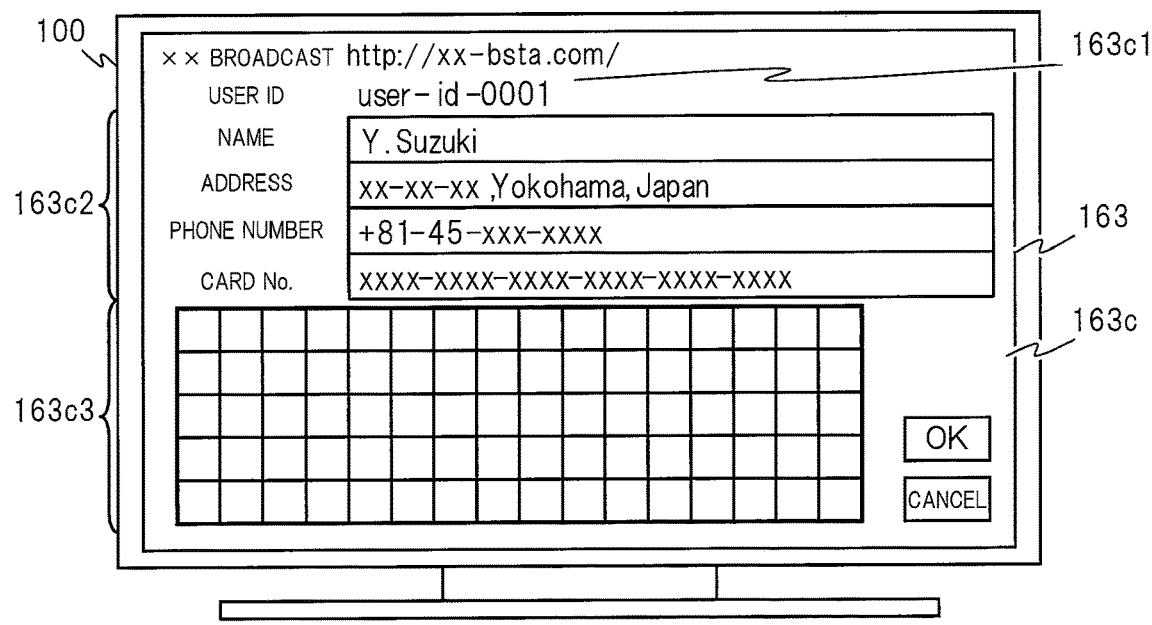
FIG. 6D is a screen display view of a user registration screen of the broadcast reception device according to the first embodiment.

FIG. 6D is a screen display view for describing an example of the user registration screen displayed by the processing at S116. The user registration screen 163c includes a user identification information display unit 163c1, a user registration information input unit 163c2, and a software keyboard unit 163c3. Incidentally, when the user identification information and the password transmitted by the processing at S113 have been registered in the user information table stored in the user-information storage area 4500 of the service provider server 400, the user registration information input unit 163c2 may display, as an initial value, information already registered in the user information table. By operating the software keyboard unit 163c3 using the not illustrated remote controller, user registration information can be inputted (altered) in the user registration information input unit 163c2. The user registration information may be a name of a user, an address of the user, a contact address of the user (a telephone number), or a card number of a credit card possessed by the user. Different information may be further allowed to be inputted.

Incidentally, the user registration screen 163c may further include a user-device registration information input unit (not illustrated) for registering a user device used by the user in order to access the service provider server 400. Alternatively, a not illustrated user-device registration screen different from the user registration screen 163c, may be displayed on the video display unit 163, and thereby the user may register the user device used for accessing the service provider server 400. Besides the broadcast reception device 100, the portable terminal 700 capable of the cooperative operation with the broadcast reception device 100 can be registered as the user device in the user-device registration information input unit (or the user-device registration screen). The user device is managed in the user-device information table stored in the user-information storage area 4500 of the service provider server 400.

On the user registration screen 163c displayed by the processing at S116 of FIG. 6A, the user operates the cursor key and the OK key of the remote controller to input the user registration information into the user registration information input unit 163c2 (S117), and further when the user selects an "OK" key of the software keyboard unit 163c3, the cooperative-device management execution unit 1103 transmits the inputted user registration information to the service provider server 400 (S118). The service provider server 400, which has received the user registration information transmitted from the broadcast reception device 100, updates the user information table stored in the user-information storage area 4500 using the received user registration information based on the control of the basic operation execution unit 4101. Alternatively, the received user registration information is newly registered into the user information table (S119). Furthermore, the basic operation execution unit 4101 transmits a user-registration-information-update (registration) result at S119 to the broadcast reception device 100 through the LAN communication unit 421.

When the user-registration-information-update (registration) result transmitted from the service provider server 400 is acquired (S120), the cooperative-device management execution unit 1103 updates a content of the server registration information table stored in the authentication-information storage area 1400, based on the acquired user-registration-information-update (registration) result. Alternatively, the broadcasting station selected by the processing at S108, and information on the service provider server 400 according to the broadcasting station are newly registered into the server registration information table (S121). After the processing at S121, the cooperative-device management execution unit 1103 completes the operation of the server registration processing, and the content processing execution unit 1102 displays video of the currently-viewing broadcast program on the video display unit 163 (S122).

[Operational Sequence in Recording Schedule Processing]

Figure 7A:
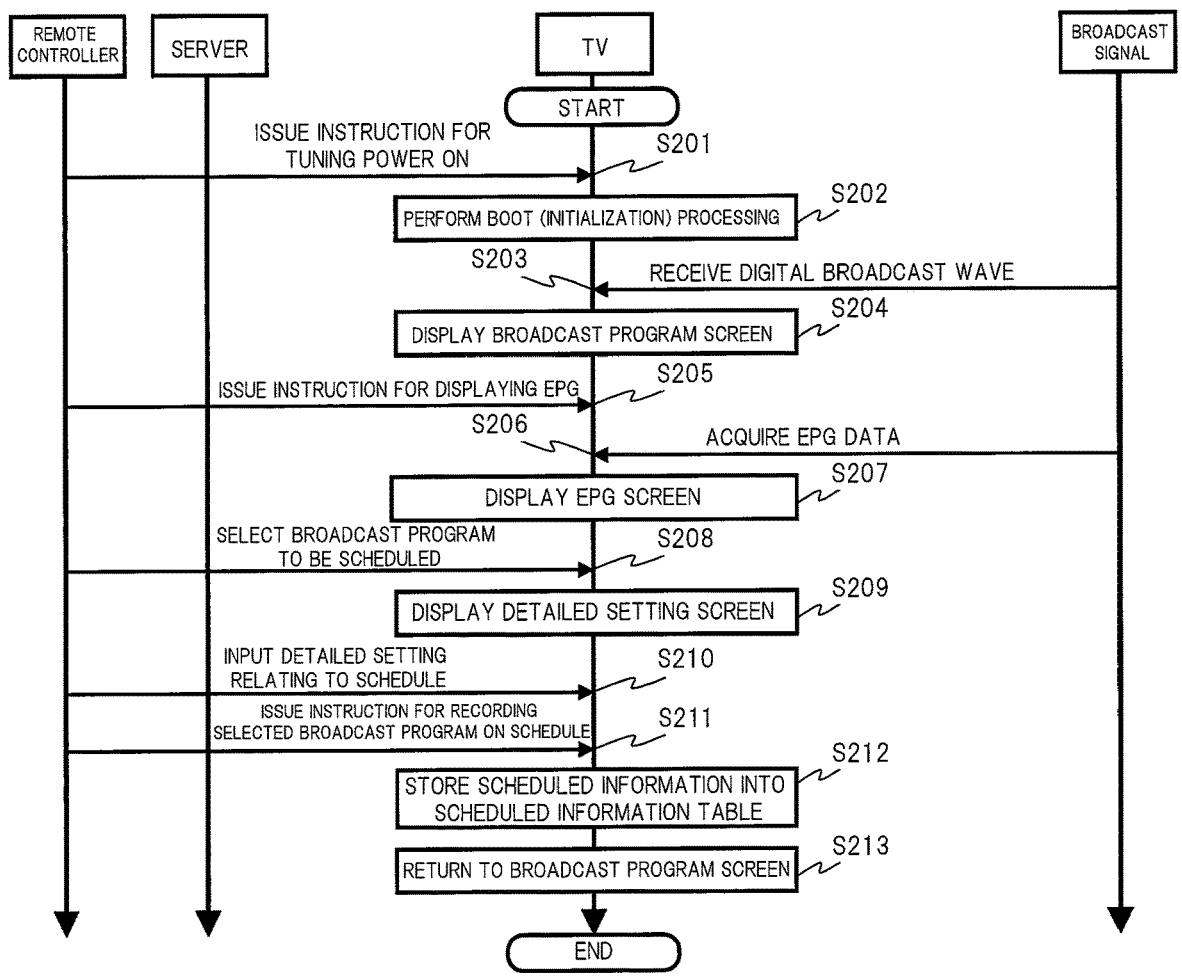
FIG. 7A is an operational sequence diagram of the broadcast reception device according to the first embodiment in a recording schedule processing.

Next, described will be an operation of a recording schedule processing of a broadcast program using an EPG in the broadcast reception device 100. Incidentally, "recording schedule" means a schedule processing for recording a desired program in each embodiment of the present invention. FIG. 7A is an operational sequence diagram for describing an example of an operation of the recording schedule processing in the broadcast reception device 100 according to the present embodiment.

When the broadcast reception device 100 according to the present embodiment performs the recording schedule processing, the user first operates the not illustrated remote controller to issue the broadcast reception device 100 with an instruction for turning the power on (S201). The broadcast reception device 100, which has received the power-on instruction from the remote controller controls the basic operation execution unit 1101 to perform the boot processing and the initialization processing (S202). Incidentally, the processings at S201 and S202 are unnecessary when the broadcast reception device 100 has already booted. When the boot processing and the initialization processing are completed, the content processing execution unit 1102 next controls: the processing of tuning to (selecting) a predetermined channel by receiving the digital broadcast wave in the tuner/demodulator 131; the processing of demodulating a modulated signal therein; and the like (S203). Furthermore, the content processing execution unit 1102 controls: the demultiplexing processing to each data stream in the demultiplexor 132; the decoding processing to the video data stream in the video decoder 133 and the audio data stream in the audio decoder 134; and the like, and outputs a video signal and an audio signal of the broadcast program from the video display unit 163 and the speaker 164 through the video superimposition unit 161 and the audio selector 162 (S204).

Next, when the user operates the remote controller to issue an instruction for displaying an EPG screen (S205), the content processing execution unit 1102 acquires a program information data stream separated from the digital broadcast wave (S206). Furthermore, the content processing execution unit 1102 interprets the acquired program information data stream, and produces EPG information to display, on the video display unit 163, the EPG screen based on the EPG information (S207).

Figure 7B:
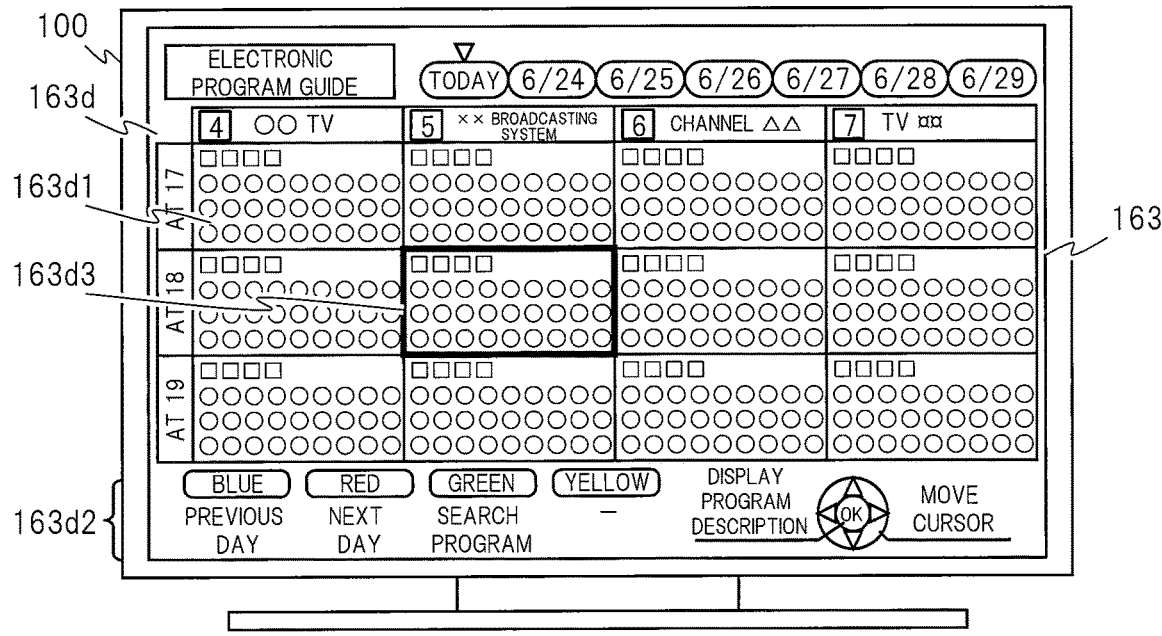
FIG. 7B is a screen display view of an electronic program guide of the broadcast reception device according to the first embodiment.

FIG. 7B is a screen display view for describing an example of the EPG screen displayed by the processing at S207. The EPG screen 163d is a broadcast schedule of broadcast programs in the digital broadcasting service according to the present embodiment, and displays program information 163d1 on a broadcast program broadcasted on each channel in each time slot, the information being in a matrix format including a vertical axis as a time display and a horizontal axis as a service ID (channel) display. An operation guide 163d2 is displayed at a lower portion of the EPG display screen 163d. By operating the cursor key of the remote controller, a program selection cursor 163d3 can be moved. Furthermore, by pressing down the OK key of the remote controller, a detailed setting screen relating to a broadcast program selected by the program selection cursor 163d3 can be displayed.

When the user operates the cursor key and the OK key of the remote controller to select a predetermined broadcast program on the EPG screen 163d displayed by the processing at S207 of FIG. 7A (S208), the recording-playback management unit 1102a displays, on the video display unit 163, a detailed setting screen relating to the selected predetermined broadcast program based on the control of the content processing execution unit 1102 (S209).

Figure 7C:
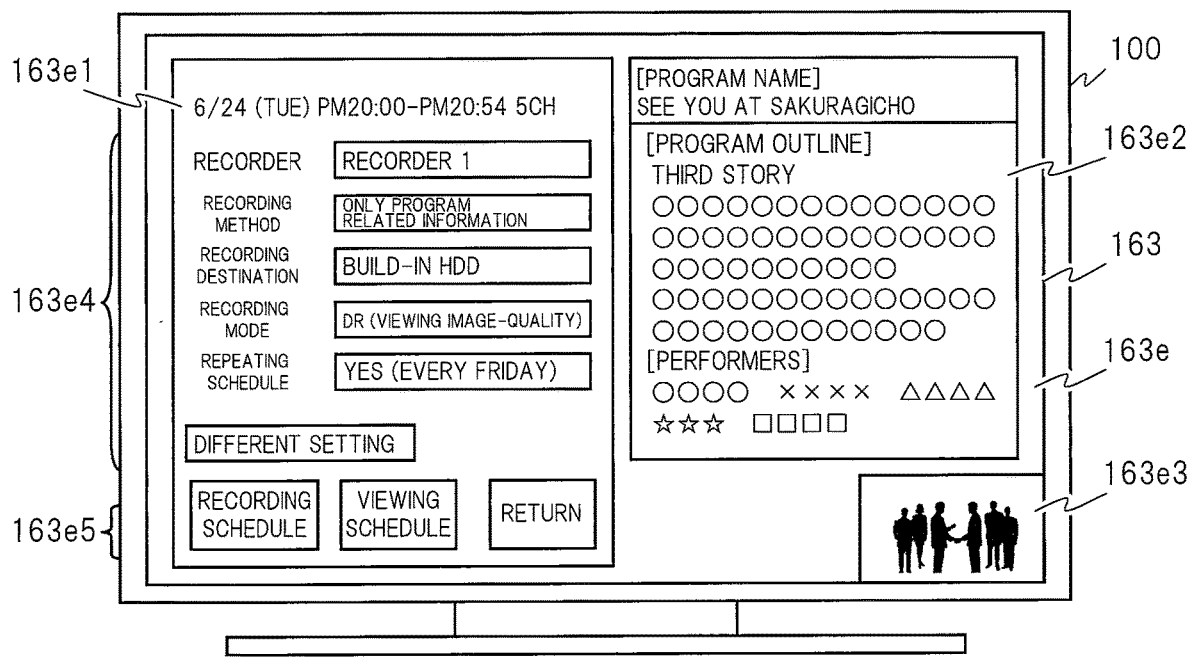
FIG. 7C is a screen display view of a detailed setting screen of the broadcast reception device according to the first embodiment.

FIG. 7C is a screen display view for describing an example of the detailed setting screen displayed by the processing at S209. The detailed setting screen 163e includes: a program information display unit 163e1 that displays information on the broadcast date and time and information on the broadcast channel of the broadcast program selected by the processing at S208; a program outline display region 163e2 that displays information on a program title, a program outline, and performers, etc.; a sub-window region 163e3 that displays the currently-broadcasting program video; a detailed operation setting unit 163e4 capable of setting details relating to a recording schedule processing and a viewing schedule processing of the selected broadcast program; and a schedule-operation instruction unit 163e5 that issues an instruction for performing the recording schedule processing or the viewing schedule processing to the selected broadcast program.

By operating the cursor key and the OK key of the remote controller to select a "recording method" key of the detailed operation setting unit 163e4, whether both of program content and program related information are recorded or only the program related information except the program content is recorded in a storage can be set in recording the recorded-targeted broadcast program. That is, in each embodiment of the present invention, the concept of "recording" of the broadcast program does not directly mean that the video content itself of the broadcast program is recorded. Using the wording of the "recording" in each embodiment of the present invention, includes the concept of: a case where both of the program content and the program related information are recorded in the storage; and a case where only the program related information except the program content is recorded in the storage. Selecting a "recording destination" key can select a storage that stores the recorded-targeted broadcast program. Selecting a "recording mode" key can set which recording mode the recorded-targeted broadcast program is recorded in. Selecting a "repeating schedule" key can set whether a scheduled recording processing or scheduled viewing processing of the broadcast program is repeated every week, every day, or the like. Operating the cursor key and the OK key of the remote controller to select any key in the schedule-operation instruction unit 163e5, can perform the recording schedule processing or the viewing schedule processing to the selected broadcast program.

On the detailed setting screen 163e displayed by the processing at S209 of FIG. 7A, the user operates the cursor key and the OK key of the remote controller to set each item of the detailed operation setting unit 163e4 (S210), and further selects a "recording schedule" key of the schedule-operation instruction unit 163e5 (S211) so that the recording-playback management unit 1102a stores scheduled information on the broadcast program selected by the processing at S208, into the scheduled information table of the scheduled-information storage area 1200, based on a setting content of each item set in the detailed operation setting unit 163e4 (S212). Specifically, for example, a setting content of a "recorder" key of the detailed operation setting unit 163e4 is stored in the recorder selection information 1209 of the scheduled information table. A setting content of the "recording method" key is stored in the recording method 1210. A setting content of the "recording destination" key is stored in the recording-destination information 1208. A setting content of the "recording mode" key is stored in the recording/viewing mode 1207. A setting content of the "repeating schedule" key is stored in the repetition flag 1206.

After the processing at S212, the recording-playback management unit 1102a completes the operation of the recording schedule processing, and the content processing execution unit 1102 displays the currently-viewing video of the broadcast program on the video display unit 163 (S213).

[Operational Sequence in Scheduled Recording Processing]

Figure 8:
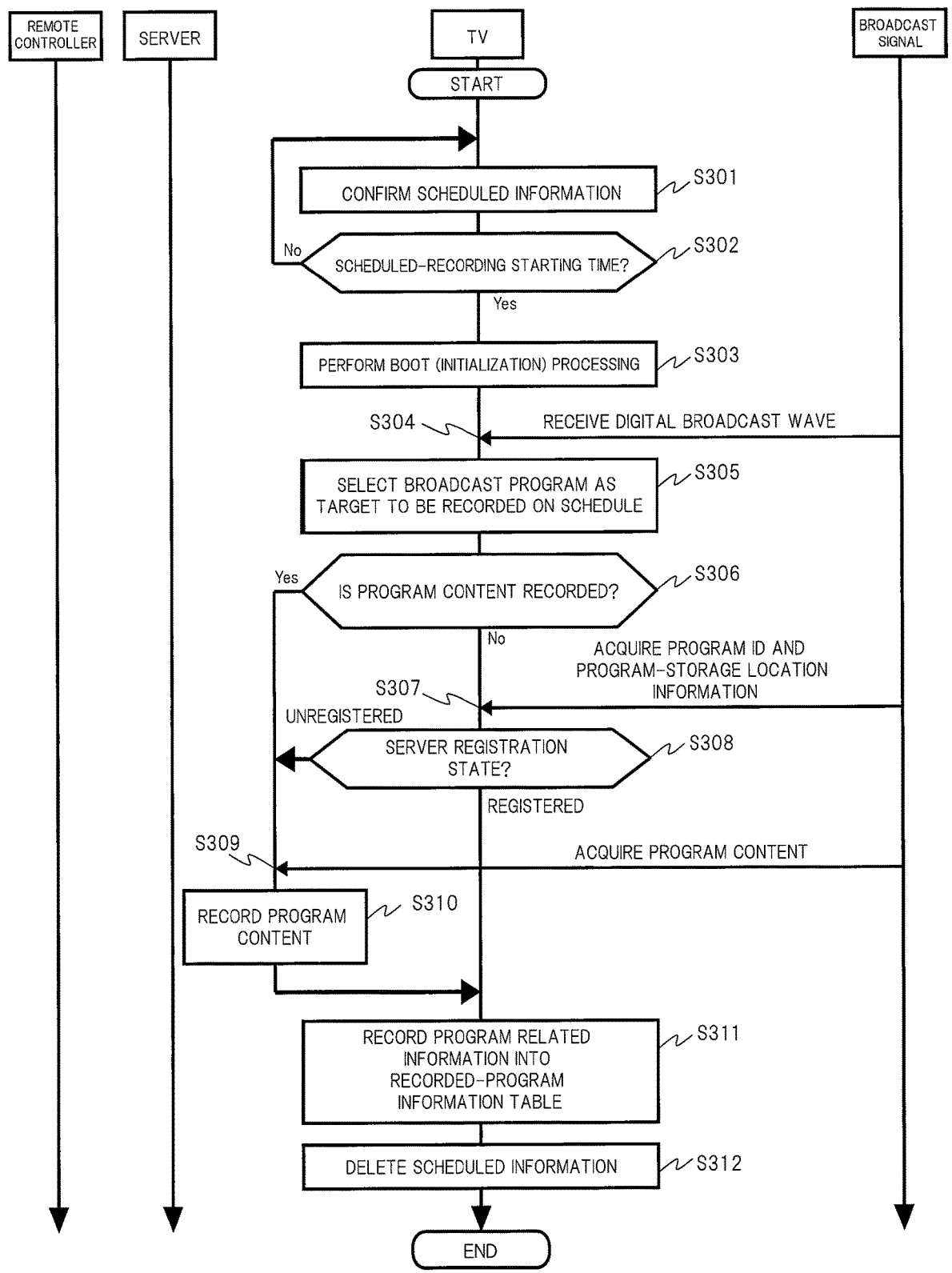
FIG. 8 is an operational sequence diagram of the broadcast reception device according to the first embodiment in a scheduled recording processing.

Next, described will be an operation of a scheduled recording processing based on the scheduled information stored in the scheduled information table of the scheduled-information storage area 1200 in the broadcast reception device 100. Incidentally, "scheduled recording" in each embodiment of the present invention means to perform recording to a desired program whose recording is scheduled by the recording schedule processing. FIG. 8 is an operational sequence diagram for describing an example of the operation of the scheduled recording processing in the broadcast reception device 100 according to the present embodiment.

When the broadcast reception device 100 according to the present embodiment is on standby or during operation, the recording-playback management unit 1102a appropriately confirms: time information on a built-in clock not illustrated; and each piece of the scheduled information of the scheduled information table stored in the scheduled-information storage area 1200 based on the control of the basic operation execution unit 1101 or the content processing execution unit 1102 (S301). When the broadcast starting date and time of a schedule-recorded-targeted broadcast program stored in the scheduled information table comes close to be due (S302: Yes), the basic operation execution unit 1101 performs the boot processing and the initialization processing of the broadcast reception device 100 (S303). Incidentally, the processing at S303 is unnecessary when the broadcast reception device 100 has already been during the operation. When the boot processing and the initialization processing are completed, the content processing execution unit 1102 is next controlled to receive the digital broadcast wave (S304), and furthermore the tuner/demodulator 131 performs the processing of tuning to (selecting) the channel of the schedule-recorded-targeted broadcast program and the processing of demodulating the modulated signal (S305). Incidentally, the processing at S305 may be performed by appropriately selecting a unused tuner/demodulator when the broadcast reception device 100 has already been during the operation and selected an arbitrary broadcast program serving as a target to be recorded on schedule. In this case, the video of the schedule-recorded-targeted broadcast program selected/demodulated by the unused tuner/demodulator is not necessarily displayed on the video display unit 163.

When the content processing execution unit 1102 completes the selection of the schedule-recorded-targeted broadcast program in the processing at S305, the recording-playback management unit 1102a next refers to the scheduled information table stored in the scheduled-information storage area to confirm the recording method 1210 of the schedule-recorded-targeted broadcast program based on the control of the content processing execution unit 1102. When the recording method 1210 that has been confirmed indicates that the program content is not recorded (S306: No), the recording-playback management unit 1102a acquires program related information (program identification information and program-storage location information) accompanied with the program content of the schedule-recorded-targeted broadcast program (S307). Incidentally, the program related information (the program identification information and the program-storage location information) may be included in PSI or SI. The program related information may be included in an AIT. The program related information may be included in a BML data stream. The program related information together with the program content of the broadcast program may be included by a different method in the digital broadcast wave to be transmitted. Alternatively, the program related information may be acquired by accessing a predetermined server device designated by the AIT.

Furthermore, the recording-playback management unit 1102a determines the service provider server 400, which provides the video content relating to the schedule-recorded-targeted broadcast program through the network, from the program-storage location information of the program related information acquired by the processing at S307. Next, the cooperative-device management execution unit 1103 refers to the server registration information table stored in the authentication-information storage area 1400 to confirm a server registration state of the service provider server 400. When the broadcast reception device 100 has been registered with respect to the service provider server 400 (S308: already done), the recording-playback management unit 1102a stores the program related information (the program identification information and the program-storage location information), which is acquired by the processing at S307, into the recorded-program information table of the content-information storage area 1300 (S311). Specifically, for example, the acquired program identification information is stored in the program identification information 1308 of the recorded-program information table. The acquired program-storage location information is stored in the program-storage location information 1309.

Incidentally, in the processing at S308, by accessing the service provider server 400 using the login name information 1404 and the password information 1405 of the server registration information table, the server registration state may be confirmed after the reference to the server registration information table.

Meanwhile, when the recording method 1210 confirmed by the processing at S306 indicates that both of the program content and the program related information are recorded in a storage (S306: Yes) and when the server registration state of the service provider server 400 confirmed by the processing at S308 indicates an unregistered state (S308: unregistered), the recording-playback management unit 1102a acquires the program content of the broadcast program serving as a target to be recorded on schedule (S309). Even when the server registration state of the service provider server 400 indicates a registered state in the processing at S308, a processing similar to that in the unregistered state may be performed in response to stored contents of the registration state information 1406 and the expiration date information 1407.

After the processing at S309, the recording-playback management unit 1102a stores, into the content storage area 1300, the program content of the schedule-recorded-targeted broadcast program acquired by the processing at S309 (S310). Incidentally, in the processing at S310, the content processing unit 151 may performs a transcoding processing in response to the recording/viewing mode information 1207 of the scheduled information table stored in the scheduled-information storage area 1200. Next, the recording-playback management unit 1102a stores, as the program related information, information indicating a storage location of the program content stored by the processing at S310 in the content storage area 1300, into the recorded-program information table of the content-information storage area 1300 (S311). Specifically, for example, the information indicating the storage location is stored in the program-storage location information 1309.

When the processing at S311 is completed, the recording-playback management unit 1102a deletes the scheduled information on the schedule-recorded-targeted broadcast program from the scheduled information table stored in the scheduled-information storage area 1200 (S312), and then completes the operation of the scheduled recording processing.

Incidentally, in the processings at S307 and S308, when the program related information (the program identification information and the program-storage location information) is not accompanied with the program content of the broadcast program as a target to be recorded on schedule, the processing (S308: unregistered) may be selected regardless of the server registration state. That is, when the program related information (the program identification information and the program-storage location information) on the program content of the broadcast program as the target to be recorded on schedule is not accompanied with the digital broadcast wave, the program content of the broadcast program as the target to be recorded on schedule may be operated so as to be stored in the content-information storage area 1300 even if the recording method 1210 of the scheduled information table stored in the scheduled-information storage area 1200 indicates that the program content is not recorded.

In this case, the program information 163d1 of the EPG screen 163d may indicates whether the program related information (the program identification information and the program-storage location information) is accompanied with the program content of the broadcast program. For example, when the program related information (the program identification information and the program-storage location information) is accompanied with the program content of the broadcast program, the program information 163d1 may clarify that an effect by addition of a character, a symbol, or an illustration, a different background color, or the like.

[Operational Sequence in Manual Recording Processing]

Figure 9:
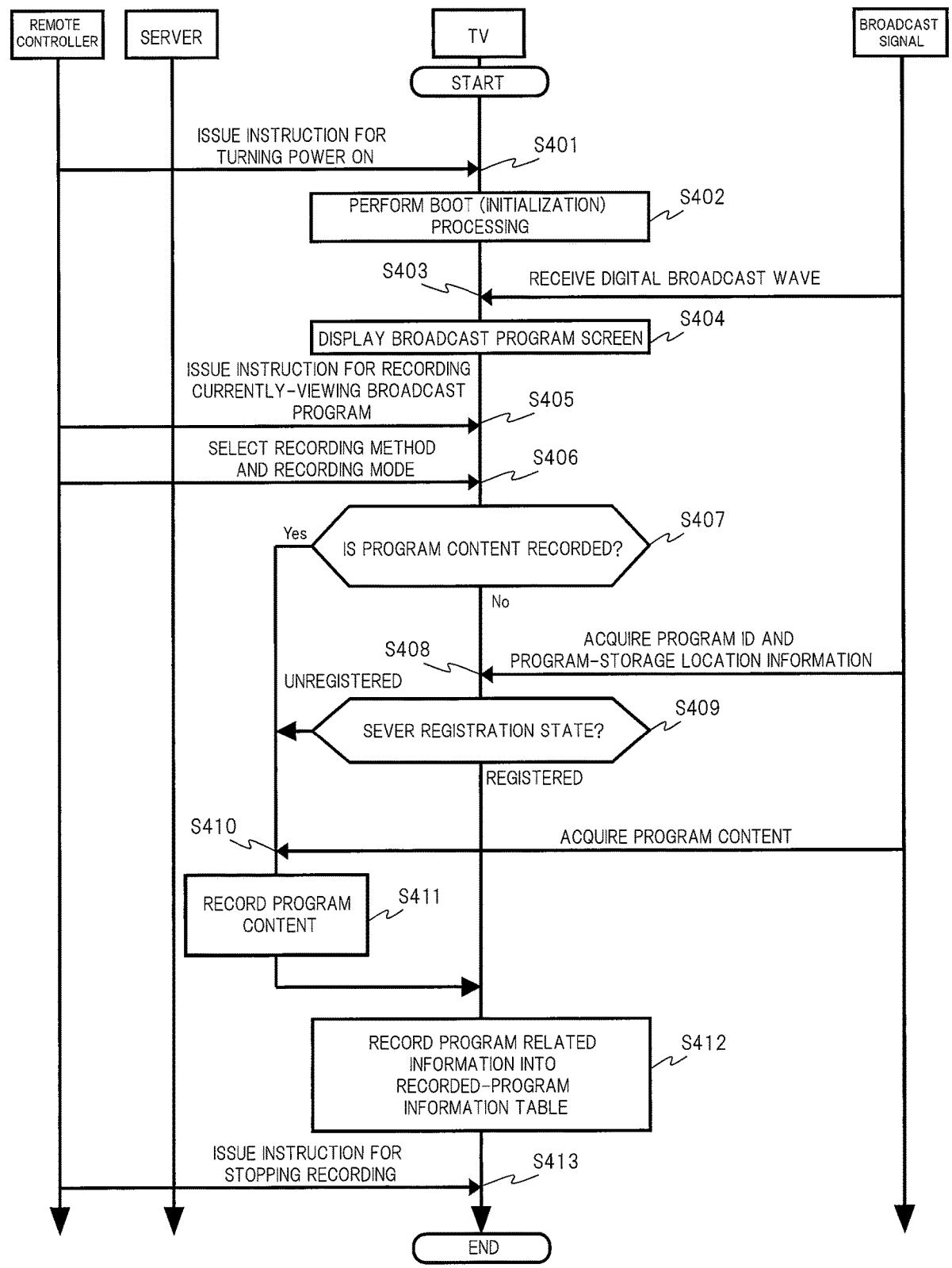
FIG. 9 is an operational sequence diagram of the broadcast reception device according to the first embodiment in a manual recording processing.

Incidentally, a series of operations described above is the description of the operation of the scheduled recording processing based on each piece of the scheduled information stored in the scheduled information table of the scheduled-information storage area 1200, and an operation of a manual recording processing performed by an instruction of the user during a currently-viewing broadcast program is also similarly performed. FIG. 9 is an operational sequence diagram for describing an example of the operation of the manual recording processing of the broadcast reception device 100 according to the present embodiment.

When the broadcast reception device 100 according to the present embodiment performs the manual recording processing, the user first operates the not illustrated remote controller to issue the broadcast reception device 100 with an instruction for turning the power on (S401). The broadcast reception device 100, which has received the power-on instruction from the remote controller, controls the basic operation execution unit 1101 to perform the boot processing and the initialization processing (S402). Incidentally, the processings at S401 and S402 are unnecessary when the broadcast reception device 100 has already booted. When the boot processing and the initialization processing are completed, the content processing execution unit 1102 next controls the processing of tuning to (selecting) a predetermined channel by receiving the digital broadcast wave, the processing of demodulating a modulated signal, and the like in the tuner/demodulator 131 (S403). Furthermore, the content processing execution unit 1102 controls the demultiplexing processing to each data stream in the demultiplexor 132, the decoding processing to a video data stream in the video decoder 133 and an audio data stream in the audio decoder 134, and the like, and outputs the video signal and the audio signal of the broadcast program from the video display unit 163 and the speaker 164 through the video superimposition unit 161 and the audio selector 162 (S404).

When intending to record the currently-viewing broadcast program by a manual operation, the user operates the remote controller to issue an instruction for manually recording the currently-viewing broadcast program (S405), and subsequently operates the remote controller to select a recording method and a recording mode for the broadcast program (S406). Incidentally, a selection operation of the recording method corresponds to the setting of a "recording method" key of the detailed operation setting unit 163e4 on the detailed setting screen 163e in the recording schedule processing. A selection operation of the recording mode corresponds to the setting of a "recording mode" key of the detailed operation setting unit 163e4 on the detailed setting screen 163e in the recording schedule processing.

Hereinafter, processings at S407 to S412 are performed similarly to the processings at S306 to S311 of FIG. 8. The user operates the remote controller to issue an instruction for stopping the recording (S413), and thereby the operation of the manual recording processing is completed. Incidentally, a stop operation of the manual recording processing may be performed, regardless of the recording-stopping instruction of the user, in response to the program finish time of the recorded-targeted broadcast program or in response to a lapse of a predetermined time after the instruction for starting the recording at S405.

[Operational Sequence in Video-Content Playback Processing]

Figure 10A:
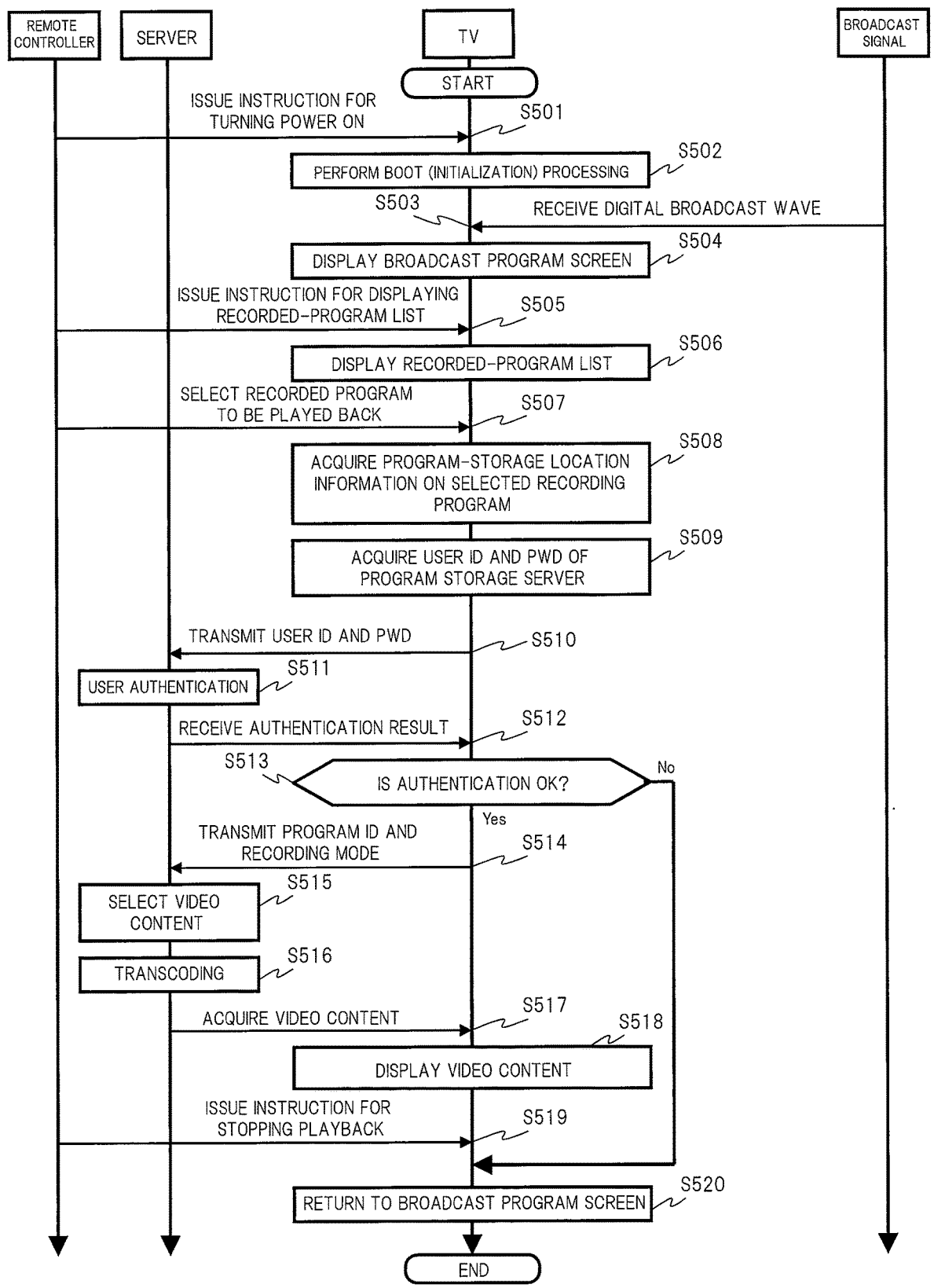
FIG. 10A is an operational sequence diagram of the broadcast reception device according to the first embodiment in a recording-program playback processing.

Next, an operation of a recording-program playback processing based on the recorded-program information table stored in the content-information storage area 1300 will be described in the broadcast reception device 100. FIG. 10A is an operational sequence diagram for describing an example of an operation of the recording-program playback processing in the broadcast reception device 100 according to the present embodiment.

When the broadcast reception device 100 according to the present embodiment performs the recording-program playback processing, the user first operates the not illustrated remote controller to issue the broadcast reception device 100 with an instruction for turning the power on (S501). The broadcast reception device 100 that is received the power-on instruction from the remote controller controls the basic operation execution unit 1101 to perform the boot processing and the initialization processing (S502). Incidentally, the processings at S501 and S502 are unnecessary when the broadcast reception device 100 has already booted. When the boot processing and the initialization processing are completed, the content processing execution unit 1102 next controls the processing of tuning to (selecting) a predetermined channel by receiving the digital broadcast wave, the processing of demodulating a modulated signal, and the like in the tuner/demodulator 131 (S503). Furthermore, the content processing execution unit 1102 controls the demultiplexing processing to each data stream in the demultiplexor 132, the decoding processing to a video data stream in the video decoder 133 and an audio data stream in the audio decoder 134, and the like, and outputs a video signal and an audio signal of a broadcast program from the video display unit 163 and the speaker 164 through the video superimposition unit 161 and the audio selector 162 (S504).

Next, when the user operates the remote controller to issue an instruction for displaying a recorded-program list screen (S505), the recording-playback management unit 1102a confirms the recorded-program information table stored in the content-information storage area 1300 to display the recorded-program list screen on the video display unit 163 (S506).

Figure 10B:
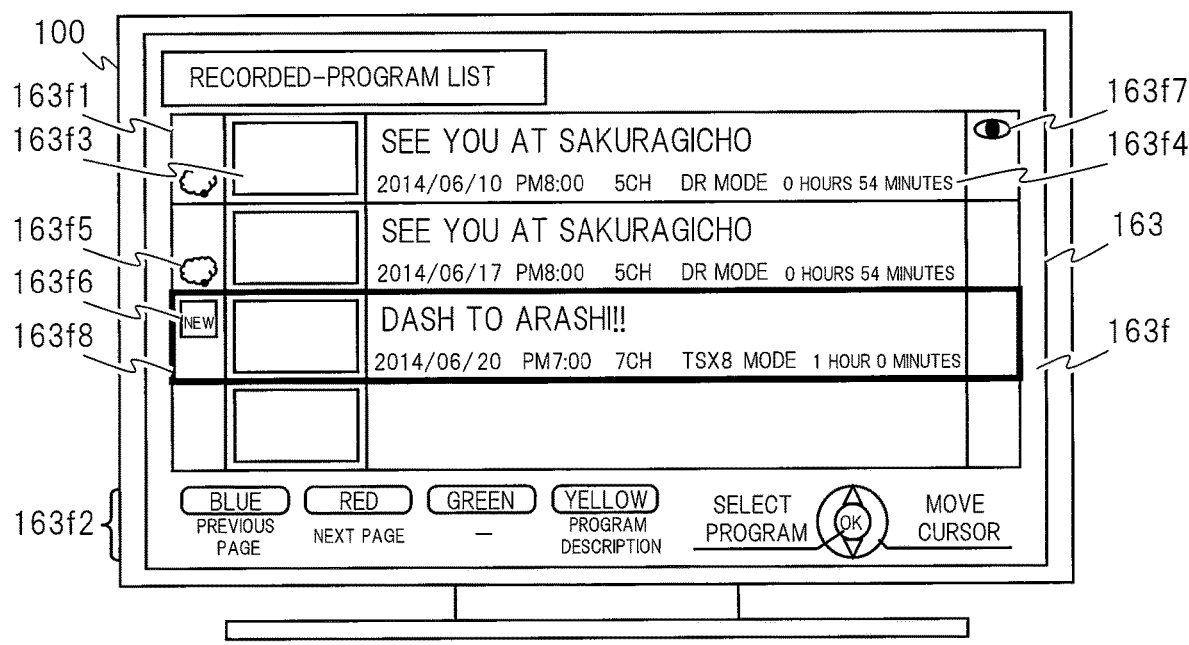
FIG. 10B is a screen display view of a recorded-program list screen of the broadcast reception device according to the first embodiment.

FIG. 10B is a screen display view for describing an example of the recorded-program list screen displayed by the processing at S506. The recorded-program list screen 163f displays a list including program information 163f1 on the each piece of the recording program information stored in the recorded-program information table of the content-information storage area 1300; and an operation guide 163f2. The program information 163f1 mainly includes a thumbnail unit 163f3; and a program outline display unit 163f4 that displays program title information, recording date and time information, recording channel information, recording mode information, and recording duration information, etc. on a recording program. Furthermore, the program information 163f1 may appropriately include: a cloud mark 163f5 indicating whether a program content of the recording program has been stored in the content-information storage area 1300; an un-viewing mark 163f6 indicating whether the recording program has not been viewed, and a resume mark 163f7 indicating whether the recording program has been resumed during its playback. Incidentally, the cloud mark 163f5 is displayed when the program content of the recording program has not been stored in the content-information storage area 1300. The un-viewing mark 163f6 corresponds to the viewing information 1310 of the recorded-program information table in the content-information storage area 1300. The resume mark 163f7 corresponds to the resume information 1311.

By operating the cursor key of the remote controller, a recording-program selection cursor 163f8 can be moved. Furthermore, by pressing down the OK key of the remote controller, a playback processing of a recording program selected by the recording-program selection cursor 163f8 can be started.

On the recorded-program list screen 163f displayed by the processing at S506 of FIG. 10A, when the user operates the cursor key and the OK key of the remote controller to select a predetermined recording program (S507), the recording-playback management unit 1102a acquires the program-storage location information 1309 on the selected predetermined recording program from the recorded-program information table stored in the content-information storage area 1300 (S508). When the acquired program-storage location information 1309 indicates that a video content relating to the predetermined recording program selected by the processing at S507 has been stored in the service provider server 400 on the network, the cooperative-device management execution unit 1103 interprets, based on the control of the recording-playback management unit 1102a, the acquired program-storage location information 1309 to extract the URL of the service provider server 400. Furthermore, the cooperative-device management execution unit 1103 refers to, based on the extracted URL of the service provider server 400, the server registration information table stored in the authentication-information storage area 1400 to acquire the login name information 1404 and the password information 1405 on the service provider server 400 (S509).

Next, the cooperative-device management execution unit 1103 transmits, as user identification information and a password, the login name information 1404 and the password information 1405 acquired by the processing at S508, to the service provider server 400 storing the video content relating to the recording program selected by the processing at S507 (S510). The service provider server 400 that has received the user identification information and the password transmitted from the broadcast reception device 100 confirms, based on the control of a basic operation execution unit 4101, the user information table stored in the user-information storage area 4500 of the storage unit 410 to perform a user authentication processing of the broadcast reception device 100 (S511). After that, the basic operation execution unit 4101 transmits a result of the user authentication processing in the processing at S511 to the broadcast reception device 100.

When the result of the user authentication processing transmitted from the service provider server 400 is received (S512), the cooperative-device management execution unit 1103 confirms the result of the received user authentication processing. When the result of the user authentication processing indicates authentication success (S513: Yes), the recording-playback management unit 1102a acquires the recording mode information 1306 and the program identification information 1308 on the predetermined recording program selected by the processing at S507 from the recorded-program information table stored in the content-information storage area 1300, and transmits the recording mode information 1306 and the program identification information 1308 to the service provider server 400 through the LAN communication unit 121 (S514).

When receiving the recording mode information 1306 and the program identification information 1308 transmitted from the broadcast reception device 100, the video-content management/distribution execution unit 4102 of the service provider server 400 refers to the content information table stored in the metadata storage area 4200, and acquires the content-storage location information 4203 and the content name information 4204 on video content having the program identification information 4202 agreeing with the received program identification information 1308. Furthermore, the video-content management/distribution execution unit 4102 refers to the video-content storage area 4300 based on the acquired content-storage location information 4203 and the acquired content name information 4204, and thereby selects the video content relating to the recording program selected by the processing at S507 (S515). The video-content management/distribution execution unit 4102 further performs a transcoding processing depending on the received recording mode information 1306 to the video content selected at S515 (S516), and transmits the video content to the broadcast reception device 100 through the LAN communication unit 421.

Incidentally, instead of the transcoding processing at S516, a plurality of video contents each having a different encoding format and bit rate, may be previously prepared in the video-content storage area 4300 so that video content having a predetermined encoding format/bit rate may be selected depending on the received recording mode information 1306. When a communication band between the service provider server 400 and the broadcast reception device 100 has sufficient capacity, the transcoding processing is not necessarily performed at S516. A change of whether the transcoding processing is performed may be made depending on a network condition between the service provider server 400 and the broadcast reception device 100.

When the video content relating to the recording program selected by the processing at S507 is acquired from the service provider server 400 (S517), the recording-playback management unit 1102a transmits the acquired video content to the demultiplexor 132. Next, the content processing execution unit 1102 controls: the demultiplexing processing to each data stream in the demultiplexor 132; the decoding processing to a video data stream in the video decoder 133 and an audio data stream in the audio decoder 134; and the like, and outputs a video signal and an audio signal of the received video content from the video display unit 163 and the speaker 164 through the video superimposition unit 161 and the audio selector 162 (S518), and realizes the operation of the recording-program playback processing.

When the user operates the remote controller to issue an instruction for stopping the playback of the recording program (S519), the content processing execution unit 1102 stops a processing of outputting the video signal and the audio signal of the acquired video content to complete the operation of the recording-program playback processing, and displays the video of the currently-viewing broadcast program on the video display unit 163 (S520). Incidentally, needless to say, the stop operation of the recording-program playback processing may be performed by completely playing back the video content relating to the recording program to its end regardless of the playback-stopping instruction from the user.

When the result of the user authentication processing received by the processing at S512 indicates authentication failure (S513: No), the content processing execution unit 1102 may display the currently-viewing broadcast program on the video display unit 163 without the processings S514 to S519 (S520). In this case, the video display unit 163 may display the effect that the user authentication processing has failed in the service provider server 400.

When the program-storage location information 1309 acquired at S508 indicates that the program content of the predetermined recording program selected by the processing at S507 has been stored in the content-information storage area 1300, instead of the processings S509 to S517, the program content of the selected predetermined recording program is read from the content-information storage area 1300, and the content processing unit 151 performs, as the need arises, the transcoding processing, and thereafter the processing at S518.

[Operational Sequence in Cooperative-Terminal Registration Processing]

Figure 11A:
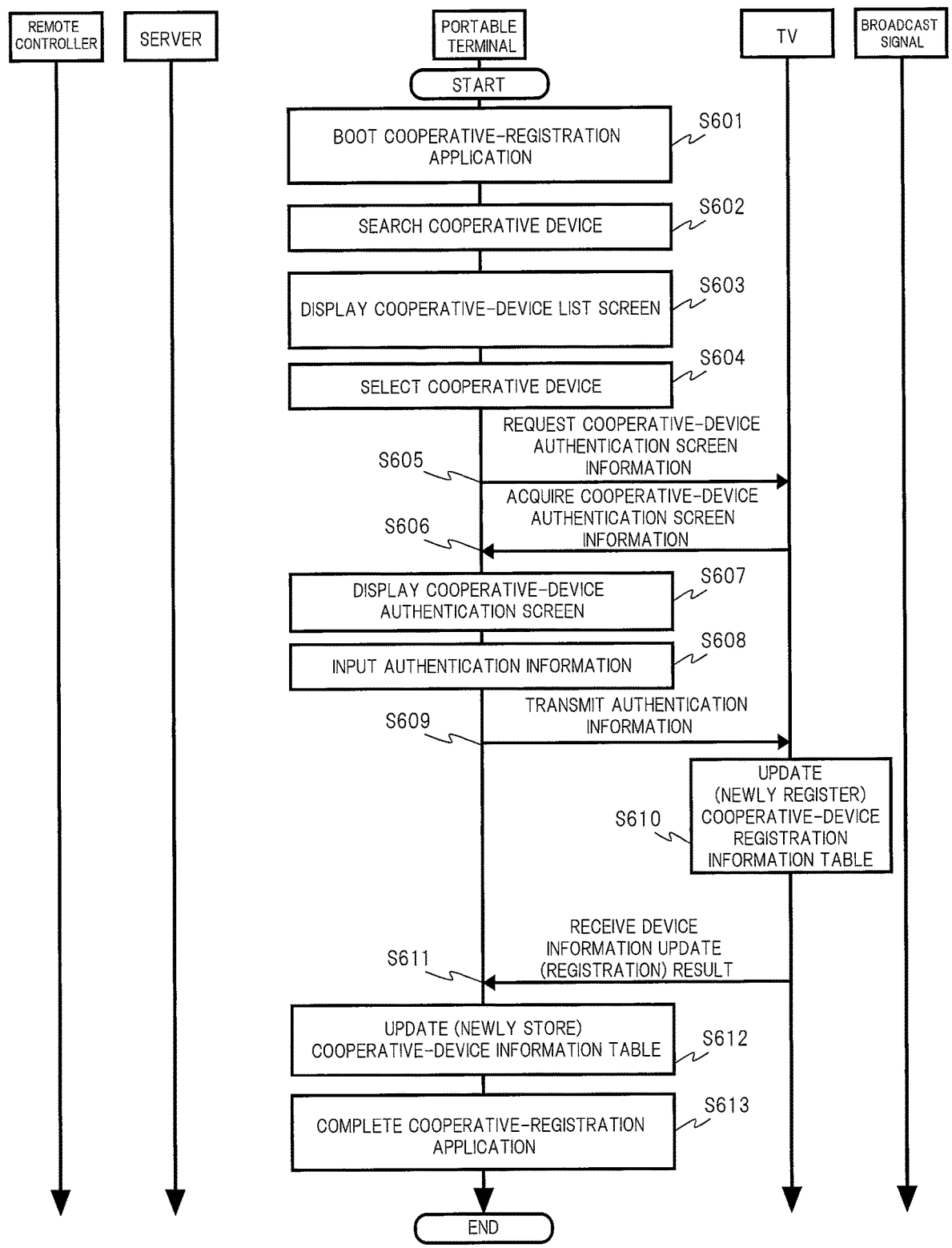
FIG. 11A is an operational sequence diagram of the portable terminal according to the first embodiment in a cooperative-terminal registration processing.

Described will be an operation of a cooperative-terminal registration processing for operating the portable terminal 700 possessed by the user of the broadcast reception device 100 in cooperation with the broadcast reception device 100. FIG. 11A is an operational sequence diagram for describing an example of an operation of the cooperative-terminal registration processing of the portable terminal 700 according to the present embodiment.

When the portable terminal 700 according to the present embodiment performs the cooperative-terminal registration processing, the user first boots a cooperative-registration application previously installed into the portable terminal 700 (S601).

Figure 11B:
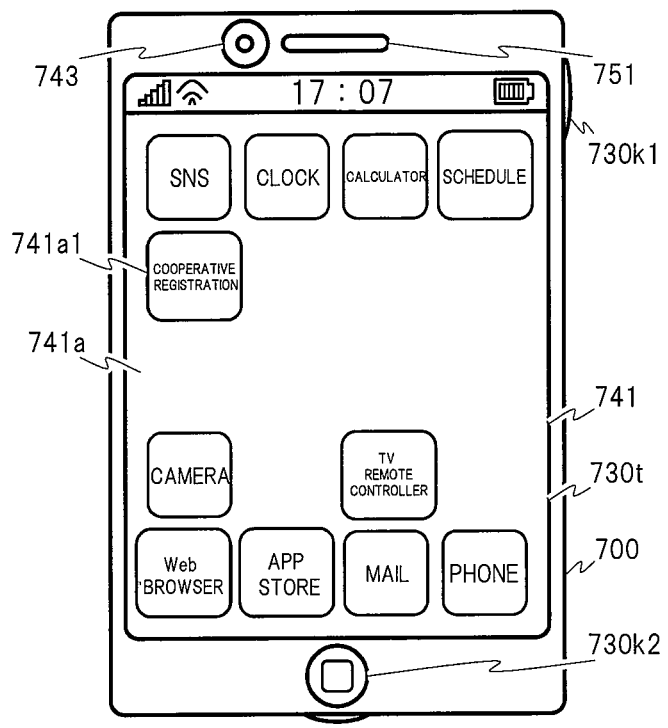
FIG. 11B is a screen display view of an initial screen of the portable terminal according to the first embodiment.

FIG. 11B is a screen display view for describing an exemplary initial screen displayed on a display unit 741 of the portable terminal 700. The initial screen 741a is displayed when power of the portable terminal 700 is turned on by pressing down a power key 730k1 or when a home key 730k2 is pressed down during execution of an arbitrary application program. The initial screen 741a displays an icon group associated with respective application programs executable in the portable terminal 700. Particularly, an icon 741a1 is an icon associated with an application program (hereinafter, referred to as a cooperative-registration application) for performing the cooperative-terminal registration processing according to the present embodiment. By selecting the icon 741a1, the cooperative-registration application associated with the icon 741a1 is executed.

Incidentally, a selection operation of the icon 741a1 may be performed by a tap operation etc. of a predetermined region on a touch panel 730t, the predetermined region corresponding to a position of the icon 741a1 displayed on the display unit 741. Alternatively, a cross cursor key or an OK key which is not illustrated may be operated so as to perform the selection operation. A first image input unit 743 is used to detect a visual line of the user of the portable terminal 700 so that the selection of the icon may be made based on the detected visual line information.

When the cooperative-registration application is booted by the processing at S601 of FIG. 11A, the cooperative-terminal registration execution unit 7102 performs an initialization processing to a predetermined operation block, and then performs a search processing to a device capable of a cooperative operation with the portable terminal 700, through the LAN communication unit 721 (S602). Incidentally, in the present embodiment, the operation of the cooperative-terminal registration processing is performed in the user house, and thus only an in-house-network device configured by the router device 200r of FIG. 1 becomes a target subjected to the search processing. Alternatively, only a device that directly performs communication with the portable terminal 700 by a method such as NFC becomes a target subjected to the search processing. When completing the search processing of a device capable of a cooperative operation with the portable terminal 700, the cooperative-terminal registration execution unit 7102 displays, on the display unit 741, a cooperative-device list screen depending on a result of the search processing (S603).

Figure 11C:
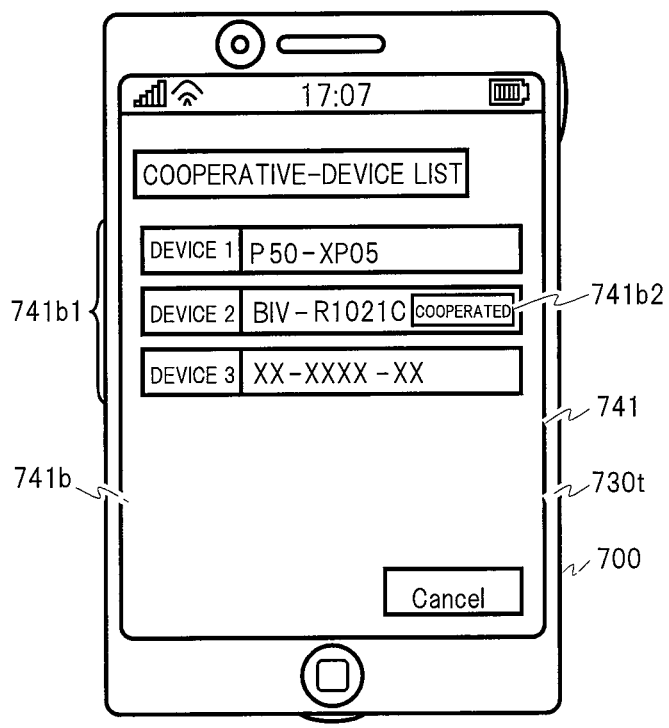
FIG. 11C is a screen display view of a cooperative-device list screen of the portable terminal according to the first embodiment.

FIG. 11C is a screen display view for describing an example of the cooperative-device list screen displayed by the processing at S603. The cooperative-device list screen 741b displays a device-name list 741b1 of devices which are capable of the cooperative operation with the portable terminal 700 and detected by the processing at S603. Each device name of the device-name list 741b1 may display a cooperated-state mark 741b2 in response to a result of configuration of the cooperative-device information table stored in the cooperative-information storage area 7200 of the storage unit 710 by the cooperative-terminal registration execution unit 7102. The cooperated-state mark 741b2 indicates that the device displayed in the device-name list 741b1 has already been registered as a cooperative device in the cooperative-device information table.

When the user operates the operation unit 730 on the cooperative-device list screen 741b displayed by the processing at S603 of FIG. 11A (S604) and selects a device name of a device that the user wishes to register as a cooperative device, an authentication processing unit 7102a requests the selected device (the broadcast reception device 100 in the present embodiment), based on the control of the cooperative-terminal registration execution unit 7201 (S605), to transmit cooperative-device authentication screen information (S605). The broadcast reception device 100, which has received the request for the transmission of the cooperative-device authentication screen information, transmits the cooperative-device authentication screen information to the portable terminal 700 based on the control of the cooperative-device management execution unit 1103. When acquiring the cooperative-device authentication screen information transmitted from the broadcast reception device 100 (S606), the authentication processing unit 7102a displays a cooperative-device authentication screen on the display unit 741 (S607).

Figure 11D:
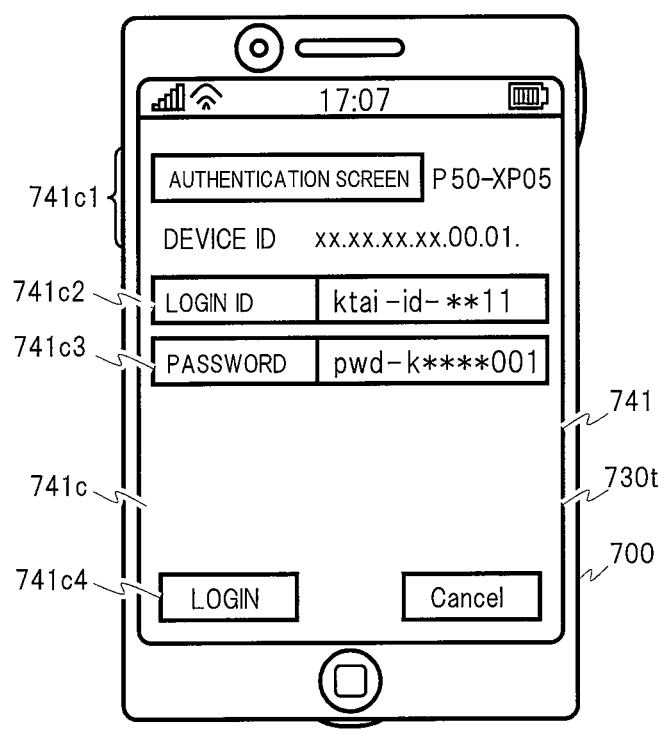
FIG. 11D is a screen display view of a cooperative-device authentication screen of the portable terminal according to the first embodiment.

FIG. 11D is a screen display view for describing an example of the cooperative-device authentication screen displayed by the processing at S607. The cooperative-device authentication screen 741c includes a cooperative-device information display unit 741c1 that displays detailed information of the device selected by the processing at S604, a login ID input unit 741c2, a password input unit 741c3, and a login key 741c4. When the user operates the operation unit 730 to select the login ID input unit 741c2 or the password input unit 741c3, a software keyboard pops up on the display unit 741 so that characters can be inputted.

When the user inputs authentication information (login ID and a password) (S608) and further operates the operation unit 730 to select the login key 741c4 on the cooperative-device authentication screen 741c displayed by the processing at S607 of FIG. 11A, the authentication processing unit 7102a transmits the inputted authentication information (the login ID and the password) to the broadcast reception device 100 (S609). The broadcast reception device 100, which has received the authentication information (the login ID and the password) transmitted from the portable terminal 700, updates the cooperative-device registration information table stored in the authentication-information storage area 1400 by the authentication information (the login ID and the password) based on the control of the cooperative-device management execution unit 1103. Alternatively, the received authentication information (the login ID and the password) is newly registered in the cooperative-device registration information table (S610). Furthermore, the cooperative-device management execution unit 1103 transmits a cooperative-device registration information update (registration) result at S610, to the portable terminal 700 through the LAN communication unit 121.

When acquiring the cooperative-device registration information update (registration) result transmitted from the broadcast reception device 100 (S611), the authentication processing unit 7102a updates the content of the cooperative-device information table stored in the cooperative-information storage area 7200 based on the acquired cooperative-device registration information update (registration) result. Alternatively, information on the device selected by the processing at S604 is newly stored in the cooperative-device information table (S612). Furthermore, the authentication processing unit 7102a displays character information such as "authentication success", or an icon, on the cooperative-device authentication screen 741c illustrated in FIG. 11D, and thereby notifies the user that the operation of the cooperative-device registration processing has succeeded, and then completes the operation of the cooperative application (S613).

[Operational Sequence in Remote Viewing Processing]

Figure 12A:
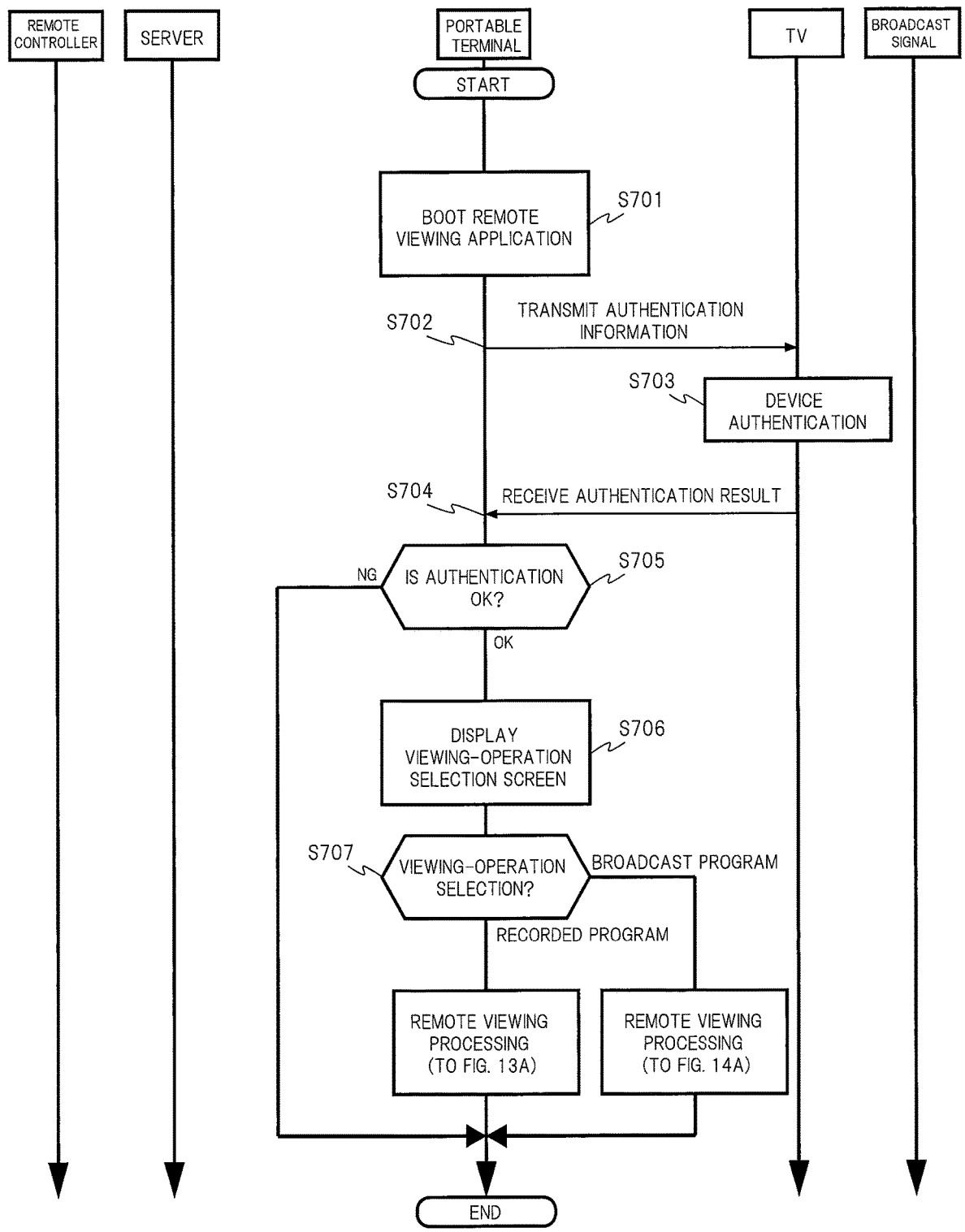
FIG. 12A is an operational sequence diagram of the portable terminal according to the first embodiment in a remote viewing processing.

The portable terminal 700 and the broadcast reception device 100 according to the present embodiment are ones handling the remote viewing function capable of viewing a digital broadcast program received by a TV receiver, a DVD recorder or the like in the user house and its already recorded content by using a smartphone or a tablet terminal outside the user house through the Internet 200. Here, an operation in performing the remote viewing with the portable terminal 700, will be described. FIG. 12A is an operational sequence diagram for describing an example of an operation of a remote viewing processing in the portable terminal 700 according to the present embodiment.

Figure 12B:
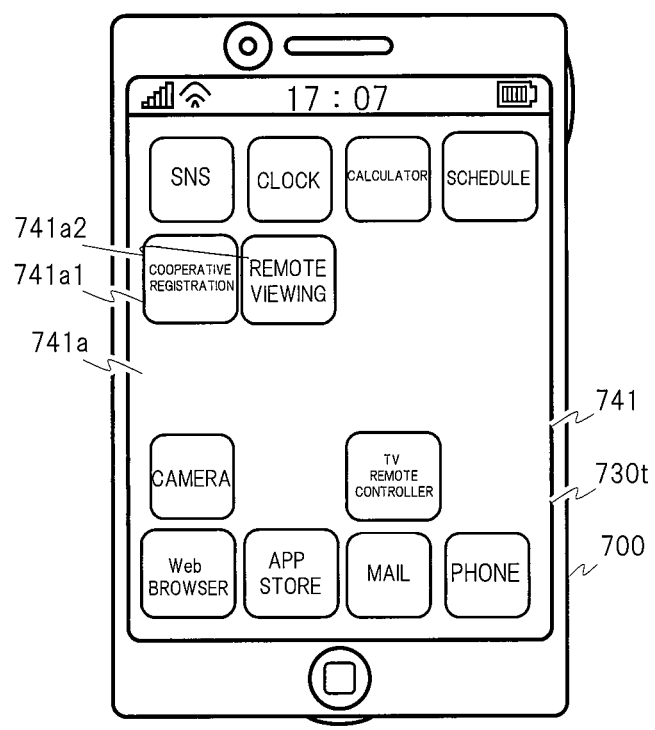
FIG. 12B is a screen display view of an initial screen of the portable terminal according to the first embodiment.

When the portable terminal 700 according to the present embodiment performs the remote viewing processing, the user first boots a remote viewing application previously installed in the portable terminal 700 (S701). Incidentally, the boot of the remote viewing application may be performed by selecting an icon 741a2 displayed on the initial screen 741a illustrated in FIG. 12B. The icon 741a2 is an icon associated with an application program (hereinafter, referred to as a remote viewing application) for performing the remote viewing processing according to the present embodiment.

When booting the remote viewing application by the processing at S701, the remote viewing execution unit 7103 performs an initialization processing to a predetermined operation block. Next, an authentication processing unit 7103a confirms the cooperative-device information table stored in the cooperative-information storage area 7200 to transmit, to a cooperative device (the broadcast reception device 100 in the present embodiment) preferentially selected by the priority-device information 7207, the corresponding authentication information (the login ID 7204 and the password information 7205) (S702). The broadcast reception device 100, which has received the authentication information (the login ID 7204 and the password information 7205) transmitted from the portable terminal 700, confirms, based on the control of the cooperative-device management execution unit 1103, the cooperative-device registration information table stored in the authentication-information storage area 1400 of the storage unit 110 to perform a device authentication processing to the portable terminal 700 (S703). After that, the cooperative-device management execution unit 1103 transmits a result of the device authentication processing in the processing at S703, to the portable terminal 700. Incidentally, basically in the device authentication processing at S703, the authentication may be handled as success made when the received authentication information (the login ID 7204 and the password information 7205) agrees with the login ID information 1454 and the password information 1455 on the corresponding cooperative device stored in the cooperative-device registration information table of the authentication-information storage area 1400. But, the authentication may be handled as failure in a case etc. where a date of booting the remote viewing application at S701 has passed a predetermined period or more from the registration date information 1456 in the cooperative-device registration information table.

When acquiring the result of the device authentication processing transmitted from the broadcast reception device 100 (S704), the authentication processing unit 7103a confirms the result of the received device authentication processing. When the result of the device authentication processing indicates the authentication failure (S705: No), the remote viewing execution unit 7103 displays character information such as "failure of connection to TV", or an icon on the display unit 741 to notify the user the effect that the remote viewing processing cannot be performed, and then completes the operation of the remote viewing application. Meanwhile, when the result of the device authentication processing indicates the authentication success (S705: Yes), the remote viewing execution unit 7103 displays a viewing-operation selection screen on the display unit 741 (S706).

Figure 12C:
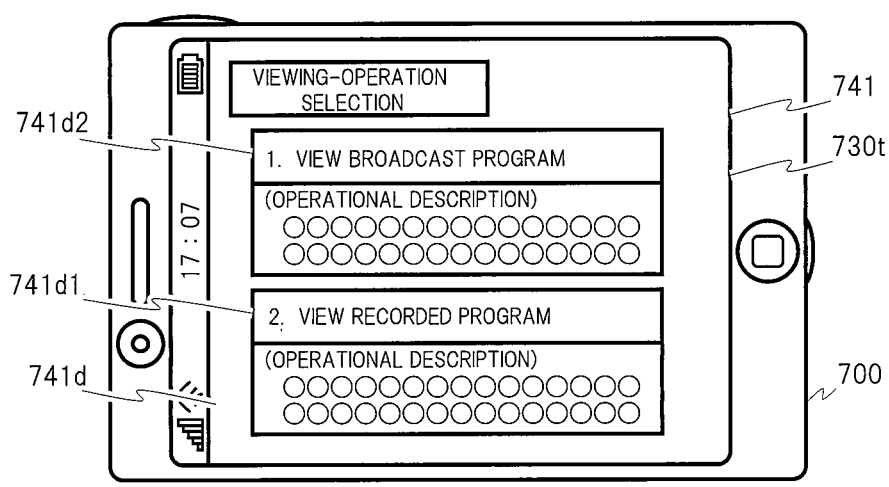
FIG. 12C is a screen display view of a viewing-operation selection screen of the portable terminal according to the first embodiment.

FIG. 12C is a screen display view for describing an example of a viewing-operation selection screen displayed by the processing at S706. The viewing-operation selection screen 741d includes a recorded-program viewing selection icon 741d1, and a broadcast-program viewing selection icon 741d2. When the user operates the operation unit 730 to select the recorded-program viewing selection icon 741d1, the recording program recorded by the broadcast reception device 100 can be remotely viewed by the portable terminal 700. When the broadcast-program viewing selection icon 741d2 is selected, the broadcast program received by the broadcast reception device 100 can be remotely viewed by the portable terminal 700.

Figure 13A:
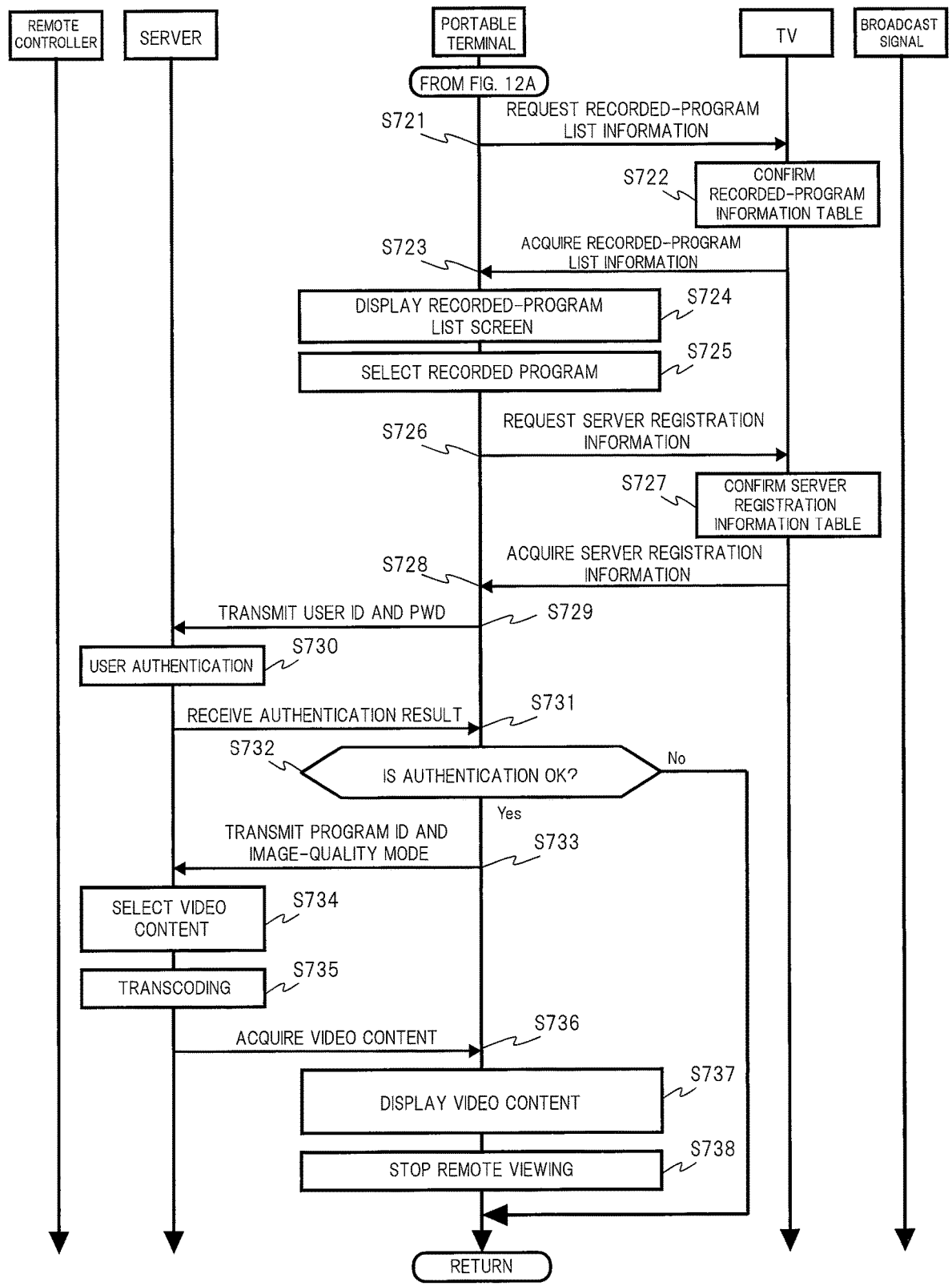
FIG. 13A is an operational sequence diagram of the portable terminal according to the first embodiment in the remote viewing (recording program) processing.

When the user operates the operation unit 730 to select the recorded-program viewing selection icon 741d1 on the viewing-operation selection screen 741d displayed by the processing at S706 of FIG. 12A (S707: recorded program), the processing proceeds to FIG. 13A and the remote viewing execution unit 7103 requests the broadcast reception device 100 to transmit recorded-program list information (S721). The broadcast reception device 100, which has received the request for the transmission of the recorded-program list information from the portable terminal 700, confirms the recorded-program information table stored in the content-information storage area 1300 (S722) to transmit, as the recorded-program list information, the contents stored in its table to the portable terminal 700. When the recorded-program list information transmitted from the broadcast reception device 100 is acquired (S723), the remote viewing execution unit 7103 displays a recorded-program list screen on the display unit 741, based on the acquired recorded-program list information (S724).

Figure 13B:
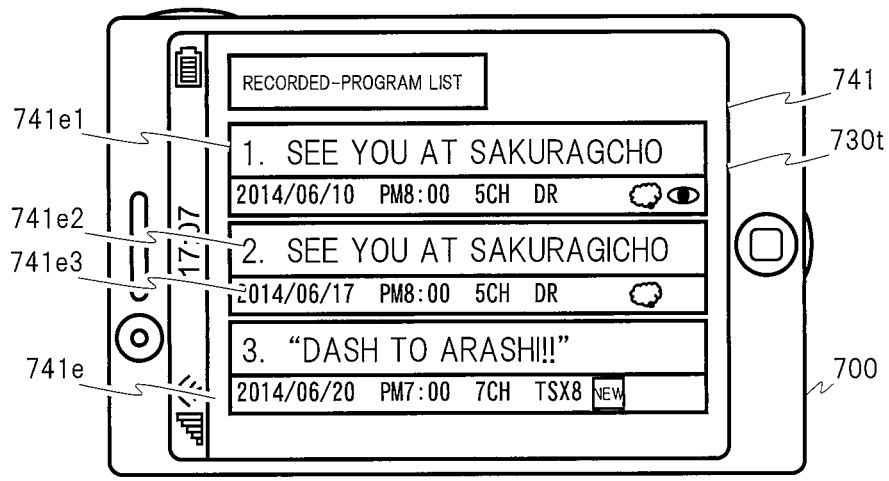
FIG. 13B is a screen display view of a recorded-program list screen of the portable terminal according to the first embodiment.
Figure 13C:
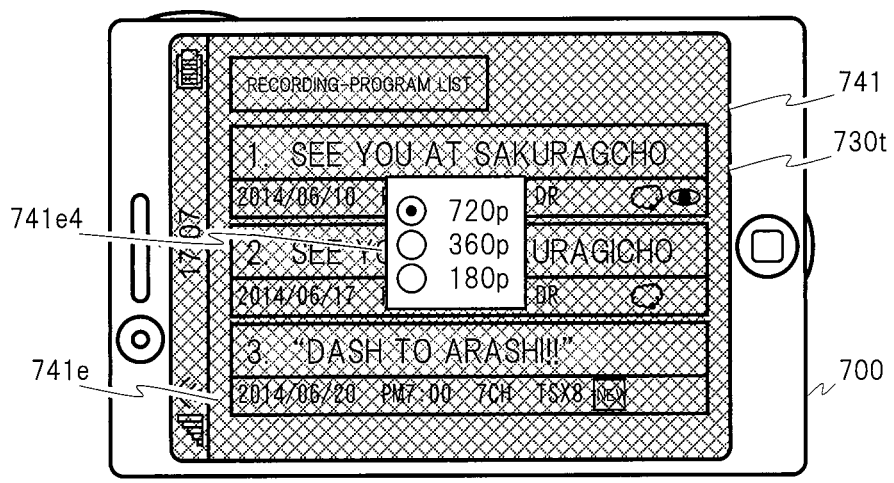
FIG. 13C is a screen display view of an image-quality mode selection screen of the portable terminal according to the first embodiment.

FIG. 13B is a screen display view for describing an example of the recorded-program list screen displayed by the processing at S724. A recorded-program list screen 741e displays a list of program information 741e1 on each piece of recording program information included in the acquired recorded-program list information. The program information 741e1 mainly includes program title information 741e2 and a program outline display unit 741e3 that displays recording date and time information, recording channel information, and recording mode information on a recording program. A cloud mark, an un-viewing mark, and a resume mark may be further displayed similarly to the recorded-program list screen 163*f* illustrated in FIG. 10B. When the user operates the operation unit 730 to select any of pieces of program information 741*e*1, an image-quality mode selection screen illustrated in FIG. 13C may be displayed. An image-quality mode selection box 741*e*4 is an icon for selecting an image-quality mode in acquiring a video content relating to the selected program information 741*e*1 from the service provider server 400.

When the user operates the operation unit 730 to select a predetermined recorded program on the recorded-program list screen 741*e* displayed by the processing at S724 of FIG. 13A (S725), the remote viewing execution unit 7103 confirms the recorded-program list information acquired by the processing at S723 to specify the service provider server 400, which stores a video content relating to the selected predetermined recording program from the program-storage location information on the predetermined recording program selected by the processing at S725. Furthermore, the remote viewing execution unit 7103 requests the broadcast reception device 100 to transmit server registration information on the specified service provider server 400 (S726). The broadcast reception device 100 that has received the transmission request of the server registration information from the portable terminal 700 confirms the server registration information table stored in the authentication-information storage area 1400 (S727) to transmit, as the server registration information, the login name information 1404 and the password information 1405, etc. on the specified service provider server 400 to the portable terminal 700.

When acquiring the server registration information (the login name information 1404 and the password information 1405, etc.) transmitted from the broadcast reception device 100 (S728), the authentication processing unit 7103*a* transmits, as user identification information and a password, the server registration information (the login name information 1404 and the password information 1405) acquired by the processing at S728, to the service provider server 400 storing the video content relating to the predetermined recording program selected by the processing at S725, based on the control of the remote viewing execution unit 7103 (S729). The service provider server 400, which has received the user identification information and the password transmitted from the portable terminal 700, confirms the user information table stored in the user-information storage area 4500 of the storage unit 410 to perform a user authentication processing of the portable terminal 700, based on the control of the basic operation execution unit 4101 (S730). After that, the basic operation execution unit 4101 transmits a result of the user authentication processing in the processing at S730, to the portable terminal 700.

Incidentally, in the processing at S730, a distribution-destination device authentication processing of the portable terminal 700 may be further performed with reference to the user-device information table stored in the user-information storage area 4500 by the received user identification information and a MAC address of the portable terminal 700. In this case, the MAC address of the portable terminal 700 can be simultaneously acquired in performing the processing at S729.

When acquiring the result of the user authentication processing transmitted from the service provider server 400 (S731), the authentication processing unit 7103*a* confirms the result of the received user authentication processing. When the result of the user authentication processing indicates authentication success (S732: Yes), a content playback unit 7103*b* acquires, from the recording-program list information acquired by the processing at S723, program identification information on the predetermined recording program selected by the processing at S725 to transmit, to the service provider server 400 through the LAN communication unit 721, the program authentication information together with image-quality mode information selected in the image-quality mode selection box 741*e*4 illustrated in FIG. 13C (S733).

When receiving the image-quality mode information and the program identification information transmitted from the portable terminal 700, the video-content management/distribution execution unit 4102 of the service provider server 400 refers to the content information table stored in the metadata storage area 4200 to acquire the content-storage location information 4203 and the content name information 4204 on a video content having the program identification information 4202 agreeing with the received program identification information. Furthermore, the video-content management/distribution execution unit 4102 refers to the video-content storage area 4300 based on the acquired content-storage location information 4203 and the acquired content name information 4204 to select the video content relating to the predetermined recording program selected by the processing at S725 (S734). The video-content management/distribution execution unit 4102 further performs a transcoding processing depending on the received image-quality mode information to the video content selected at S734 (S735) to transmit the video content to the portable terminal 700 through the LAN communication unit 421.

Incidentally, instead of the transcoding processing at S735, a plurality of video contents each having a different encoding format and bit rate are previously prepared in the video-content storage area 4300 so that a video content having a predetermined encoding format/bit rate may be selected depending on the received image-quality mode information. If a communication band between the service provider server 400 and the portable terminal 700 has sufficient capacity, the transcoding processing may not be necessarily performed at S735. The change of whether the transcoding processing is performed may be made depending on a network condition between the service provider server 400 and the portable terminal 700.

When the video content relating to the predetermined recording program selected by the processing at S725 is acquired from the service provider server 400 (S736), the content playback unit 7103*b* performs a processing of demultiplexing a PS of the acquired video content into each data stream, and a processing of decoding a video data stream and an audio data stream, and the like, and then the display unit 741 and the audio output unit 751 output a video signal and an audio signal of the received video content (S737) so that the operation of the remote viewing processing to the recording program is realized. When the user operates the operation unit 730 to issue an instruction for stopping the remote viewing (S738), the operation of the remote viewing application is completed. Incidentally, needless to say, the stop operation of the remote viewing may be performed by completely playing back the video content relating to the recording program to its end, regardless of the remote-viewing stopping instruction from the user.

When the result of the user authentication processing received by the processing at S731 indicates authentication failure (S732: No), the operation of the remote viewing application may be completed without processings at S733 to S738. In this case, the display unit 741 may display the effect that the user authentication processing has failed in the service provider server 400.

Figure 14A:
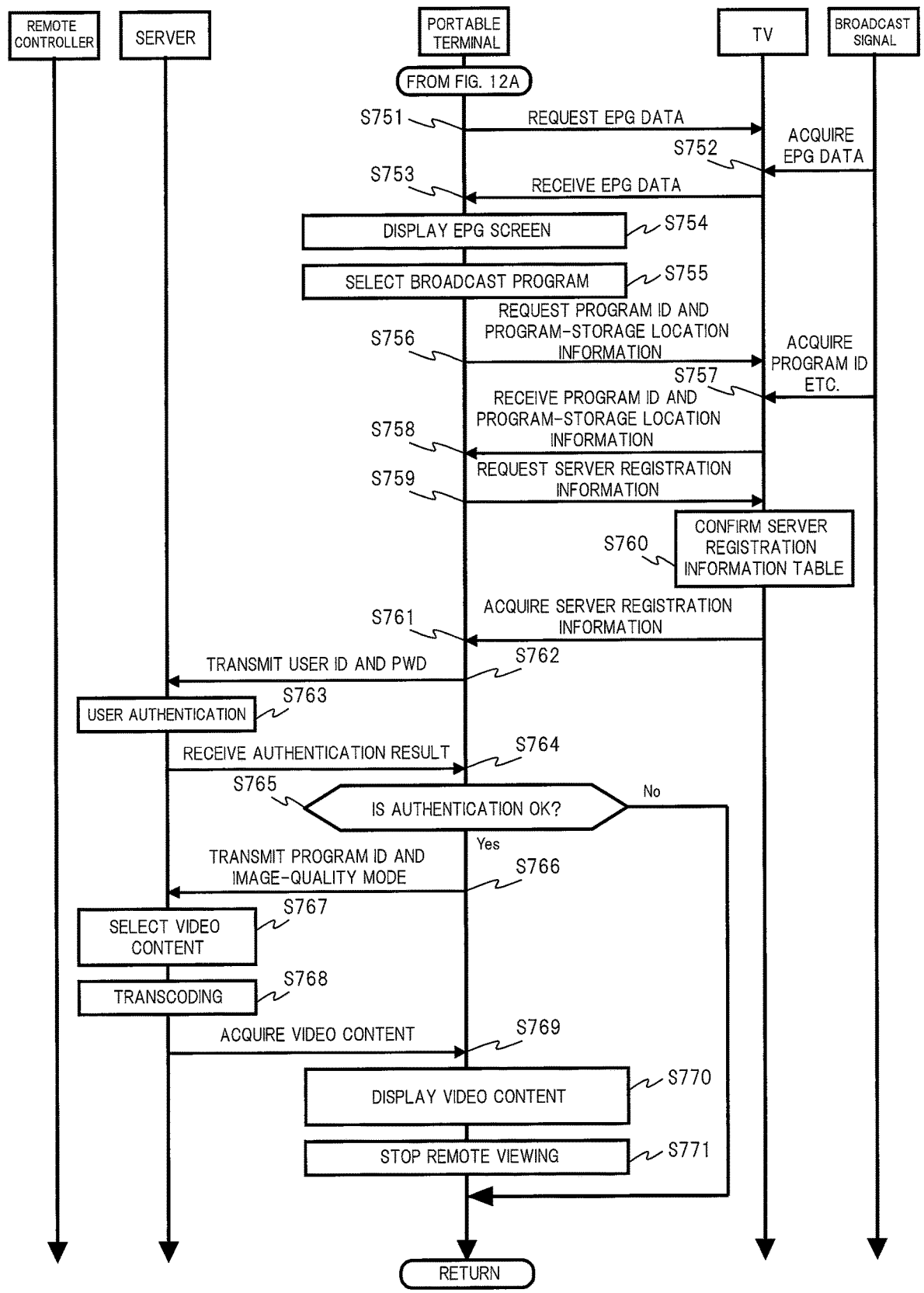
FIG. 14A is an operational sequence diagram of the portable terminal according to the first embodiment in the remote viewing (broadcast program) processing.

Meanwhile, when the user operates the operation unit 730 to select the broadcast-program viewing selection icon 741*d*2 on the viewing-operation selection screen 741*d* displayed by the processing at S706 of FIG. 12A (S707: broadcast program), the processing proceeds to FIG. 14A, and the remote viewing execution unit 7103 requests the broadcast reception device 100 to transmit EPG data (S751). The broadcast reception device 100 that has received the transmission request of the EPG data, from the portable terminal 700 acquires a program information data stream from the digital broadcast wave (S752) to transmit, as the EPG data, the acquired program information data stream to the portable terminal 700. When acquiring the EPG data transmitted from the broadcast reception device 100 (S753), the remote viewing execution unit 7103 interprets the acquired EPG data to produce EPG information, and then displays, on the display unit 741, an EPG screen based on the EPG information (S754).

Figure 14B:
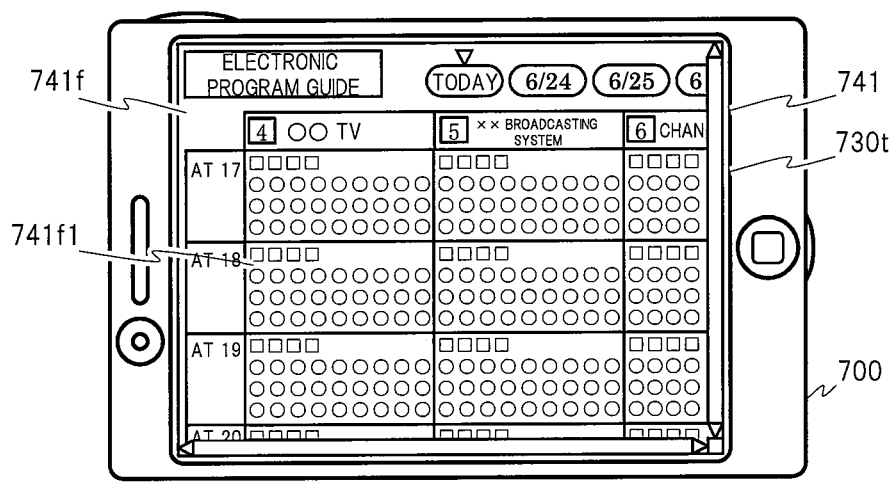
FIG. 14B is a screen display view of an EPG screen of the portable terminal according to the first embodiment.
Figure 14C:
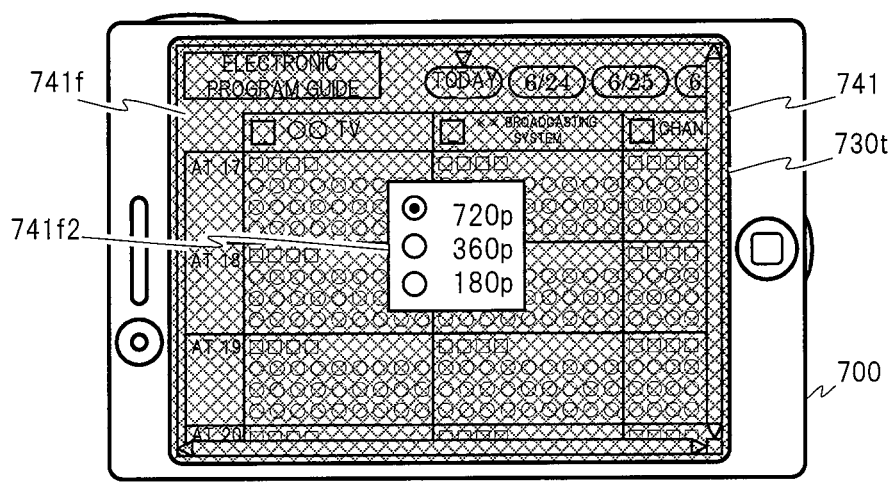
FIG. 14C is a screen display view of an image-quality mode selection screen of the portable terminal according to the first embodiment.

FIG. 14B is a screen display view for describing an example of the EPG screen displayed by the processing at S754. The EPG screen 741*f* is a broadcast schedule of broadcast programs in the digital broadcasting service capable of being received by the broadcast reception device 100 that performs the cooperative operation with the portable terminal 700 according to the present embodiment, and displays program information 741*f*1 on a broadcast program broadcast on each channel in each time band, the broadcast schedule being in a matrix including a vertical axis as a time display and a horizontal axis as a service ID (channel) display. When the user operates the operation unit 730 to select any of the pieces of program information 741*f*1, an image-quality mode selection screen illustrated in FIG. 14C may be displayed. An image-quality mode selection box 741*f*2 is an icon for selecting an image-quality mode in acquiring a video content relating to the selected program information 741*f*1 from the service provider server 400.

When the user operates the operation unit 730 to select a predetermined broadcast program on the EPG screen 741*f* displayed by the processing at S754 of FIG. 14A (S755), the remote viewing execution unit 7103 requests the broadcast reception device 100 to transmit program related information (program identification information and program-storage location information) on the selected predetermined broadcast program (S756). The broadcast reception device 100 that has received the transmission request of the program related information from the portable terminal 700 acquires, from the digital broadcast wave, the program related information (the program identification information and the program-storage location information) accompanied with a program content of the predetermined broadcast program selected by the processing at S755 (S757) to transmit the acquired program related information (the program identification information and the program-storage location information) to the portable terminal 700.

When acquiring the program related information (the program identification information and the program-storage location information) transmitted from the broadcast reception device 100 (S758), the remote viewing execution unit 7103 confirms the acquired program-storage location information to specify the service provider server 400 storing a video content relating to the predetermined broadcast program selected by the processing at S755. Furthermore, the remote viewing execution unit 7103 requests the broadcast reception device 100 to transmit server registration information on the specified service provider server 400 (S759).

Hereinafter, processings similar to those at S727 to S738 of FIG. 13A are performed at S760 to S771, and thereby the operation of the remote viewing processing to the broadcast program is realized.

As explained in the foregoing about the respective operations of the server registration processing, the recording schedule processing, the scheduled recording processing, the manual recording processing, the recording-program playback processing, the cooperative-terminal registration processing, and the remote viewing processing, the broadcast reception device 100 according to the present embodiment: has no need to individually store the program content relating to the broadcast program into the storage of the broadcast reception device 100 in reading a broadcast program; and then operates so as to acquire, every playback, a video content relating to the recorded broadcast program from the content server on the network. In performing the remote viewing of the recording program recorded by the broadcast reception device 100, the portable terminal 700 according to the present embodiment acquires the related information on the recording program from the broadcast reception device 100, thereafter acquires the video content relating to the recording program, from the service provider server 400, and thereby can perform the remote viewing. That is, using the viewing system according to the present embodiment, the remote viewing of the broadcast program and the recording program through the network can be preferably realized.

Second Embodiment

A second embodiment according to the present invention will be described below. Incidentally, unless otherwise noted, a configuration and an effect etc. according to the present embodiment are similar to those according to the first embodiment. Accordingly, differences between the present embodiment and the first embodiment will be mainly described below and the descriptions of points in common will be omitted in order to avoid duplication as much as possible.

In the present embodiment, an operational example of a remote viewing processing different from the remote viewing processing described in the first embodiment will be described. Incidentally, the descriptions of a server registration processing, a recording schedule processing, a scheduled recording processing, a manual recording processing, a recording-program playback processing, and a cooperative-terminal registration processing, etc. are similar to those according to the first embodiment.

[Operational Sequence in Remote Viewing Processing]
FIG. 15 is an operational sequence diagram for describing an example of an operation of the remote viewing processing in a portable terminal 700 according to the present embodiment. Incidentally, the operational sequence diagram of FIG. 15 illustrates a processing after the recorded-program viewing selection icon 741*d*1 is selected by the processing at S707 of FIG. 12A. That is, it is an operational sequence diagram substituting for the diagram of FIG. 13A for describing the operational sequence of the remote viewing (recording program) processing described in the first embodiment.

When the user operates the operation unit 730 to select the recorded-program viewing selection icon 741*d*1 on the viewing-operation selection screen 741*d* displayed by the processing at S706 of FIG. 12A (S707: recording program), the processing proceeds to FIG. 15, and then processings similarly to those at S721 to S725 of FIG. 13A are performed at S821 to S825.

When the user operates the operation unit 730 to select a predetermined recording program on the recorded-program list screen 741e displayed by the processing at S824 of FIG. 15 (S825), the remote viewing execution unit 7103 transmits, to a broadcast reception device 100, the program selection information capable of identifying the recording program selected by the processing at S825 and the image-quality mode information (S826). The broadcast reception device 100, which has received the program selection information and the image-quality mode information transmitted from the portable terminal 700, first refers to the recorded-program information table stored in the content-information storage area 1300 by the received program selection information based on the control of a recording-playback management unit 1102a, and specifies the recording program selected by the processing at S825. Furthermore, the recording-playback management unit 1102a interprets the program-storage location information 1309 corresponding to the specified recording program to extract the URL of the service provider server 400 storing video content relating to the specified recording program. Next, a cooperative-device management execution unit 1103 confirms the server registration information table stored in an authentication-information storage area 1400 (S827), and transmits, as user identification information and a password, login name information 1404 and password information 1405 to the service provider server 400 (S828) to request the user authentication processing.

The service provider server 400, which has received the user identification information and the password transmitted from the broadcast reception device 100, confirms the user information table stored in a user-information storage area 4500 of the storage unit 410 based on the control of a basic operation execution unit 4101 to perform the user authentication processing to the broadcast reception device 100 (S829). After that, the basic operation execution unit 4101 transmits a result of the user authentication processing in the processing at S829 to the broadcast reception device 100.

When receiving the result of the user authentication processing transmitted from the service provider server 400 (S830), the cooperative-device management execution unit 1103 confirms the result of the received user authentication processing. When the result of the user authentication processing indicates authentication success (S831: Yes), a remote distribution unit 1102b transmits, to the service provider server 400 through the LAN communication unit 121, program identification information 1308 on the specified recording program acquired from the recorded-program information table stored in the content-information storage area 1300, the image-quality mode information received by the processing at S826, and cooperative-device address information 1453 on the portable terminal 700 acquired from a cooperative-device registration information table stored in the authentication-information storage area 1400 (S832). Incidentally, the transmitted cooperative-device address information 1453 becomes the distribution-destination device identification information when the service provider server 400 distributes the video content.

When receiving the program identification information 1308, the image-quality mode information, and the cooperative-device address information 1453 transmitted from the broadcast reception device 100, a video-content management/distribution execution unit 4102 of the service provider server 400 first refers to the user-device information table stored in the user-information storage area 4500 by the user identification information transmitted by the processing at S828 and received the cooperative-device address information 1453 to perform a distribution-destination device authentication processing for confirming whether a distribution destination of the video content designated by the received cooperative-device address information 1453 is justifiable. In the distribution-destination device authentication processing, when the distribution destination of the video content designated by the received cooperative-device address information 1453 is determined not to be justifiable, a device authentication error is transmitted to the broadcast reception device 100.

Incidentally, when authentication has been performed between the portable terminal 700 and the broadcast reception device 100 and when authentication has been performed between the broadcast reception device 100 and the service provider server 400, the distribution-destination device authentication processing may not be necessarily performed.

In the distribution-destination device authentication processing, when the distribution destination of the video content designated by the received cooperative-device address information 1453 is confirmed to be justifiable, the video-content management/distribution execution unit 4102 next refers to a content information table stored in a metadata storage area 4200 to acquire content-storage location information 4203 and content name information 4204 on video content having program identification information 4202 agreeing with the received program identification information 1308. Furthermore, the video-content management/distribution execution unit 4102 refers to a video-content storage area 4300 based on the acquired content-storage location information 4203 and the acquired content name information 4204, and thereby selects the video content relating to the predetermined recording program selected by the processing at S825 (S833). The video-content management/distribution execution unit 4102 further performs a transcoding processing depending on the received image-quality mode information to the video content selected at S833 (S834) to transmit the video content to the portable terminal 700 identified by the received cooperative-device address information 1453.

When receiving the video content relating to the predetermined recording program selected by the processing at S825 from the service provider server 400 (S835), the portable terminal 700 performs, based on the control of a content playback unit 7103b, a processing of demultiplexing a PS of the acquired video content into each data stream, and a processing of decoding a video data stream and an audio data stream, and the like, and then a display unit 741 and an audio output unit 751 output a video signal and an audio signal of the received video content (S836), and thereby the operation of the remote viewing processing to the recording program is realized. When the user operates the operation unit 730 to issue an instruction for stopping the remote viewing (S837), the operation of the remote viewing application is competed.

When the result of the user authentication processing received by the processing at S830 indicates the authentication failure (S831: No), the operation of the remote viewing application may be completed without the processings at S832 to S837. In this case, the broadcast reception device 100 transmits authentication failure information to the portable terminal 700. Furthermore, the portable terminal 700 may display, on the display unit 741, the effect that the user authentication processing has failed in the service provider server 400 based on the transmitted authentication failure information. When the broadcast reception device 100 receives the device authentication error after the processing at S832, the operation of the remote viewing application may be completed without the processings at S833 to S837 similarly to the above.

Even when the user operates the operation unit 730 to select a broadcast-program viewing selection icon 741*d*2 on the viewing-operation selection screen 741*d* displayed by the processing at S706 of FIG. 12A (S707: broadcast program), the operation of the remote viewing processing similar to the above can be performed. Incidentally, the detailed description of the operation in this case will be omitted.

As explained in the foregoing about the operation of the remote viewing processing even if the viewing system according to the present embodiment is used, the remote viewing of a broadcast program and a recording program through a network can be also preferably realized similarly to the first embodiment.

The first to second embodiments of the present invention have been described above. Needless to say, however, the configuration of realizing the technique of the present invention is not limited to the above embodiments, and thus various modifications may be made. For example, a configuration according to an embodiment can be partially replaced with a configuration according to a different embodiment, or a configuration according to an embodiment can be added to a configuration according to a different embodiment. These entirely belong to the scope of the present invention. The numbers and the messages etc. used in the descriptions and the figures are just exemplary, and thus the effect of the present invention is not influenced even when different cases are provided.

The above descriptions do not particularly mention whether a security processing such as encryption is performed to the video content in mutually transmitting and receiving the video content among the service provider server 400, the broadcast reception device 100, and the portable terminal 700. Needless to say, however, the security processing such as the encryption may be performed or may not be necessarily performed. When the security processing such as the encryption may be performed, a well-known encryption technique may be used.

The functions etc. of the present invention described above may be partially or entirely realized by hardware using design etc. by an integrated circuit. A microprocessing unit etc. interpret and execute the operation programs for realizing the respective functions etc., and thereby may realize software. The hardware and the software may be used together.

Incidentally, the software that controls the broadcast reception device 100 may be previously stored in the ROM 103 and/or the storage unit 110 of the broadcast reception device 100 at a time when a product is shipped. After the product is shipped, the software may be acquired from the different application server 500 on the Internet 200 through the LAN communication unit 121. The software stored in a memory card or an optical disc etc. may be acquired through the extended interface unit 124 etc.

Similarly thereto, the software that controls the portable terminal 700, may be previously stored in the ROM 703 and/or the storage unit 710 of the portable terminal 700 at a time when a product is shipped. After the product is shipped, the software may be acquired from the different application server 500 etc. on the Internet 200 through the LAN communication unit 121 or the mobile-telephone-system communication unit 722 etc. The software stored in a memory card or an optical disc etc. may be acquired through the extended interface unit 724 etc.

Control lines and information lines indicated in the figures are considered to be necessary for the descriptions, and all control lines and information lines of the products are not necessarily indicated. In practice, almost all of the configurations may be considered to be mutually connected.

REFERENCE SIGNS LIST

100: broadcast reception device, 101: main control unit
102: system bus, 103: ROM, 104: RAM, 110: storage unit, 121: LAN communication unit, 124: extended interface unit, 131: tuner/demodulator, 132: demultiplexor, 133: video decoder, 134: audio decoder, 135: subtitle decoder, 141: data-broadcasting reception processing unit, 142: data-broadcasting engine, 143: application control unit, 144: application engine, 151: content processing unit, 161: video superimposition unit, 162: audio selector, 163: video display unit, 164: speaker, 170: operation input unit, 200: Internet, 300: broadcasting-station server, 400: service provider server,
700: portable terminal, 701: main control unit, 702: system bus, 703: ROM, 704: RAM, 710: storage unit, 720: communication processing unit, 724: extended interface unit, 730: operation unit, 740: image processing unit, 750: audio processing unit, and 760: sensor unit.

The invention claimed is:

1. A viewing system including 1) a broadcast reception device that receives a broadcast wave including a video content of a broadcast program and information related to the broadcast program and 2) a server that retains the video content of the broadcast program and communicates with the broadcast reception device through a network, the broadcast reception device comprising:

a user operation input interface that receives a user operation;
a tuner that receives the broadcast wave;
a storage that records at least one of 1) the video content of the broadcast program and 2) the information related to the broadcast program that is included in the broadcast wave received by the tuner;
a first display that displays a video;
communication circuitry that communicates with the server through the network; and
a controller,
wherein when the user operation input interface receives a user operation for recording a desired broadcast program, the controller displays, on the first display, a recording setting screen that facilitates a selection of any of a first recording method and a second recording method,
wherein the first recording method 1) records, in the storage of the broadcast reception device, information related to the desired broadcast program and 2) does not record, in the storage of the broadcast reception device, a video content of the desired broadcast program,
wherein the second recording method records, in the storage of the broadcast reception device, both of the information related to the desired broadcast program and the video content of the desired broadcast program,
wherein when the user operation input interface receives a user operation for selecting the first recording method from the displayed recording setting screen, the controller 1) does not record, in the storage of the broadcast reception device, records no the video content of the desired broadcast program and 2) records, in the storage of the broadcast reception device, the information related to the desired broadcast program including program-storage location information identifying a server, on the network, retaining the video content of the desired broadcast program, wherein when the user operation input interface receives a user operation for playing back the desired broadcast program recorded according to the first recording method, the controller refers to the program-storage location information recorded in the storage of the broadcast reception device and communicates to the server retaining the video content of the desired broadcast program through the communication circuitry, and wherein when the controller receives, in response to communicating to the server retaining the video content of the desired broadcast program by referring to the program-storage location information, the video content of the desired broadcast program from the server retaining the video content of the desired broadcast program via the communication circuitry, the controller displays, on the first display, the received video content of the desired broadcast program.

2. The viewing system according to claim 1,
wherein the broadcast reception device provides the recording setting screen including a setting item that allows a selection of one of a plurality of recording modes when the recording setting screen is displayed on the first display, wherein when 1) the user operation input interface receives the user operation for playing back the desired broadcast program and 2) the controller communicates with the server through the communication circuitry, the broadcast reception device transmits, to the server retaining the video content of the desired broadcast program, information on the recording mode selected via the recording setting screen, and the server transmits the video content of the desired broadcast program in a state corresponding to the received recording mode to the broadcast reception device.

3. The viewing system according to claim 1, further comprising:
a portable terminal that communicates with the broadcast reception device, wherein the portable terminal includes 1) second communication circuitry that communicates with the broadcast reception device or the server and 2) a second display, the portable terminal transmits first information on selection of a first desired broadcast program as a viewing program to the broadcast reception device that records the first broadcast program by the first recording method, and the portable terminal 1) acquires, from the broadcast reception device, second information to be used for receiving the video content of the first desired broadcast program from the server, 2) uses the second information to communicate with the server and to receive the video content of the first desired broadcast program, and 3) receives the video content of the first desired broadcast program from the server to display the received video content on the second display.

4. The viewing system according to claim 3,
wherein the portable terminal displays, on the second display, an image-quality selection screen for selecting image quality of the viewing program, the portable terminal transmits, to the server, first image quality selected from the image-quality selection screen when requesting the video content of the first desired broadcast program from the server, and the video content of the first desired broadcast program in a state corresponding to the selected first image quality is received from the server, and the received video content is displayed on the second display of the portable terminal.

5. The viewing system according to claim 1,
wherein the server retains, as the video content corresponding to the broadcast program, a plurality of video contents different in encoding format or bit rate, and the broadcast reception device receives the video content having an encoding format or bit rate corresponding to a recording mode designated through the user operation input interface.

6. The viewing system according to claim 1,
wherein the program-storage location information includes an URL or IP address of the server retaining the video content corresponding to the desired broadcast program.

7. The viewing system according to claim 1,
wherein the controller displays, on the first display, a recorded-program list indicating a list of programs recorded in the first recording method and program recorded in the second recording method in response to the user operation input interface receiving the user operation for playing back the desired broadcast program.

8. The viewing system according to claim 1,
wherein the controller provides a mark to a recorded-program list, the mark indicating that a program having been recorded in the first recording method.

9. The viewing system according to claim 1,
wherein the controller provides a display format to a recorded-program list, the display format identifying a program recorded in the first recording method and a program recorded in the second recording method.

10. A broadcast reception device that has a function of receiving a broadcast wave including a video content of a broadcast program and information related to the broadcast program and communicating with a server retaining a video content corresponding to the broadcast program through a network, the broadcast reception device comprising:
a user operation input interface that receives a user operation;
a tuner that receives the broadcast wave;
a storage that records at least one of 1) the video content of the broadcast program and 2) the information related to the broadcast program that is included in the broadcast wave received by the tuner;
a display that displays a video;
communication circuitry that communicates with the server through the network; and
a controller,
wherein when the user operation input interface receives a user operation for recording a desired broadcast program, the controller displays, on the display, a recording setting screen that facilitates a selection of any of a first recording method and a second recording method,
wherein the first recording method 1) records, in the storage of the broadcast reception device, information related to the desired broadcast program and 2) does not record, in the storage of the broadcast reception device, a video content of the desired broadcast program, wherein the second recording method records, in the storage of the broadcast reception device, both of the information related to the desired broadcast program and the video content of the desired broadcast program, wherein when the user operation input interface receives a user operation for selecting the first recording method from the displayed recording setting screen, the controller 1) does not record, in the storage of the broadcast reception device, the video content of the desired broadcast program and 2) records, in the storage of the broadcast reception device, the information related to the desired broadcast program including program-storage location information identifying a server, on the network, retaining the video content of the desired broadcast program, wherein when the user operation input interface receives a user operation for playing back the desired broadcast program recorded according to the first recording method, the controller refers to the program-storage location information recorded in the storage of the broadcast reception device and communicates to the server retaining the video content of the desired broadcast program through the communication circuitry, and wherein when the controller receives, in response to communicating to the server retaining the video content of the desired broadcast program by referring to the program-storage location information, the video content of the desired broadcast program from the server retaining the video content of the desired broadcast program via the communication circuitry, the controller displays, on the display, the received video content of the desired broadcast program.

11. The broadcast reception device according to claim 10, wherein the broadcast reception device provides the recording setting screen including a setting item that allows a selection of one of a plurality of recording modes when the recording setting screen is displayed on the display, wherein when 1) the user operation input interface receives the user operation for playing back the desired broadcast program and 2) the controller communicates with the server through the communication circuitry, the broadcast reception device transmits, to the server retaining the video content of the desired broadcast program, information on the recording mode selected via the recording setting screen, and wherein the broadcast reception device receives, from the server, the video content of the desired broadcast program that is in a state corresponding to the recording mode and displays the received video content on the display.

12. A program recording and viewing method of a viewing system, the viewing system including:

a broadcast reception device that receives a broadcast wave including a video content of a broadcast program and information related to the broadcast program; and a server that retains a video content of the broadcast program and communicates with the broadcast reception device through a network, the program recording and viewing method comprising:

displaying, on a display of the broadcast reception device, a recording setting screen that facilitates a selection of a first recording method or a second recording method, wherein the first recording method 1) records, in a data storage of the broadcast reception device, information related to a desired broadcast program and 2) does not record, in the data storage of the broadcast reception device, a video content of the desired broadcast program, wherein the second recording method records, in the data storage of the broadcast reception device, both of the information related to the desired broadcast program and the video content of the desired broadcast program;

when the first recording method is selected, recording, in the data storage of the broadcast reception device, the information related to the desired broadcast program including program-storage location information identifying a server, on the network, retaining the video content of the desired broadcast program while no video content of the desired broadcast program is recorded in the data storage of the broadcast reception device; and when a play back request for playing back the desired broadcast program recorded under the first recording method is received, 1) identifying the server retaining the video content of the desired broadcast program using the program-storage location information, 2) receiving, from the identified server, the video content of the desired broadcast program, and 3) displaying the received video content on the display.

13. A program recording and viewing method in a broadcast reception device, the broadcast reception device including a function of receiving a broadcast wave including a video content of a broadcast program and information related to the broadcast program and communicating with a server retaining a video content of the broadcast program, the program recording and viewing method comprising:

displaying, on a display of the broadcast reception device, a recording setting screen that facilitates a selection of a first recording method or a second recording method, wherein the first recording method 1) records, in a data storage of the broadcast reception device, information related to a desired broadcast program and 2) does not record, in the data storage of the broadcast reception device, a video content of the desired broadcast program, wherein the second recording method records, in the data storage of the broadcast reception device, both of the information related to the desired broadcast program and the video content of the desired broadcast program;

when the first recording method is selected, recording, in the data storage of the broadcast reception device, the information related to the desired broadcast program including program-storage location information identifying a server, on the network, retaining the video content of the desired broadcast program while no video content of the desired broadcast program is recorded in the data storage of the broadcast reception device; and when a play back request for playing back the desired broadcast program recorded under the first recording method is received, 1) identifying the server retaining the video content of the desired broadcast program using the program-storage location information, 2) receiving, from the identified server, the video content of the desired broadcast program, and 3) displaying the received video content on the display.

* * * * *